(12) United States Patent
Gorny

(10) Patent No.: US 12,223,509 B2
(45) Date of Patent: Feb. 11, 2025

(54) CUSTOMER MANAGEMENT SYSTEM

(71) Applicant: Nextiva, Inc., Scottsdale, AZ (US)

(72) Inventor: Tomas Gorny, Scottsdale, AZ (US)

(73) Assignee: Nextiva, Inc., Scottsdale, AZ (US)

( * ) Notice: Subject to any disclaimer, the term of this patent is extended or adjusted under 35 U.S.C. 154(b) by 0 days.

(21) Appl. No.: 18/435,408

(22) Filed: Feb. 7, 2024

(65) Prior Publication Data

US 2024/0177170 A1 May 30, 2024

Related U.S. Application Data

(63) Continuation of application No. 17/581,017, filed on Jan. 21, 2022, now Pat. No. 11,915,248, which is a continuation of application No. 16/416,533, filed on May 20, 2019, now Pat. No. 11,244,323, which is a continuation of application No. 15/651,372, filed on Jul. 17, 2017, now Pat. No. 10,296,915, which is a continuation of application No. 14/485,626, filed on Sep. 12, 2014, now Pat. No. 9,710,814.

(51) Int. Cl.
*G06F 16/9535* (2019.01)
*G06Q 30/01* (2023.01)

(52) U.S. Cl.
CPC ......... *G06Q 30/01* (2013.01); *G06F 16/9535* (2019.01)

(58) Field of Classification Search
CPC ............................ G06Q 30/01; G06F 16/9535
See application file for complete search history.

(56) References Cited

U.S. PATENT DOCUMENTS

| | | | |
|---|---|---|---|
| 6,654,738 B2 | 11/2003 | Nishioka et al. | |
| 8,160,970 B2 | 4/2012 | Allsop | |
| 8,280,790 B2 | 10/2012 | Lappas et al. | |
| 9,106,749 B2 | 8/2015 | Schults et al. | |
| 9,646,604 B2 | 5/2017 | Erhart et al. | |
| 10,467,560 B2 | 11/2019 | Aggarwal et al. | |
| 2002/0042792 A1* | 4/2002 | Nishioka | G06F 16/338 707/999.005 |
| 2008/0071687 A1 | 3/2008 | Hengel | |
| 2009/0300632 A1 | 12/2009 | Falcon et al. | |
| 2013/0124257 A1 | 5/2013 | Schubert | |
| 2014/0236749 A1 | 8/2014 | Yang | |

FOREIGN PATENT DOCUMENTS

WO 2011151817 12/2011

OTHER PUBLICATIONS

European Examination Report for EP Invention Patent Application No. 20 205 396.3; Mar. 22, 2024; 7 Pages.
Anonymous, "System Administrator—Wikipedia definition as of Jul. 29, 2014", XP055443077, Retrieved from the Internet: URL: http://en.wikipedia.org/w/index.php?title=System_administrator &oldid=618999597 [retrieved on Jan. 22, 2018] 4 pages (Year: 2014).

(Continued)

*Primary Examiner* — Truong V Vo
(74) *Attorney, Agent, or Firm* — Spencer Fane LLP; Steven J. Laureanti

(57) ABSTRACT

A system and method are disclosed for scoring an interaction over one or more channels by an end user and an entity by monitoring the communications over the channels and assigning penalties and scores based on topics associated with the communications.

20 Claims, 36 Drawing Sheets

(56) References Cited

OTHER PUBLICATIONS

European Search Report for EP Invention Patent Application No. EP 20 20 5396, Feb. 19, 2021, p. 1.
International Search Report for PCT Invention Patent Application No. PCT/US14/60962; Feb. 9, 2015; p. 1.
European Search Report for EP Invention Patent Application No. EP 14 90 1789, Jan. 19, 2018, p. 1.

* cited by examiner

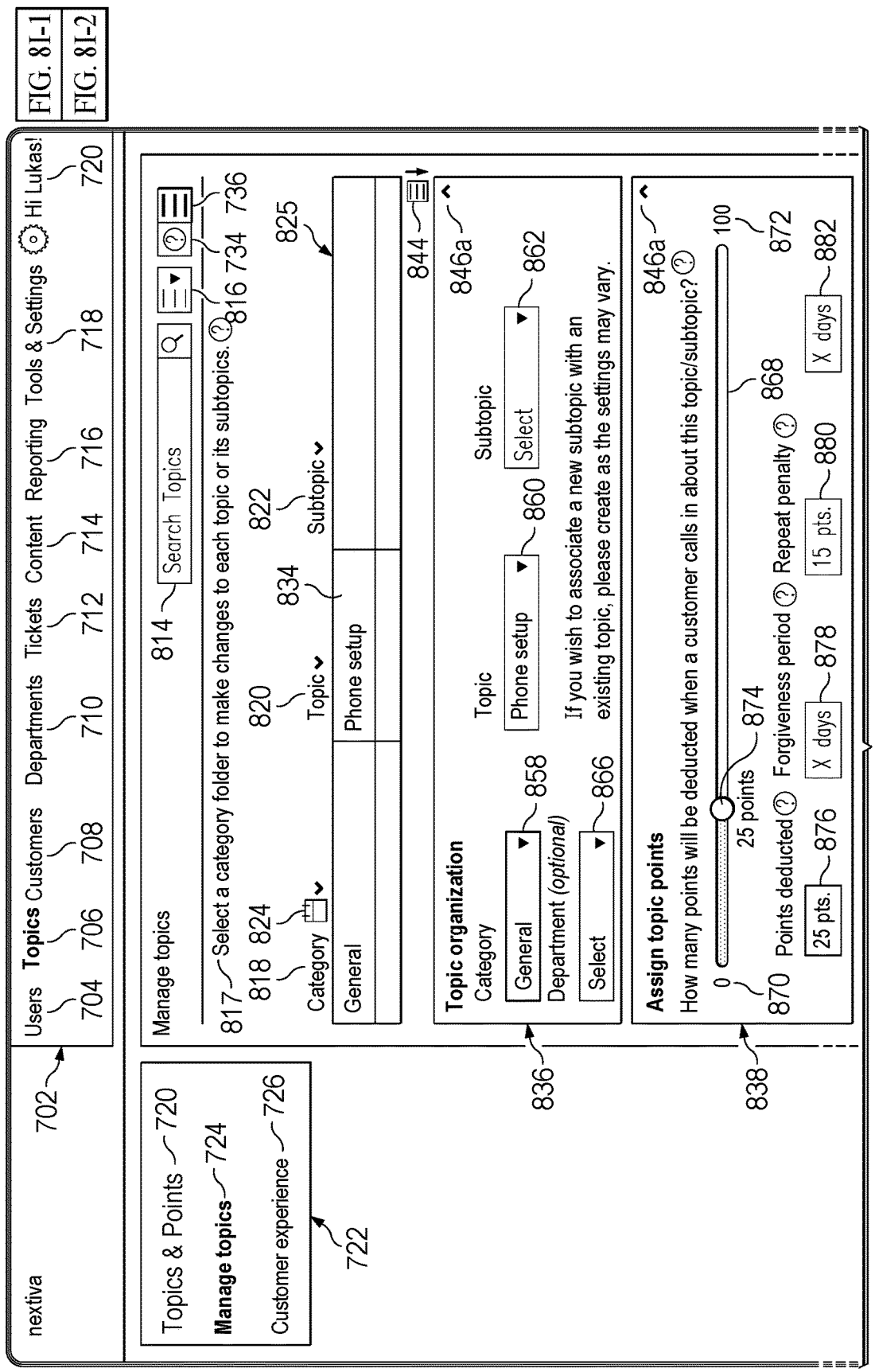

FIG. 13

| TICKET ID | CUSTOMER SINCE 09/10/12 | # OF CONTACT 103 | OPEN 4 | VALUE $300 | | | | | | |
|---|---|---|---|---|---|---|---|---|---|---|
| 1302a 1302b 1302c | 1302d 1302e 1302f | 1302g 1302h | 1302i | 1302j | 1302k | 1302l | 1302m | 1302n | 1302o | 1302p |
| ▶ TICKET ID | CUSTOMER | COMPANY | TOPIC | STATUS | CREATED | UPDATED | RECEIVED | AGENT | DEPT | PRIORITY WEIGHT ACTIONS |
| 1304a 1304b 1304c | 1304d 1304e | 1304f | 1304g | 1304h | 1304i | 1304j | 1304k | 1304l | 1304m | 1304n 1304o 1304p |
| 1306a 1306b 1306c | 1306d | 1306e | 1306f | 1306g | 1306h | 1306i | 1306j | 1306k | 1306l | 1306m 1306n 1306o |
| 3 | Jane Doe | ABC Inc. | Outage.. 4 | | 1 hour ago | 43 min ago | 2 min ago | (Me) | Support | 9 |
| 3 | Jane Doe | ABC Inc. | Need... 1 | OPEN | 1 hour ago | 43 min ago | 2 min ago | (Me) | Support | 3 |
| 3 | Jane Doe | ABC Inc. | Outage.. 4 | OPEN | 1 hour ago | 43 min ago | 2 min ago | (Me) | Support | 2 |
| 3 | Jane Doe | ABC Inc. | Outage.. 4 | CLOSED | 1 hour ago | 43 min ago | 2 min ago | (Me) | Support | 4 |
| 3 | Jane Doe | ABC Inc. | Outage.. 4 | CLOSED | 1 hour ago | 43 min ago | 2 min ago | (Me) | Support | 1 |

Outage for all my locations
Jane Doe [OUTAGE]

⟵ INBOUND PHONE CALL | APRIL 22, 2014 AT 12:30PM (1 DAY AGO)

CUSTOMER MANAGEMENT SYSTEM

CROSS-REFERENCE TO RELATED APPLICATIONS

This application is a continuation of U.S. patent application Ser. No. 17/581,017, filed Jan. 21, 2022, entitled "Customer Management System," which is a continuation of U.S. patent application Ser. No. 16/416,533, filed on May 20, 2019, entitled "Customer Management System," now U.S. Pat. No. 11,244,323, which is a is a continuation of U.S. patent application Ser. No. 15/651,372, filed Jul. 17, 2017, entitled "Customer Management System," now U.S. Pat. No. 10,296,915, which is a continuation of U.S. patent application Ser. No. 14/485,626, filed Sep. 12, 2014, entitled "Customer Management System," now U.S. Pat. No. 9,710,814. U.S. patent application Ser. No. 17/581,017, and U.S. Pat. Nos. 11,244,323, 10,296,915, and 9,710,814 are assigned to the assignee of the present application.

TECHNICAL FIELD

The present disclosure relates generally to a customer management system and specifically to monitoring customer relationships over time and scoring interactions based on user-defined criteria.

BACKGROUND

In many environments, a customer experience is not an isolated experience but instead a relationship which evolves over time. However, companies are typically unaware of any particular customer's sentiment toward the company or if the customer is likely to become a repeat customer or recommend the company to other potential customers.

To measure customer satisfaction today, companies generally use customer surveys, NPS (Net Promoter Score) and end user interaction surveys. However, these measures of customer satisfaction only generates customer satisfaction in an aggregated manner, and, by its very nature, only generates a measure of customer satisfaction levels from lagging indicators. Likewise, the customer is contacted after the fact and these customer surveys and other measures of customer satisfaction are not completed by all customers nor are they a true indication of global customer satisfaction. Therefore, previous techniques of measuring customer satisfaction have proven inadequate.

SUMMARY

A method of customer management is disclosed. The method includes receiving by a computer a request for a current status of one or more end users. The method further includes scoring by the computer the current status by determining one or more topics associated with the one or more users, retrieving one or more penalties associated with the one or more topics and calculating a satisfaction score for the one or more end users using a scoring equation comprising the one or more penalties associated with the one or more topics. Scoring the current status also includes comparing the satisfaction score with one or more ranges of values, wherein each range of values is associated with a status and generating the current status by choosing the status associated with the range of values that includes the satisfaction score. The method still further includes displaying by the computer the current status of the one or more end users.

A system for customer management is disclosed. The system includes one or more databases that store one or more penalties associated with one or more topics and a computer. The computer receives a request for a current status of one or more end users and scores the current status by determining one or more topics associated with the one or more users, retrieving one or more penalties associated with the one or more topics and calculating a satisfaction score for the one or more end users using a scoring equation comprising the one or more penalties associated with the one or more topics. The computer also scores the current status by comparing the satisfaction score with one or more ranges of values, wherein each range of values is associated with a status and generating the current status by choosing the status associated with the range of values that includes the satisfaction score. The computer further displays the current status of the one or more end users.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIGS. 12-25 illustrate various embodiments of a dashboard of the customer management system of FIG. 1.

DETAILED DESCRIPTION

Figure 1:
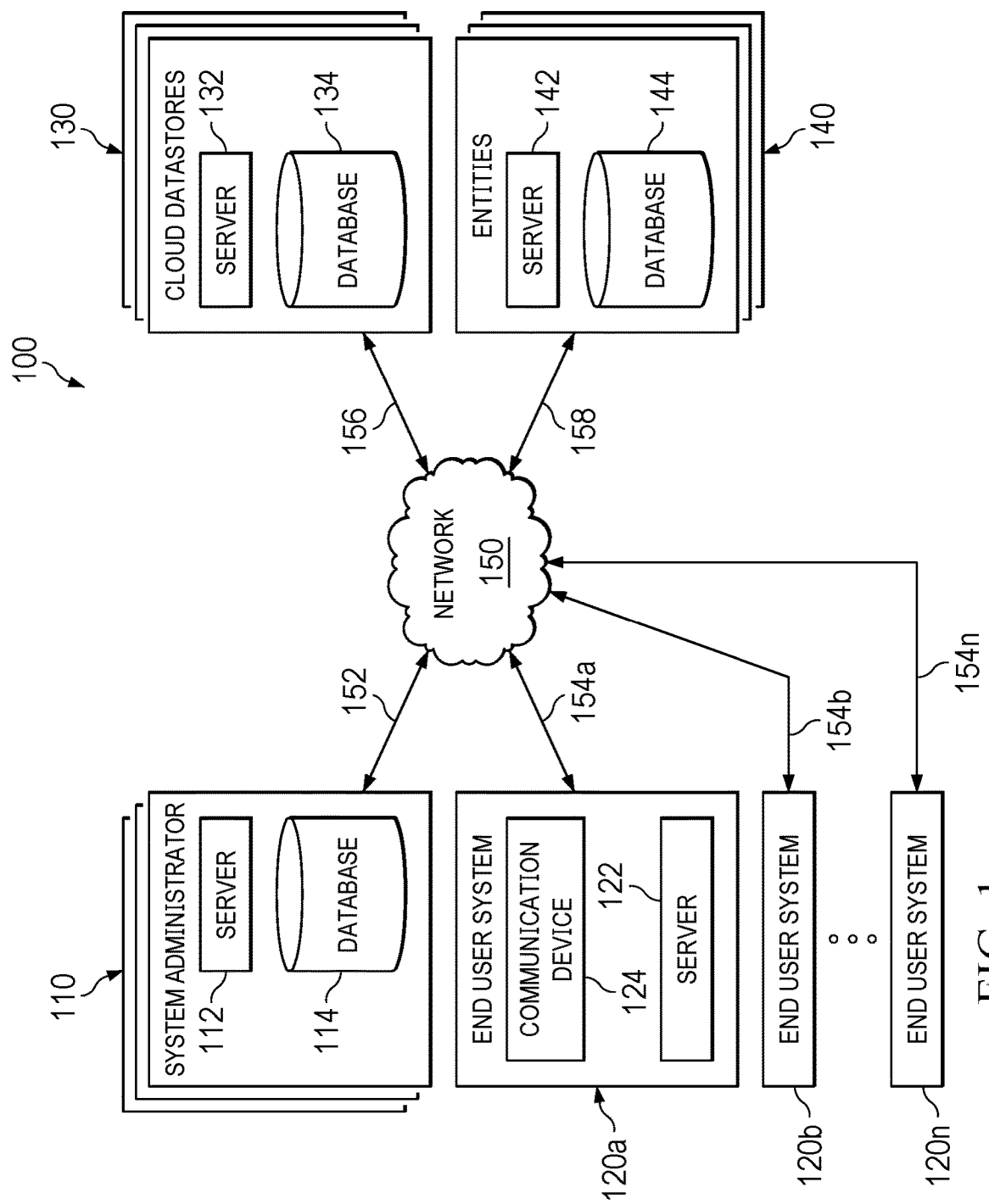
FIG. 1 illustrates a customer management system according to a preferred embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

FIG. 1 illustrates an exemplary system 100, according to a preferred embodiment. System 100 comprises one or more system administrators 110, one or more end user systems 120a-n, one or more cloud datastores 130, one or more entities 140, a network 150, and communication links 152, 154a-n, 156, and 158. Although one or more system administrators 110, one or more end user systems 120a-n, one or more cloud datastores 130, one or more entities 140, a single network 150, and single communication links 152, 154a-n, 156, and 158 are shown and described, embodiments contemplate any number of system administrators, end user systems, entities, cloud datastores, networks, or communication links, according to particular needs.

In one embodiment, one or more system administrators 110 comprise server 112 and database 114. Server 112 is programmed to access, update and provide system administration, system updating, score assessment, and analytics associated with one or more end user systems 120a-n, one or more cloud datastores 130, and/or one or more entities 140, as discussed below in more detail. Database 114 comprises one or more databases or other data storage arrangements at one or more locations, local to, or remote from, one or more system administrators 110. In one embodiment, one or more databases 114 is coupled with one or more servers 112 using one or more local area networks (LANs), metropolitan area networks (MANs), wide area networks (WANs), network 150, such as, for example, the Internet, or any other appropriate wire line, wireless, or any other communication links. One or more databases 114 stores data that is made available and may be used by one or more servers 112 according to the operation of system 100.

In one embodiment, one or more end user systems 120a-n comprises an end user system such as, for example, a customer, buyer, seller, retailer, or any other business or enterprise requiring information or service from entities 140. End user systems 120a-n comprise server 122 and communication devices 124. Each communication device 124 provides end user systems 120a-n a channel of communication between end user systems 120a-n and entities 140. End user systems 120a-n are coupled to entities 140 by network 150 via communication links 154a, 154b, and 154n.

In another embodiment, one or more cloud datastores 130 comprises server 132 and database 134. Server 132 comprises any server configured to access, update and provide data associated with one or more end user systems 120a-n or one or more entities 140, as discussed below in greater detail. Database 134 comprises one or more databases or other data storage arrangements at one or more locations, local to, or remote from, one or more system administrators 110. In one embodiment, one or more databases 134 is coupled with one or more servers 132 using one or more LANs, WANs, MANs, network 150, such as, for example, the Internet, or any other appropriate wire line, wireless, or any other communication links. One or more databases 134 stores data that is made available and may be used by one or more servers 132 according to the operation of system 100.

In an embodiment, one or more entities 140 may be any entity, such as, for example, a business, company, enterprise, distributor, retailer, call-center, CRM specialist system, customer service system, help desk system, telephone or media service, social media service (such as FACEBOOK, TWITTER, or the like) or any entity which communicates with customers, either its own customers or the customers of another entity. One or more entities 140 may operate on one or more computers comprising one or more servers 142 and one or more databases 144 or other data storage arrangements at one or more locations which are integral to or separate from the hardware and/or software that supports system 100.

One or more system administrators 110 including server 112 and database 114 is coupled with network 150 using communications link 152, which may be any wireline, wireless, or other link suitable to support data communications between one or more system administrators 110 and network 150. One or more end user systems 120a-n is coupled with network 150 using communications links 154a-n, which may be any wireline, wireless, or other link suitable to support data communications between one or more end user systems 120a-n and network 150. One or more cloud datastores 130 including server 132 and database 134 is coupled with network 150 using communications link 156, which may be any wireline, wireless, or other link suitable to support data communications between one or more cloud datastores 130 and network 150. One or more entities 140 including server 142 and database 144 is coupled with network 150 using communications link 158, which may be any wireless or other link suitable to support data communications between one or more entities 140 and network 150.

Although communication links 152, 154a-n, 156, and 158 are shown as generally coupling one or more system administrators 110, one or more end user systems 120a-n, one or more cloud datastores 130, and one or more entities 140 with network 150, one or more system administrators 110, one or more end user systems 120a-n, one or more cloud datastores 130, and one or more entities 140 may communicate directly with each other according to particular needs.

In an embodiment, network 150 includes the Internet, telephone lines, any appropriate local area networks LANs, MANs, or WANs, and any other communication network coupling one or more system administrators 110, one or more end user systems 120a-n, one or more cloud datastores 130, and one or more entities 140. For example, data may be maintained by one or more system administrators 110 or one or more cloud datastores 130 at one or more locations external to one or more system administrators 110 and/or one or more cloud datastores 130 and made available to one or more system administrators 110, one or more end user systems 120a-n, one or more cloud datastores 130, one or more entities 140 using network 150 or in any other appropriate manner. Those skilled in the art will recognize that the complete structure and operation of communication network 150 and other components within system 100 are not depicted or described. Embodiments may be employed in conjunction with known communications networks and other components.

In one embodiment, one or more system administrators 110, one or more end user systems 120a-n, one or more cloud datastores 130, and/or one or more entities 140 may each operate on one or more computers or computer systems that are integral to or separate from the hardware and/or software that support system 100. In addition or as an alternative, one or more users, such as end users or representatives, may be associated with system 100 including one or more system administrators 110, one or more end user systems 120a-n, one or more cloud datastores 130, and/or one or more entities 140. These one or more users may include, for example, one or more computers programmed to autonomously handle monitoring customer relationships and/or one or more related tasks within system 100. As used herein, the term "computer" or "computer system" includes any suitable input device, such as a keypad, mouse, touch screen, microphone, or other device to input information. Any suitable output device that may convey information associated with the operation of system 100, including digital or analog data, visual information, or audio information. Furthermore, the computer includes any suitable fixed or removable non-transitory computer-readable storage media, such as magnetic computer disks, CD-ROM, or other suitable media to receive output from and provide input to system 100. The computer also includes one or more processors and associated memory to execute instructions and manipulate information according to the operation of system 100.

In one embodiment and as discussed in more detail below, system 100 provides a customer management system. That is, customer management system 100 comprises one or more interconnected system administrators 110, end user systems 120a-n, cloud datastores 130, and/or entities 140, which scores end user systems 120a-n and provides the score to entities 140. In addition, or as an alternative, customer management system 100 stores and organizes topics related to a customer interaction between end user systems 120a-n and entities 140 over channels such as phone, text-based chat, email, or the like. Accordingly, customer management system 100 provides end user systems 120a-n a system and method for scoring customer interactions based on topics, channels, response times, and other scoring criteria as described in more detail below.

By way of example only and not by limitations, embodiments contemplate an entity 140 being a customer service center (such as a call center or a retail service desk) and end user systems 120a-n comprising a customer of one or more services which are sold, serviced, or communicated by the customer service center to the customer. Such subscription services may comprise, for example, a cloud-based email and voice-over-internet-protocol (VOIP) service. In this example, a customer may call the customer service center by for example, a password reset of the web-based email program. When the customer service center (entity 140) receives this phone call, customer management system 100 identifies the incoming phone call, categorizes the call as a password reset request, and generates a score for the customer according to scoring data associated with the topic of password reset. As will be explained in more detail below, the score takes into account the severity of the problem the customer is calling about, how frequent the customer has called, who the customer is, whether the problem is a repeat problem, and various other factors described in more detail below. Based on the factors, the score provides the customer service center with an indication whether the customer has a positive, neutral, or negative opinion of the services. In one embodiment, this indication is used in prioritizing responses to the customers, generating metrics for an indication of how well the customer service center is operating, offering concessions to customers, initiating campaigns to resolve frequent or disruptive problems, and the like, as indicated in more detail herein. In addition, or as an alternative, customer management system 100 monitors which customers are likely to cancel services, subscribe to more services, recommend the services to other customers, or the like. Various other features and services are described in more detail below.

Figure 2:
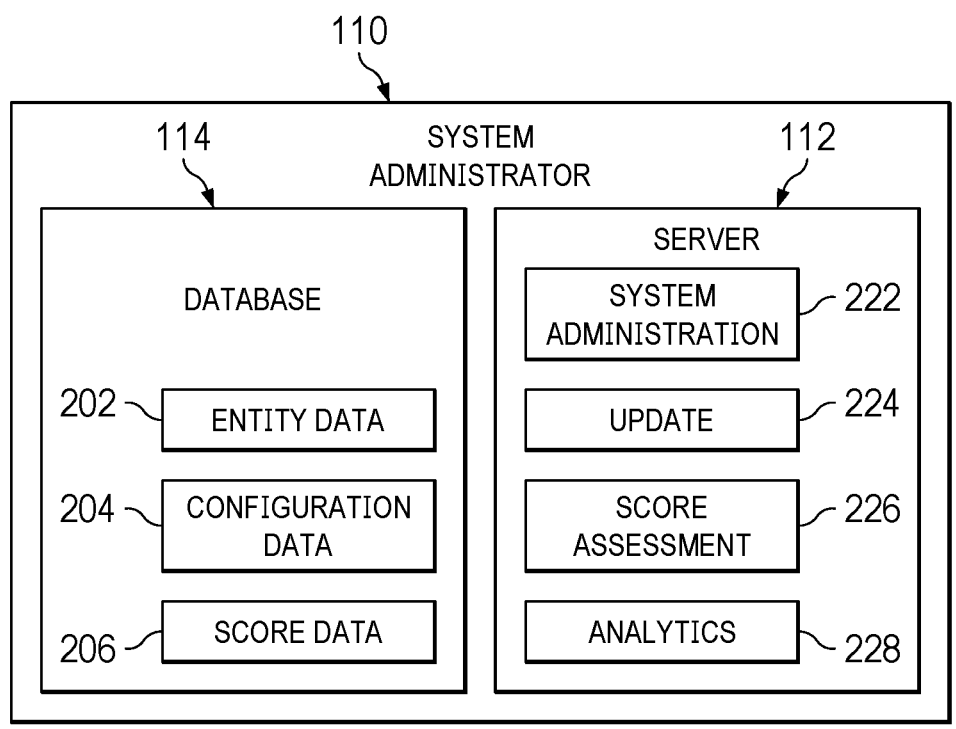
FIG. 2 illustrates the system administrator of FIG. 1 according to an embodiment.

FIG. 2 illustrates system administrator 110 of FIG. 1 in greater detail, according to an embodiment. System administrator 110 comprises server 112 and database 114. Server 112 comprises system administration module 222, update module 224, score assessment module 226, and analytics module 228. Database 114 comprises entity data 202, configuration data 204, and score data 206. Although, system administration module 222, update module 224, score assessment module 226, analytics module 228, entity data 202, configuration data 204 and score data 206 are shown and described; embodiments contemplate any type of data and any number of modules, according to particular needs.

System administration module 222 of server 112 configures, updates, and/or administers customer management system 100. System administration module 222 provides services to configure the operation of customer management system 100 and change which modules are executed and/or data is stored on one or more of system administrators 110, end user systems 120a-n, cloud datastores 130, or entities 140. Embodiments contemplate a highly user-configurable customer management system 100, such that the various modules or data may be stored either singularly or redundantly on one or more system administrators 110, end user systems 120a-n, cloud datastores 130, and/or entities 140, according to particular needs. In addition, or as an alternative, system administration module 222 receives, processes, updates, creates, and stores entity data 202 and configuration data 204. In addition or as an alternative, system administration module 222 synchronizes entity data 202 with local data 502 of database 144 of entities 140 (see FIG. 5).

Update module 224 of server 112 comprises a user-interface to update the modules and data in customer management system 100. Embodiments contemplate a push-based or download-based update system that updates modules or data of customer management system 100 either by downloading or pushing the updated modules or data. In some embodiments, update module 224 uses entity data 202 to identify which data and/or modules of the customer management system 100 to update.

Score assessment module 226 of server 112 provides a score for each entity, end user, customer, company, enterprise, and/or user of customer management system 100 and stores score data 206 in database 114. Particular details of score assessment module 226 will be discussed in more detail below.

Analytics module 228 of server 112 of system administrator 110 compiles hierarchy, ticket, entity, end-user data, and any data stored on end user systems 120a-n, cloud datastores 130, and/or entities 140 to generate charts, graphs, and data to score and provide metrics of the various components of customer management system 100. Analytics module 228 provides system administrator 110 with data necessary to reconfigure the various components of customer management system 100 in order to provide a seamless experience for end user systems 120a-n and entities 140 and additionally provide data to end user systems 120a-n and entities 140 to compare between different end user systems 120a-n and entities 140. Additionally, analytics module 228 provides system administrator 110 the ability to rate how effective the customer service functioning of one or more entities 140 is compared to any other one or more entities 140.

By way of example and not by way of limitation, analytics module 228 of system administrator 110 calculates the average response time for two or more entities 140, which may be, for example, customer service centers. System administrator 110 provides the average response time to the customer service centers such that the customer service centers receive an indication of whether their response time is better or worse than other customer service centers. In addition or as an alternative, analytics module 228 calculates an average score specific for one or more topics 434 or subtopics 436-228. Analytics module 228 provides the average score for one or more topics or subtopics to the customer service centers which then receive an indication of whether their scores for any specific topic or subtopic is better or worse than an average. In this manner, entities 140 may prioritize topics 434 or subtopics 436-438 to increase customer satisfaction.

By way of a further example, analytics module 228 of system administrator 110 rates the performance of an entity 140 based on the satisfaction scores of the end user systems 120 which are handled by that entity 140. In this way, analytics module 228 generates a rating for each entity 140 that indicates the satisfaction of the customers handled by each entity.

In one embodiment, where a response time (discussed below) is consistently not met by an entity 140, analytics module 228 indicates a category, topic, subtopic, agent, end user, or some other data associated with the response time to inform an entity 140 of the problem, such as, for example, an agent that does not respond soon enough, or a topic which takes longer to resolve than a predetermined response time.

Entity data 202 of database 114 describes the identification information of entities 140 of customer management system 100. Entity data 202 comprises any identification information and may comprise, for example, names, addresses, company, phone numbers, email, IP addresses, and the like. Entity data 202 may be used by system administration module 222 to identify one or more entities 140 in customer management system 100 to generate particular configurations of customer management system 100 specific to each of the one or more entities 140. For example, where one or more entities 140 is a customer service center, the identification information stored in the entity data 202 permits system administrator 110 to generate a particularized user interface specific to the customer service center. Specifically, system administration module 222 provides a particularized user interface specific to the industry of entity 140, the types of customers served by entity 140, and/or the types of products sold by entity 140. For example, particularized user interfaces may comprise a different arrangement of elements on dashboard 1200 (See FIG. 12), different preconfigured topic data 306 (See FIG. 3), different hierarchy 430 arrangement (See FIG. 4), and the like. In one embodiment, the particularized user interfaces are stored in, for example, configuration data 204.

In one embodiment, configuration data 204 comprises data which describes the various functionalities of customer management system 100 useful to each of entities 140 and end user systems 120a-n. In one embodiment, configuration data 204 comprises, for example, location data that describes where the data is generated or received by each module of system administrator 110, end user systems 120a-n, cloud datastores 130 or entities 140 is stored. In another embodiment, configuration data 204 additionally comprises settings and parameters that describe the system-level functioning of customer management system 100. According to some embodiments, system administration module 222 provides system administrator 110 the ability to re-sort hierarchy data 308 of database 134 of cloud database 130 (see FIG. 3). In this way, system administrator 110 may re-order and sort categories 432 and topics 436 of hierarchy data 308 according to data provided by analytics module 228, thereby providing to entities 140 a preconfigured and preordered list of categories 432 and topics 436 based on the analysis of other entities 140.

In one embodiment, system administrator 110 comprises a centralized computer system which operates the system-level architecture of customer management system 100. In this manner, system administrator 110 through one or more modules provides customer management system 100 the ability to rapidly update and/or reconfigure end user systems 120a-n, cloud datastores 130, entities 140 and/or the communication links 152-154 from a single or central location.

Figure 3:
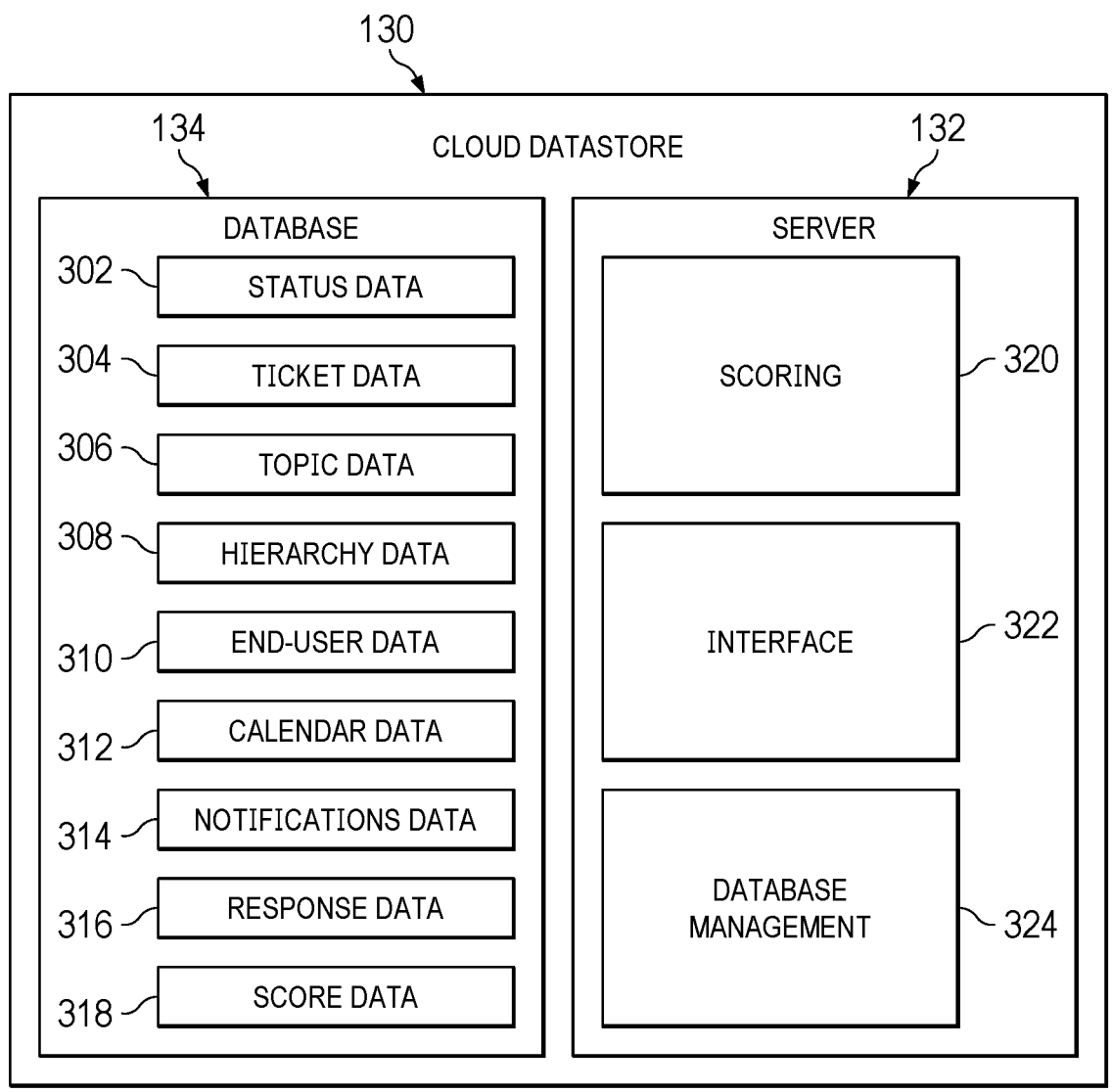
FIG. 3 illustrates the cloud datastore of FIG. 1 according to an embodiment.

FIG. 3 illustrates cloud datastore 130 of FIG. 1 in greater detail, according to an embodiment. Cloud datastore 130 comprises server 132 and database 134. According to embodiments, cloud datastore 130 stores the data necessary to run the customer relationship management (CRM) system and user-interface for entities 140 and/or end user systems 120a-n. More particularly server 132 of cloud datastore comprises scoring module 320, interface module 322, and database management module 324. Database 134 of cloud datastore 130 comprises status data 302, ticket data 304, topic data 306, hierarchy data 308, end-user data 310, calendar data 312, notifications data 314, response data 316, and score data 318.

By way of example only and not by way of limitation, cloud datastore 130 provides a centralized datastore for a plurality of entities 140 such that the data uploaded to datastore 130 is segregated and secure for each particular entity 140. In addition or as an alternative, system administrator 110 accesses the data stored in cloud datastore 130 for system administration, updating, score assessment, and analytics for a plurality of related or unrelated entities 140 in a centralized location.

Scoring module 320 of server 132 generates scores of end user systems 120a-n based on status data 302, ticket data 304, topic data 306, hierarchy data 308, end user data 310, response data 318, and/or score data 318 according to one or more processes explained in more detail below. Scoring module 320 receives data from one or more components of customer management system 100 and generates an end user score which is stored in score data 318.

Interface module 322 of server 132 generates a user interface, such as user interface 700 or dashboard 1200, described in more detail below in connection with FIGS. 7-9C and FIGS. 12-25. Various features of interface module 322 include creating and modifying topic data 306, generating charts, storing and retrieving historical data of customer relationship management, displaying notifications, creating and managing tickets, and creating and managing calendars. Interface module 322 stores and retrieves data from database 134 including status data 302, ticket data 304, end user data 310, calendar data 312, notifications data 314, response data 315, and score data 318.

Database management module 324 of server 132 provides a data sorting, retrieval, duplication, backup, creation and/or interface manager for data stored in database 134 in order to efficiently provide data to end user system 120a-n and entities 140 and manage the data generated from various components of customer management system 100 that are stored in database 134. According to some embodiments, database management module 324 organizes and stores the various types of data generated from customer management system 100 in order for customer management system 100 to provide real-time use of the data on database 134 to operate customer management system 100.

Figure 12:
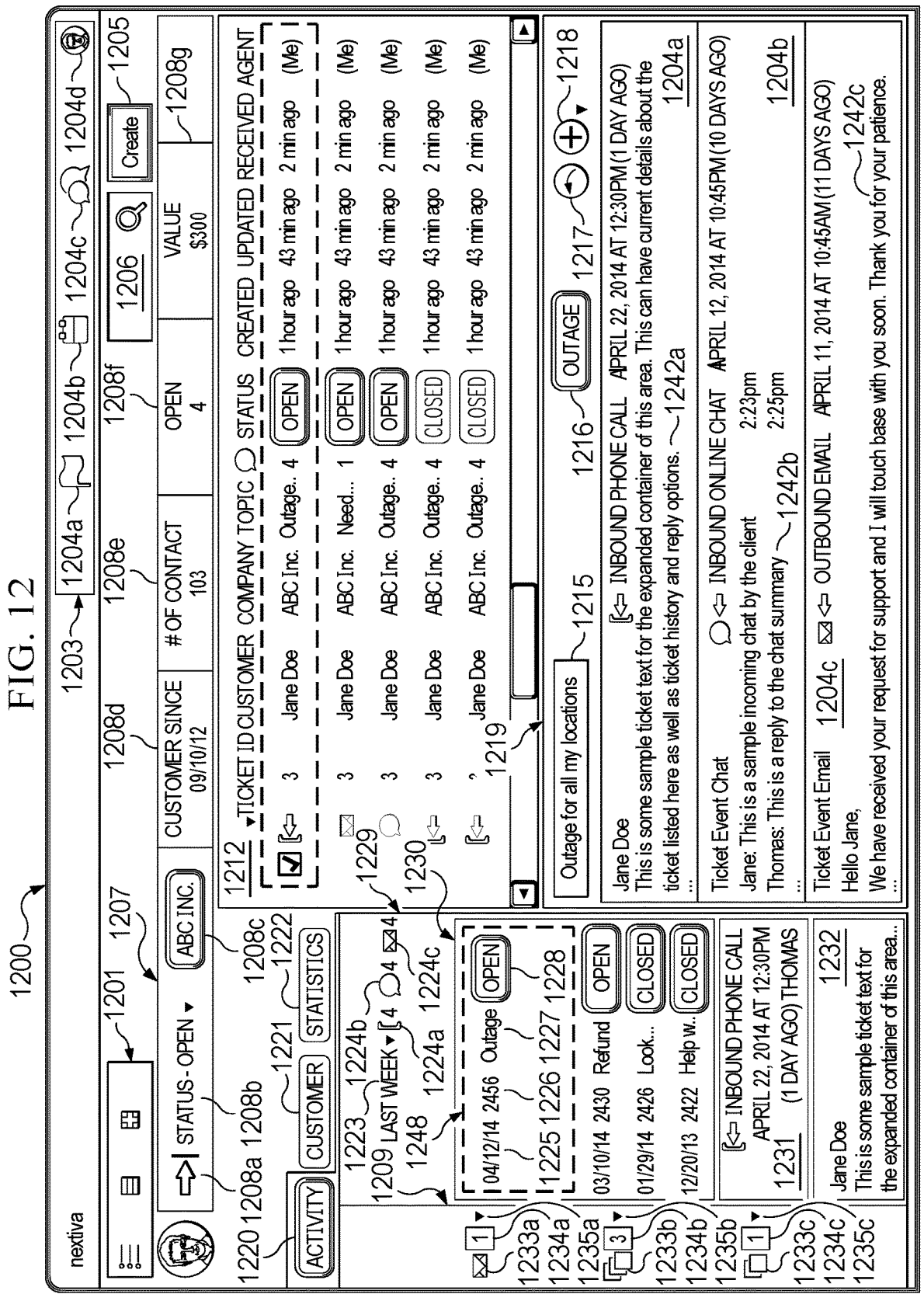

Status data 302 stored on database 134 of cloud datastore 130 comprises data that represents the status of one or more end user systems 120*a-n* as displayed in dashboard 1200 of customer management system 100 (See FIG. 12). Each end user system 120*a-n* is associated with a score and the score determines a status of each end user system 120*a-n*. As an example only and not by way of limitation, a certain range of scores is considered a good or "green" status, a second range of scores is considered a bad or "red" status, and a third range of scores is considered an intermediate or "yellow" status. The ranges and or mathematical equations used to calculate the ranges and associated statuses are stored in status data 302. In some embodiments, status data 302, including the determined status of end user systems 120*a-n*, is used to determine the evaporation period, repeat score, overage penalty, aggravation score, response delay penalty value, and other types of score data 318.

For example, scoring module 320 may increase a value for score data 318 when an end user system 120*a-n* is in good standing, and lower a value for score data 318 when an end user system 120*a-n* is in bad standing, or vice versa. More particularly, the satisfaction score may be increased when an end user system 120*a-n* is in good standing and lowered when an end user system 120*a-n* is in bad standing. In other words, the score of an end user system 120*a-n* may improve at a quicker rate when the end user system 120*a-n* is in good standing, and improve at a slower rate when the end user system 120*a-n* is in bad standing. Although, a particular example is described using a particular standing, embodiments contemplate any standing or measure of standing, according to particular needs.

Ticket data 304 stored on database 134 of cloud datastore 130 comprises data generated by tickets of customer management system 100. In one embodiment, ticket data 304 comprises one or more of the representative of entities 140 which created the ticket, end user system 120*a-n* or a company to which the ticket relates, the channel by which the end user system 120*a-n* contacted the representative of one or more entities 140, the number of contacts between the end user system 120*a-n* and one or more entities 140 historically and for a given amount of time, the total time spent by end user system 120*a-n* on each channel, the cost of an end user system 120*a-n* to one or more entities 140, the time and date of the ticket creation, the topic 434 and information shared during the contact between one or more entities 140 and one or more end user systems 120*a-n*, and/or the like. In some embodiments, the cost of an end user system 120*a-n* to one or more entities 140 is generated by scoring module 320 by calculating the amount of time spent on each contact channel by an end user system 120*a-n* to one or more entities 140 taking into account the cost of the channel, the amount of entity resources spent to maintain or utilize that channel, and any other information that determines if end user system 120*a-n* is profitable to one or more entities 140 based on the amount of contact an end user system 120*a-n* makes with one or more entities 140 and the amount of services purchased by the end user system 120*a-n* from one or more entities 140.

Topic data 306 stored on database 134 of cloud datastore 130 comprises data associated with topic data setup, creation, and management. As discussed in more detail below, system administrator 110 and entities 140 generate topics 434 sorted into various categories 432 that describe the subject matter of an interaction with an end user system 120*a-n* with one or more entities 140. In some embodiments, topic data 306 comprises one or more of: a description of the topic, the topic name, the category 432 to which the topic 434 belongs, a subtopic 436 associated with the topic 434, department of the entity which handles the topic 434, the expected resolve time for each channel, the expected response time for each channel, an aggravation score value, a evaporation period value, a repeat issue penalty value, an overage penalty for each channel, an internal representative notification or wiki, and a customer notification or note (see FIG. 4). Although, each of the aggravation score value, evaporation period value, repeat issue penalty value, and/or overage penalty are linked with each topic 434, embodiments contemplate each may be linked to and/or based on the amount or value of services purchased by the end user, the channel used by the end user system to contact entity 140, the status of the end user, and/or the identity of the end user system or customer.

Figure 4:
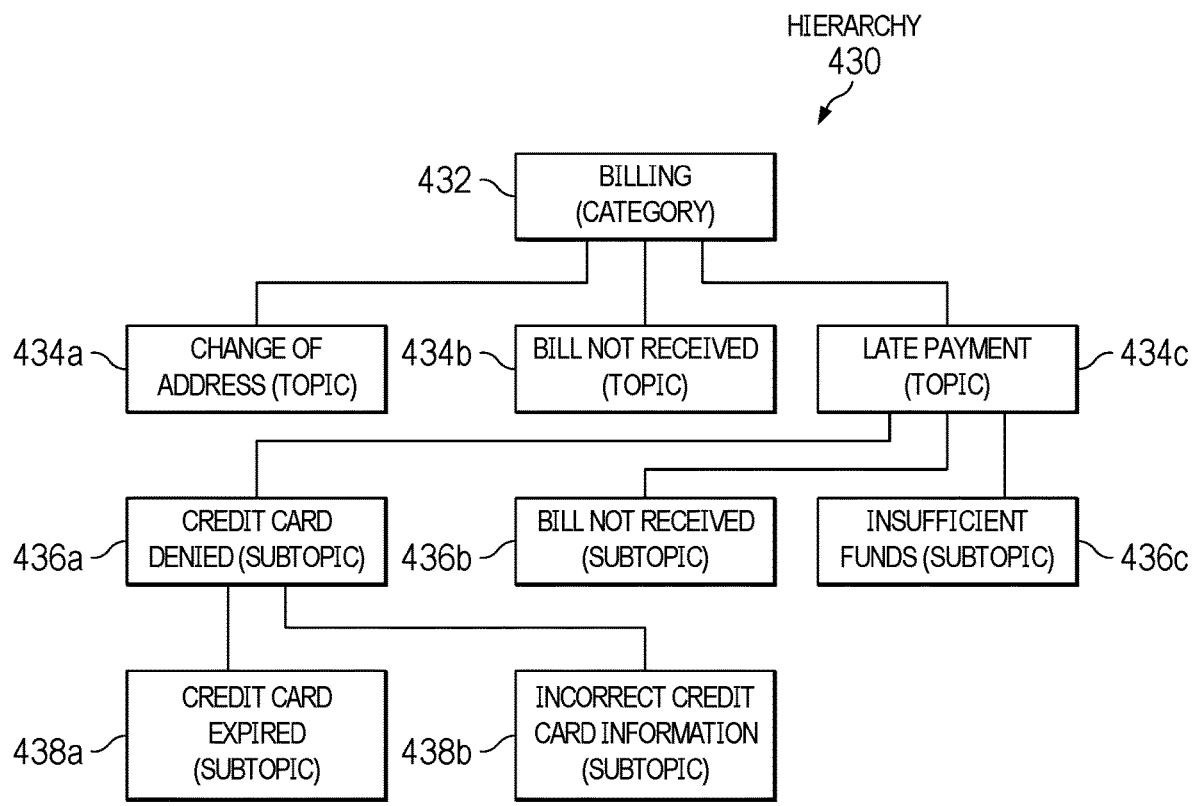
FIG. 4 illustrates a hierarchy of topics according to an embodiment.

Hierarchy data 308 stored on database 134 of cloud datastore 130 comprises data which describes the structure of category 432, topic 434, and/or subtopic 436-438 relationship of topic data 306 (see FIG. 4). In one embodiment, hierarchy data 308 describes the structure of the database and the relationship of categories 432, topics 434, and/or subtopics 436-438 to one another.

FIG. 4 illustrates an exemplary hierarchy 430. To further explain the operation of hierarchy data 308 an example is now given. In the following example, a category 432 "billing" comprises three topics 434*a-c* "Change of Address," Bill Not Received," and "Late Payment." As illustrated, the topic "late payment," 434*c* comprises three subtopics 436*a-c* "Credit Card Denied," "Bill Not Received," and "Insufficient Funds." The subtopic "Credit Card Denied" 436*a* comprises two subtopics 438-*a-b* "Credit Card Expired," and "Incorrect Credit Card Information." Although one category, three topics, and five subtopics are illustrated, embodiments contemplate any number of categories, topics, and/or subtopics, according to particular needs. Each category 432, topic 434, and/or subtopic 436 and 438 may comprise none or any number of subtopics according to particular needs.

In addition, or as an alternative, each category 432, topics 434, and/or subtopic 436 and 438 may be placed multiple times in the hierarchy to permit an entity to easily navigate to them based on a particular end user system interaction. As an example only and not by way of limitation, "Bill Not Received," 434*b* and 436*b* may be both a topic 434 and subtopic 436 depending on the particular circumstances surrounding an end user system interaction. For example, if end user system 120*a-n* contacts one or more entities 140 immediately requesting from the billing department a bill which was not received, it may be a topic. When end user system 120*a-n* contacts the billing department inquiring about a late payment charge, which through end user system 120*a-n* interaction the entity determines was caused by a bill not received, "Bill Not Received" may be a subtopic 436*b*.

Returning to FIG. 3, end user data 310 stored on database 134 of cloud datastore 130 comprises data describing the identity of end user system 120*a-n* and the cost and types of services purchased or subscribed to by the end user system 120*a-n*. End user data 310 comprises identity data which may include, for example, the name, address, email, phone IP address, company or any other data useful in describing the identity of the end user system including age, marital status, race, number of children, and other demographic information. In some embodiments, end user data 310 additionally comprises purchases, sales, subscriptions, purchase history, sales history, and/or other financial data describing the relationship of the end user to one or more entities 140 or any other goods or services provider. In this way, end user data 310 provides customer management system 100 with information about the revenue that each of end user system 120a-n provides to the entity or is likely to provide to the entity for any given time period.

Calendar data 312 stored on database 134 of cloud datastore 130 comprises data comprising dates and times of tickets, notifications, or events useful to a representative of one or more entities 140. Calendar data 312 may be generated by interface module 322 to alert entity 140 of particular end user systems 120a-n to be contacted and schedule certain tasks to be taken in relation to that particular end user system 120a-n. The interface module 322 may generate calendar data 312 and schedule tasks to be taken based on response time, resolve time, event type for a topic, channel, or the like. For example, if an end user system 120a-n has recently contacted one or more entities 140 about a problem with poor internet connectivity, interface module 322 generates and schedules a task based on the resolve time indicated for the topic related to poor internet connectivity and indicates to entity 140 to check the internet connectivity of that end user system 120a-n by placing the task in calendar data 312. The user interface then displays calendar data 312 on a calendar dropdown display 1500, as illustrated in more detail in FIG. 15.

Notifications data 314 stored on database 134 of cloud datastore 130 comprises data reflecting alerts or notes to a representative of one or more entities 140. In some embodiments, notifications data 314 is displayed by notification dropdown 1400 (See FIG. 14) of dashboard 1200.

Response data 316 stored on database 134 of cloud datastore 130 comprises data that describes the responses of one or more entities 140 to one or more end user systems 120a-n. Response data 316 comprises the resolve time and channel of communication between one or more entities 140 and one or more end user systems 120a-n, topic data 306 corresponding to the communication, status data of the communication, the response time and the response channel, if the communication was a repeat of an earlier topic 434, and/or data uniquely identifying the communication, such as a ticket number.

Score data 318 stored on database 134 of cloud datastore 130 comprises the score of an end user system 120a-n. Score data 318 comprises the value of the score generated by scoring module 320 for each end user system 120a-n. In some embodiments, score data 318 additionally comprises aggravation score values, evaporation period values, repeat issue penalty values, overage penalties and/or equations, parameters, weighting factors and/or constants to generate the scores, values, and penalties. In embodiments, where one or more of the aggravation score values, evaporation period values, repeat issue penalty values, and/or overage penalties are associated with a topic 434, amount or value of services purchased by the end user, the channel used by end user system 120a-n to contact the entity 140, the status of an end user system 120a-n, and/or the identity or demographic of the end user system 120a-n, score data 318 may comprise different aggravation score values, evaporation period values, repeat issue penalty values, and/or overage penalties based on each association.

For example, each of the aggravation score values, evaporation period values, repeat issue penalty values, and/or overage penalties may be based on the various associations just described and each value or penalty in the score data 318 may comprise a different number for each associations. Each combination of associations may additionally have its own value or penalty. By way of example only and not by way of limitation, continuing with the example of a customer service center as an entity 140 and an end user system 120a-n as a customer of cloud-based web email and VOIP, an aggravation score for a customer may be 10 when the topic is "password reset," and 70 when the topic is "dropped call." This difference in aggravation score value indicates that a customer is likely to be more aggravated when the VOIP system drops a phone call, than when then the customer simply wishes to reset a password.

By way of a further example and not by way of limitation, analytics module 228 assigns each end user system 120a-n to a group by customer, company, or various other sorting strategies, such as by identity or demographics. In this manner, analytics module 228 generates a different value or penalty based on the identity of end user system 120a-n and stores the value in score data 318. In this manner, analytics module 228 determines that end user systems 120a-n which comprise, for example, owners of NISSAN™ automobiles are less easily aggravated than owners of, for example, FORD™ automobiles, and may thereby assign a lower evaporation period value in score data 318 to NISSAN™ owners. By way of a further example, analytics module 228 may determine that lawyers are more easily aggravated than florists, and thereby assigns a higher aggravation score to lawyers than florists and stores the aggravation scores in score data 318.

Figure 5:
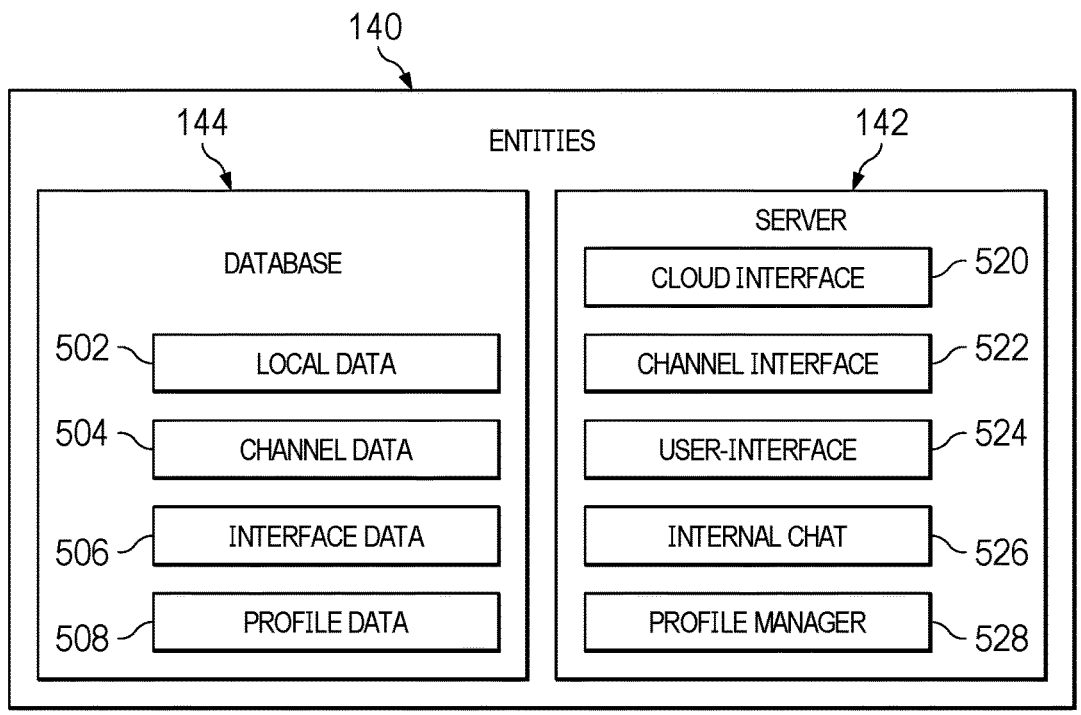
FIG. 5 illustrates the entities of FIG. 1 according to an embodiment.

FIG. 5 illustrates one or more entities 140 of FIG. 1 in greater detail according to an embodiment. One or more entities 140 comprises server 142 and database 144. Server 142 of one or more entities 140 comprises cloud interface 520, channel interface 522, user interface module 524, internal chat 526 and profile manager 528.

According to some embodiments, one or more entities 140 comprise any entity, such as, for example, a business, company, enterprise, distributor, retailer, call-center, CRM specialist system, customer service system, help desk system, or any entity which communicates with customers, either its own customers or the customers of another entity. These one or more entities 140 utilize customer management system 100 in order to monitor, score, and analyze the interactions and communications between end user systems 120a-n and the entities 140. In this manner, entities 140 generate scores and metrics to gauge the sentiment of the end user systems 120a-n, such as customers, towards the entities 140. Based on these scores and metrics, system 100 provides numerous benefits as described herein.

According to some embodiments, entities 140 comprise social media services such as FACEBOOK, TWITTER, or the like. According to these embodiments, social media services store a customer sentiment or question relating to an end user 120a-n interaction with entity 140. These sentiments may be in the form of a FACEBOOK "post" or a TWITTER "tweet" which indicates a positive, negative, or neutral sentiment about the interaction between the end user 120a-n and the entity 140. Additionally, the question may be an indication of one or more problems that relates to a topic below. According to these embodiments, the sentiments or questions are monitored by one or more entities 140 and the sentiments or questions are scored according to the procedure for generating a status of an end user system 120a-n of a customer interaction over a channel regarding a topic as indicated below.

According to some embodiments, entities 140 comprise communication services such as an email service provider, VOIP or telephony provider, or any provider of communications. According to these embodiments, the communication services interact with other entities 140 to provide all the services indicated below with respect to entities. For example, an entity 140 which is a call-center may use the email and/or telephone services of another entity 140 which is a communication service. According to these embodiments, some data may be stored at databases of one or more entities 140 as indicated above and channels between end user systems 120*a-n* may pass between end user systems 120*a-n* and any one or more entities 140.

Cloud interface 520 enables one or more entities 140 to upload and download data to and from database 134 of cloud datastore 130 and utilize one or more of the modules on server 132 of cloud datastore 130. In one embodiment, cloud interface 520 acts as a terminal to allow representatives at one or more entities 140 to utilize data and modules at cloud datastore 130. In some embodiments, cloud interface 520 interfaces with cloud datastore 130 to ensure that data on database 134 of cloud datastore 130 is synced with data on database 144 of one or more entities 140.

Channel interface 522 generates, receives, and monitors communication between one or more entities 140 and end user systems 120*a-n* and among one or more entities 140. Channel interface 522 comprises one or more of VOIP, email, internet or web-based chat, and/or other types of communication systems useful for allowing an end user system 120*a-n* to contact one or more entities 140 or one or more entities 140 to contact each other. For example, channel interface 522 comprises communication systems which initiate or receive communication over channels to communication devices 124 of end user systems 120*a-n*. Additionally, channel interface 522 records the time, duration, date, voice, text, and other information transmitted over the channels. In some embodiments, the information recorded by the channel interface 522 is stored in local data 502 before it is offloaded to cloud datastore 130 and stored in ticket data 304 and response data 316.

User interface module 524 comprises the one or more elements or features of user interface 700 (see FIG. 7), such as menu bar 702, submenu 722, and task interface 730. In addition or as an alternative, user interface module 524 comprises one or more elements or features of dashboard 1200 (see FIG. 12), such as dashboard menu 1201, dashboard toolbar 1203, create new ticket shortcut 1205, information search 1206, end user information bar 1207, case access panel 1209, ticket list display 1212, current ticket topic 1215, topic keyword 1216, ticket event reply shortcut 1217, create new ticket event shortcut 1218, current ticket information 1219, activity display shortcut 1220, customer display shortcut 1221, statistics display shortcut 1222, history look back-period dropdown 1223, channel notifications 1224*a-c*, and activity panel 1229. Furthermore, according to some embodiments, user interface module 524 comprises the elements and features of each these aforementioned elements and features as described in more detail below in connection with FIGS. 7-9C and FIGS. 12-25.

Internal Chat 526 comprises a communications system among entities 140. For example, internal chat 526, according to some embodiments, comprises a text- or voice-based messaging system that provides entities 140 a platform to improve scores of end user systems 120*a-n* by communicating information about end user systems 120*a-n* from one entity 140 to another entity 140.

Profile Manager 528 receives and sorts information about an entity 140. For example, according to some embodiments, the profile manager 528 generates a user profile for an entity 140 including a photograph, personal information, a list of end user systems 120*a-n* associated with the entity 140 (such as assigning a particular customer to a particular entity), and the like. The profile manager 528 stores the information in profile data 508.

Database 144 of one or more entities 140 comprises local data 502, channel data 504, interface data 506 and/or profile data 508.

Local data 502 stored on database 144 of one or more entities 140 comprises a local cache for any data or information generated by entities 140 before being offloaded to cloud datastore 130. In addition or as an alternative, local data 502 comprises any secure or private data (such as trade secrets, classified information, or the like) that must be stored locally to entity 140.

Channel data 504 stored on database 144 of one or more entities 140 comprises the organization and setup of the channel interface 522. According to some embodiments, channel data 504 comprises the particular communication channels which are open to a particular end user system 120*a-n* or entity 140, the times which the communication channels are open, the protocols or metadata which describe the communication, and/or any other configuration data and setup data necessary to configure the channel interface 522.

Interface data 506 stored on database 144 of one or more entities 140 comprises the configuration, setup, and display data of user interface module 524. Profile data 508 stores the profile information generated and stored by profile manager 528 such as photographs, identification information and associations between end use systems 120*a-n* and entities 140.

Figure 6:
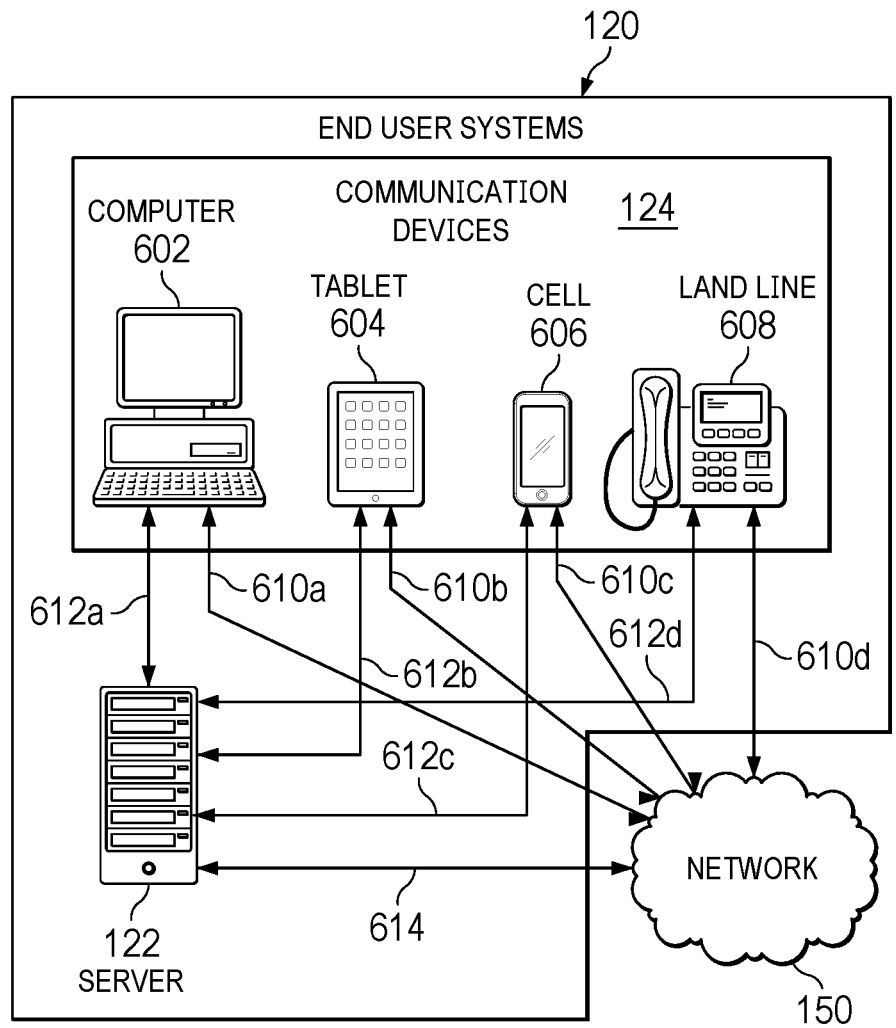
FIG. 6 illustrates the end user of FIG. 1 according to an embodiment.

FIG. 6 illustrates end user system 120*a-n* of FIG. 1 in greater detail according to an embodiment. End user system 120*a-n* comprises communication devices 124, server 122, and/or communication links 610-614 which are configured to communicate with network 150, one or more system administrators 110, and/or one or more cloud datastores 130, and/or one or more entities 140. In one embodiment, one or more end user systems 120*a-n* may each operate on separate computer systems or may operate on one or more shared computer systems. Each of these one or more computer systems may be a work station, personal computer (PC) 602, network computer, laptop computer, notebook computer, tablet-type device 604, smartphone 606, terminal, or any other suitable communication device 124. In some embodiments, the end user system 120*a-n* is a telephone 608 or a server 122.

One or more tablet-type devices 604 or smartphones 606 comprises a processor, memory and data storage. The processor executes an operating system program stored in memory to control the overall operation of one or more tablet-type devices 604 and/or smartphones 606. For example, the processor controls the reception of signals and the transmission of signals within customer management system 100. The processor executes other processes and programs resident in memory, such as, for example, registration, identification or communication and moves data into or out of the memory, as required by an executing process.

Those skilled in the art will recognize that one or more specific examples of end user systems 120*a-n* are given by way of example and that for simplicity and clarity, only so much of the construction and operation of one or more end user systems 120*a-n* as is necessary for an understanding of the present invention is shown and described. Moreover, it is understood that one or more end user systems 120*a-n* should not be construed to limit the types of devices in which embodiments of the present invention may be implemented. For example, one or more end user systems 120*a-n* may be any device, including, but not limited to, conventional cellular or mobile telephones, smart mobile phones, an IPHONE™, an IPAD™, wireless tablet devices, paging devices, personal digital assistant devices, short message service (SMS) wireless devices, portable computers, or any other device capable of wireless or network communication.

In addition, or as an alternative, one or more system administrators 110, one or more cloud datastores 130, and/or one or more entities 140 provides one or more end user systems 120a-n access to entities 140 in order to communicate over one or more channels. Among other things, embodiments enable customer service, such as troubleshooting and product set up, maintenance requests, refunds, providing product information, scheduling routine maintenance, requesting on-site maintenance, walk-throughs, company information, sales, taking purchase orders, scheduling meetings, changing passwords, website help, and the like.

FIGS. 7-9C illustrate user-interface 700 according to an embodiment. User-interface 700 provides for creating topics and scoring end user interactions with one or more entities 140 generated by interface module 322 of server 132 of cloud datastore 130, cloud interface 520 of server 142 of one or more entities 140, and/or system administration module 222 of server 112 of system administrator 110.

To further explain the operation of FIGS. 7-9C in customer management system 100, an example is now given. In the following example, user interface module 524 of an entity 140 generates a user interface 700. Entity 140 uses user interface 700 to create, modify, and manage topics and/or scores, penalties, and values associated with the topics. As an example only and not by way of limitation, user interface 700 provides entity 140 with options to generate new topics, reorganize the hierarchy of topics, assign scores, penalties, and values to one or more topics, and associated notes and wikis with topics, as explained below.

Figure 7:
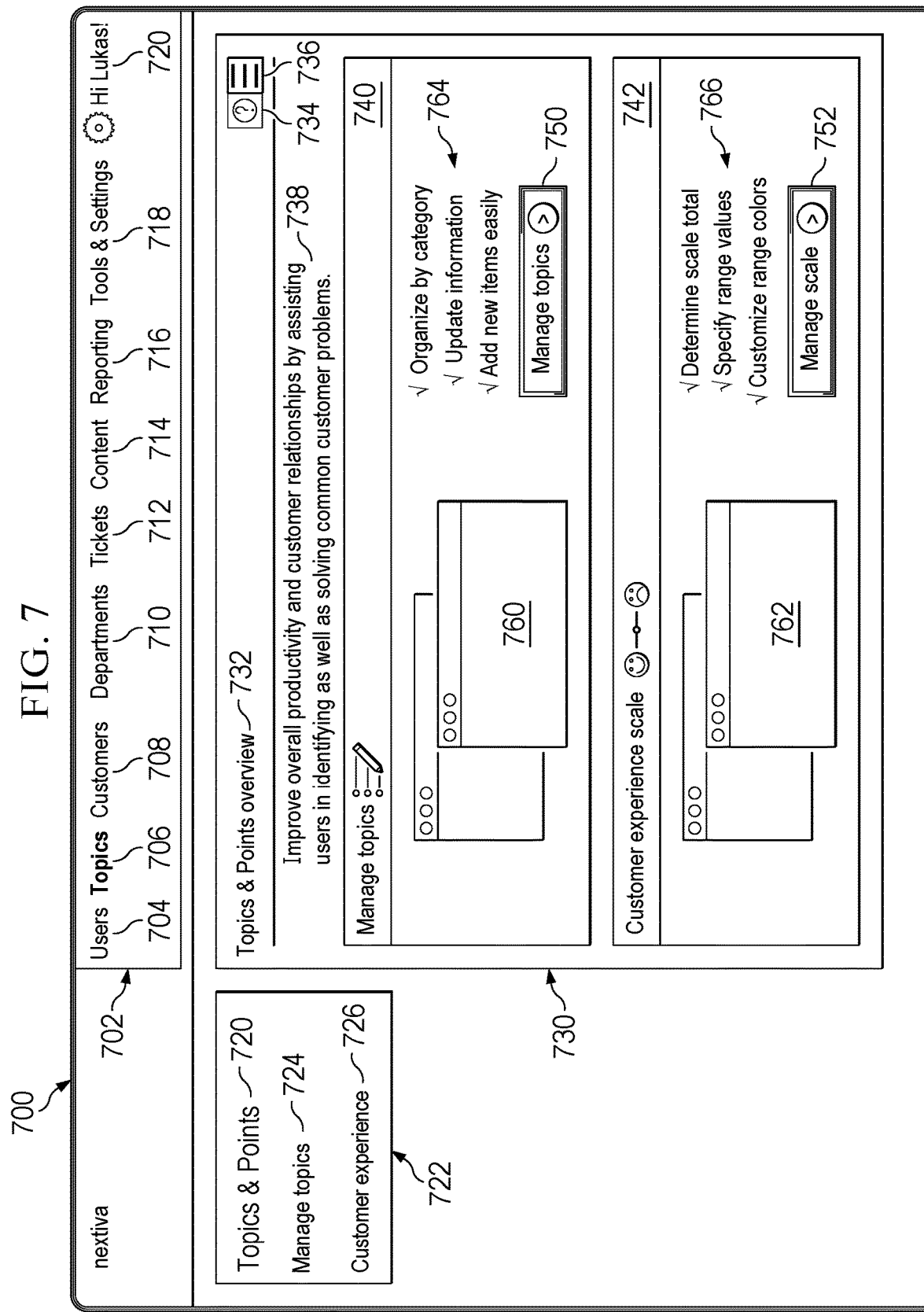
FIG. 7 illustrates a user interface according to an embodiment.

In one embodiment, user-interface 700 of FIG. 7 comprises a menu bar 702, submenu 722, and task interface 730. Although particular elements are shown and described in association with user-interface 700, embodiments contemplate any one or more elements or features, according to particular needs.

Menu bar 702 comprises one or more user-selectable top-level menu choices. In some embodiments, these top-level menu choices 704-718 comprise: users 704, topics 705, customers 708, departments 710, tickets 712, content 714, reporting 716, and tools & settings 718. In other embodiments, menu bar 702 also comprises a user-selectable menu choice for adjusting log-in and user settings 720 (indicated by a gear icon in FIG. 7).

When top-level menu choice 704-718 is selected from menu bar 702, user-interface 700 is updated to display content representing that selection. For example, when topics 706 is selected from menu bar 702, a toolbar selection area 720 displays a menu related to the selection, "Topics & Points."

According to some embodiments, each of the top-level menu choices 704-718 has one or more submenu items. The submenu items may be listed in a submenu 722. For example, when top-level menu choice Topics 706 is selected from menu bar 702, submenu 722 displays submenu choices "manage topics" 724 and "customer experience" 726 and task interface 730 is updated to display selectable items associated with the selected menu choice.

Task interface 730 comprises a dynamic area which displays text, buttons, text or number entry boxes, and/or other types of dynamic elements that are configurable to allows for the input, display, or configure CRM device when a submenu choice 724-726 is selected. Alternatively, or in addition, task interface 730 comprises an overview 732, which in turn comprises overview information 738, help button 734, menu tool 736, and one or more subtopic overviews 740-742. The subtopic overviews 740-742 comprises screenshots 760-762, information 764-766, and selectable buttons 750-752, each of which relates to one or more subtopics. For example, as shown in FIG. 7, the topics and points overview 732 comprises subtopic overviews for manage topics 740 and customer experience scale 742. Each of the subtopic overviews has one or more screenshots 760-762 which display on the user interface examples or pictures of the updated task interface for the one or more subtopics. Additionally, the subtopic overview for manage topics 740 gives information 764 regarding that subtopic, including "organize by category," "update information," and "add new items easily." A selectable button 740 allows for the selection of that subtopic, which causes the task interface 730 to update the display as shown in FIG. 8A.

Figure 9A:
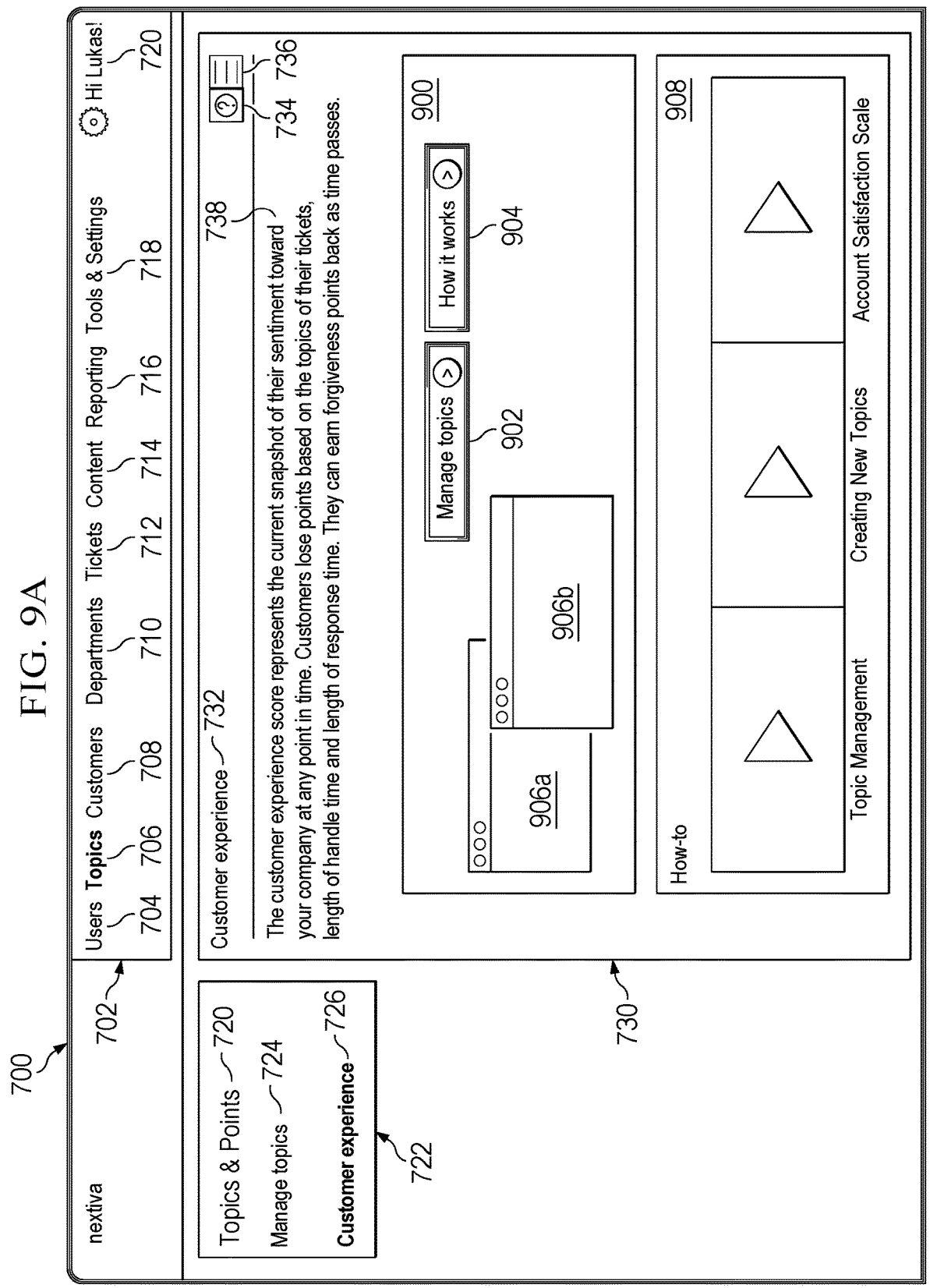
FIGS. 9A-9C illustrate managing a customer experience scale according to the user interface of FIG. 7.

The subtopic overview for customer experience scale 742 gives information 766 regarding that subtopic, including "determine total scale," "specify range values," and "customize range colors." A selectable button 752 allows for the selection of that subtopic, which causes the task interface 730 to update the display as shown in FIG. 9A.

Figure 8A:
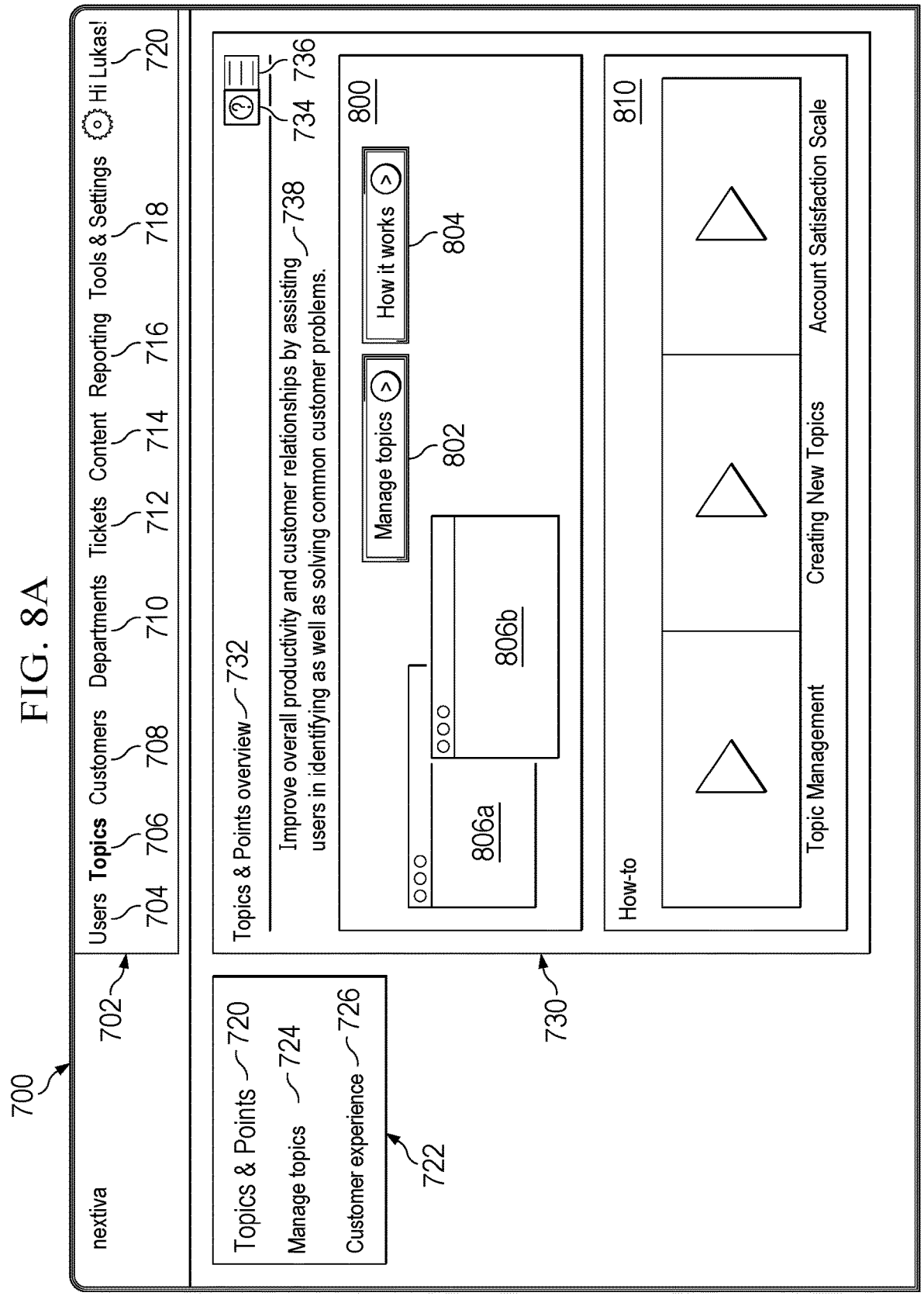
FIGS. 8A-8J illustrate managing a topic according to the user interface of FIG. 7.

FIG. 8A illustrates a task interface 730 updated to display a manage topics overview menu 800. Manage topics overview menu 800 comprises a manage topics button 802, a "how it works" button 804, one or more screenshots 806a-b, and a how-to instruction area 810.

Figure 8B:
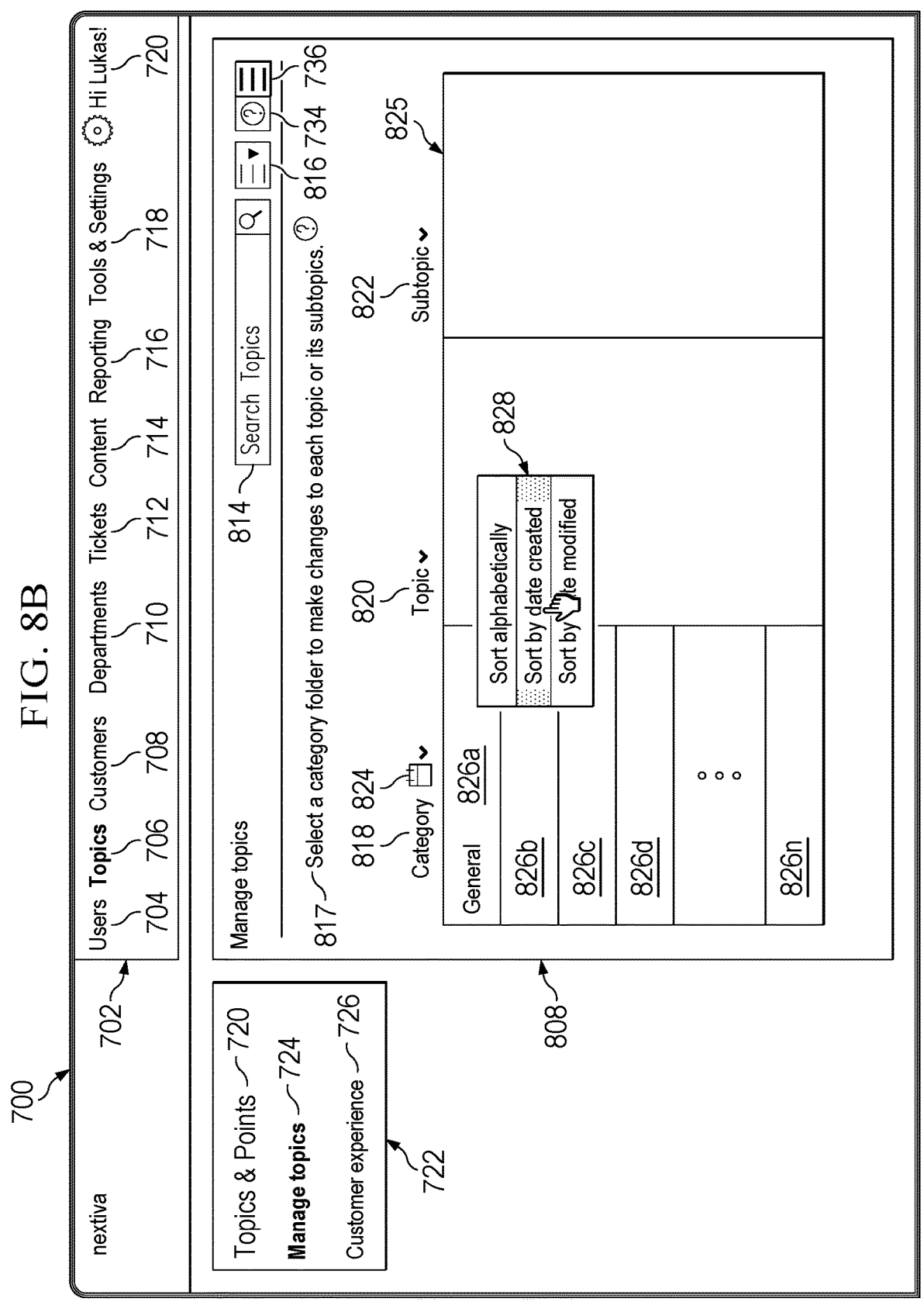

Selection of manage topics button 802 causes the task interface 730 to display the manage topics main interface 808 as illustrated in FIG. 8B.

Manage topics main interface 808 comprises a search bar 814, a menu dropdown 816, a help button 734, a menu tool 736, instructional text 817, and a hierarchy organization tool 825.

The hierarchy organization tool 825 comprises a category column 818, a topic column 820, and a subtopic column 822. Although illustrated with one category column 818, one topic column 820, and one subtopic column 822, embodiments contemplate any number of category columns 818, topic columns 820, and subtopic columns 822.

The category column 818 comprises a list of selectable categories 826a-n. The list of selectable categories 826a-n may be sorted alphabetically, by date created, by date modified or any other useful organization strategy. Category sort dropdown 824 presents options 828 for sorting the list according to these one or more organization strategies. According to some embodiments, one of the selectable categories 826a-n is a general category 826a. The general category 826a comprises all topics that are not sorted into one of the other selectable categories 826b-n.

Figure 8C:
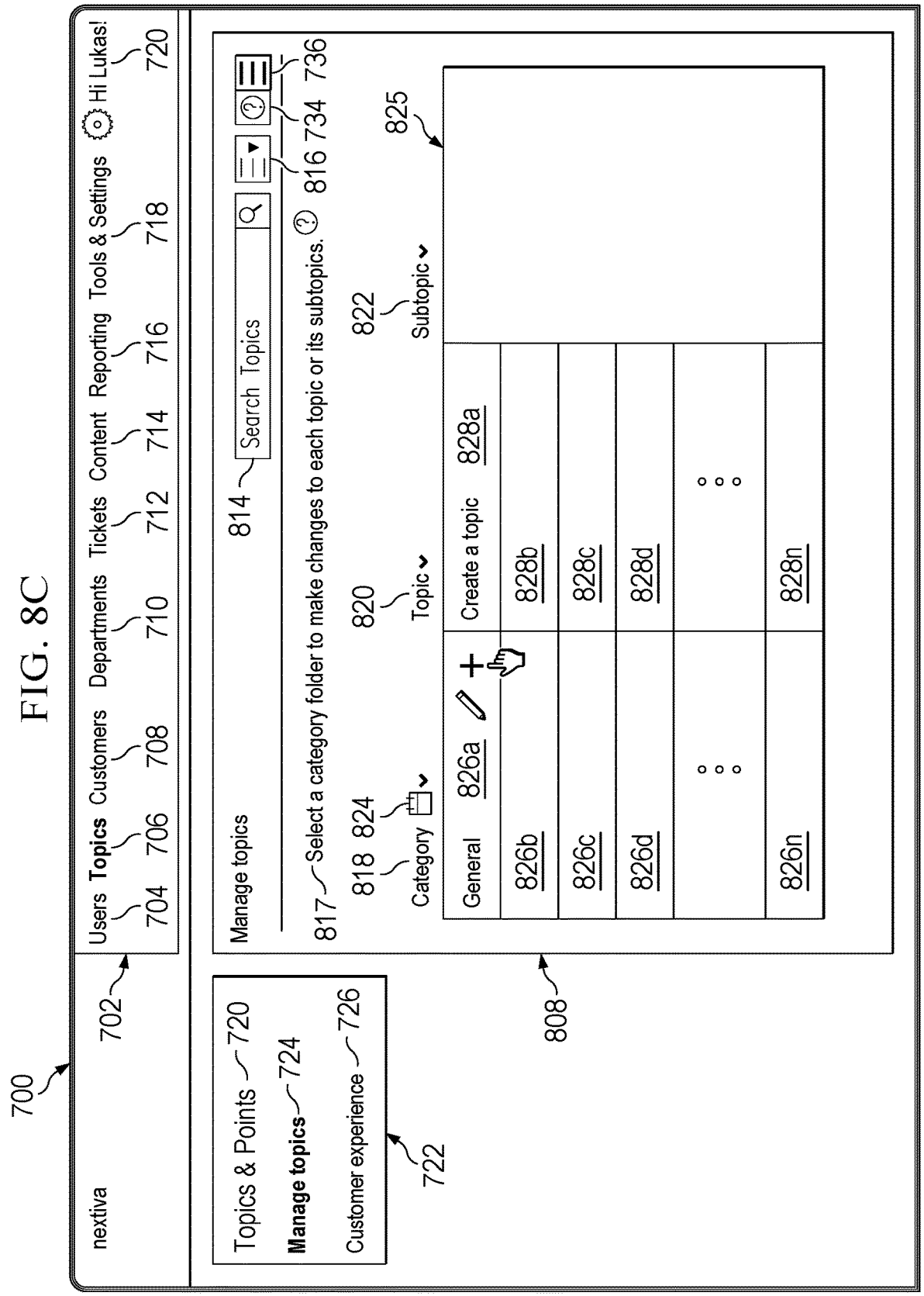

In response to a selection of a category 826a-n, the topic column 820 displays a create-a-topic button 828a and topics 828b-n in the selected category, as illustrated in FIG. 8C.

Figure 8D:
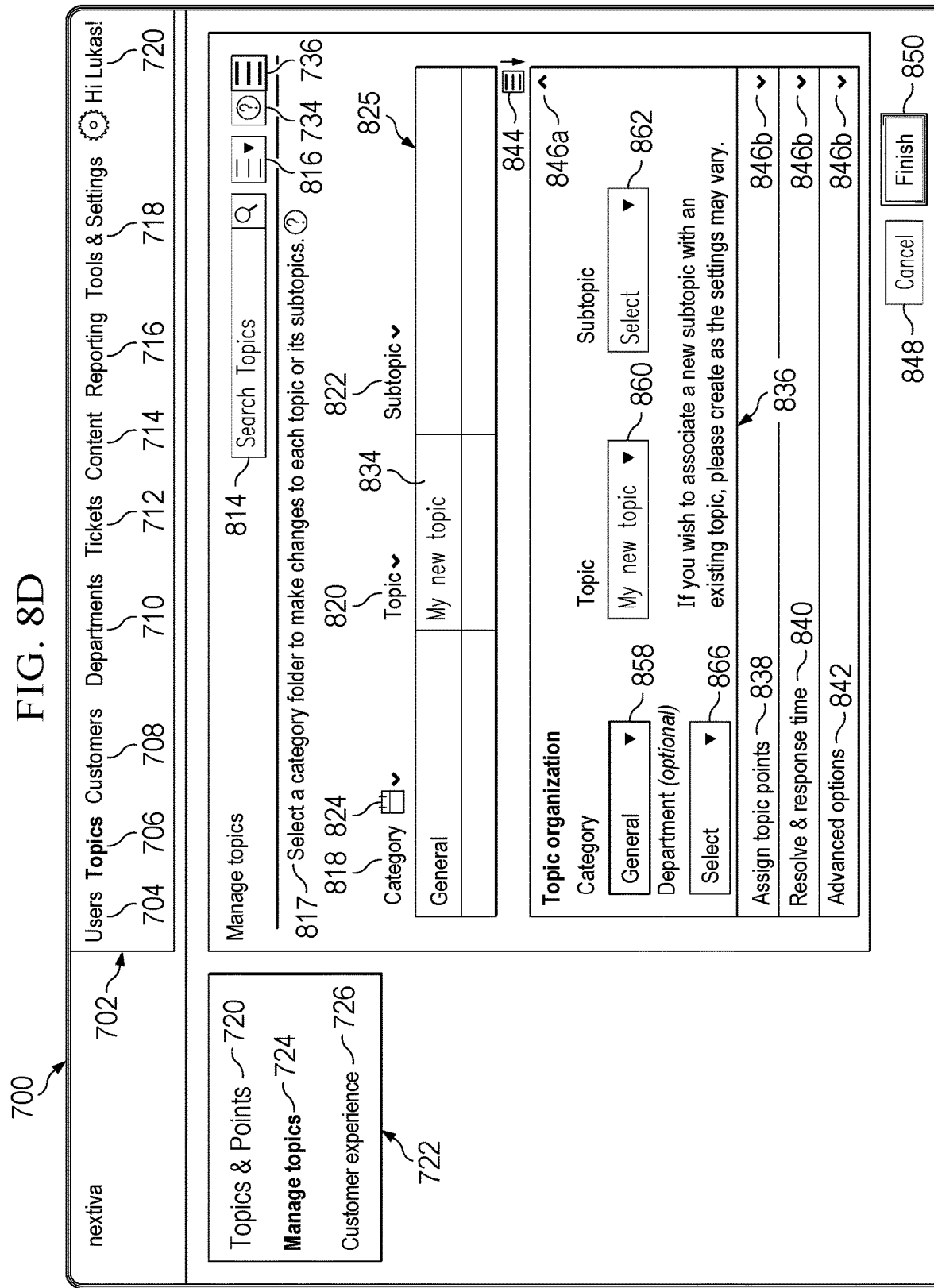

If the desired topic 828 is not present in the topic column 820, selection of create-a-topic button 828a generates a display as illustrated in FIG. 8D. The create-a-topic button 828a is replaced by a new topic entry box 834, and expandable topic configuration boxes 836-842 are displayed below hierarchy organization tool 825. Each expandable topic configuration box 836-842 comprises one or more configuration settings, which are optional. For example, embodiments contemplate creation of topics which are not associated with any one or more configuration setting, as explained in more detail in connection with FIGS. 8D-8J. Additionally, embodiments contemplate any one or more of the configuration settings or expandable topic configuration boxes 836-842 to be omitted entirely or configured by system 100 according to preconfigured settings or rules. For purposes of this application, configuration setting refers to any value, rule, hierarchy, points, selection, or other setting in any expandable topic configuration box 836-842.

FIG. 8D illustrates the topic organization expandable topic configuration box 836. The topic organization expandable topic configuration box 836 comprises category display box 858, topic entry box 860, subtopic selection box 862, and department selection box 866. Although illustrated as display boxes, entry boxes or selection boxes, each of the category display box 858, topic entry box 860, subtopic selection box 862, and department selection box 866 may be a display box, text entry box or selection box according to particular needs. When the category display box 858, topic entry box 860, subtopic selection box 862, and department selection box 866 is a display box, the display box simply displays the category, topic, subtopic, or department that is associated with the topic or subtopic currently being managed. When the category display box 858, topic entry box 860, subtopic selection box 862, and department selection box 866 is a text entry box, entering of text into the text entry box changes that category, topic, subtopic, or department that is associated with the topic or subtopic currently being managed. When the category display box 858, topic entry box 860, subtopic selection box 862, and department selection box 866 is a selection box, the selection box displays a dropdown list of a plurality of selectable categories, topics, subtopics, or departments that the user interface 700 associates with the topic or subtopic in response to a selection.

For example, when the category is selected in the category column 818, the category display box 858 displays the category 826*a-n* that is selected. However, where the category display box 858 is a text entry box, entering of text into the text entry box changes the category of the topic which is entered or displayed in the topic entry box 860 or the topic that is selected in the topic column 820.

Above the topic organization expandable topic configuration box 836 is an expander button 844. The expander button 844 expands all of the configuration boxes 836-842 as illustrated in FIG. 8I. Next to each expandable configuration box 836-842 is an individual box expander button 846*a-b*. The individual box expander button 846*a-b* is depicted as an upward facing arrow 846*a* when the configuration box 836-842, which it is next to, is expanded and as a downward facing arrow 846*b* when the configuration box 836-842, which it is next to, is not expanded.

Below the expandable configuration boxes 836-842 is a cancel button 848 and a finish button 850. When the cancel button 848 is selected, the user interface 700 disregards all changes made to the configuration settings.

When the finish button 850 is selected, user interface 700 generated by interface module 322 of server 132 of cloud datastore 130, cloud interface 520 of server 142 of one or more entities 140, and/or system administration module 222 of server 112 of system administrator 110 saves the data entered in the task interface 640 to one or more of databases 114, 144, and/or 134 according to the task displayed in the task interface 730. For example, when the task displayed in the task interface 730 represents a task represented by a selection of "manage topics" 724 or "customer experience" 726 from the submenu 722, the data entered in the task interface 730 is stored in local data 502, topic data 306, hierarchy data 308, score data 318, score data 206, and/or configuration data 204. Other data is stored on appropriate databases as explained elsewhere in this specification.

Figure 8E:
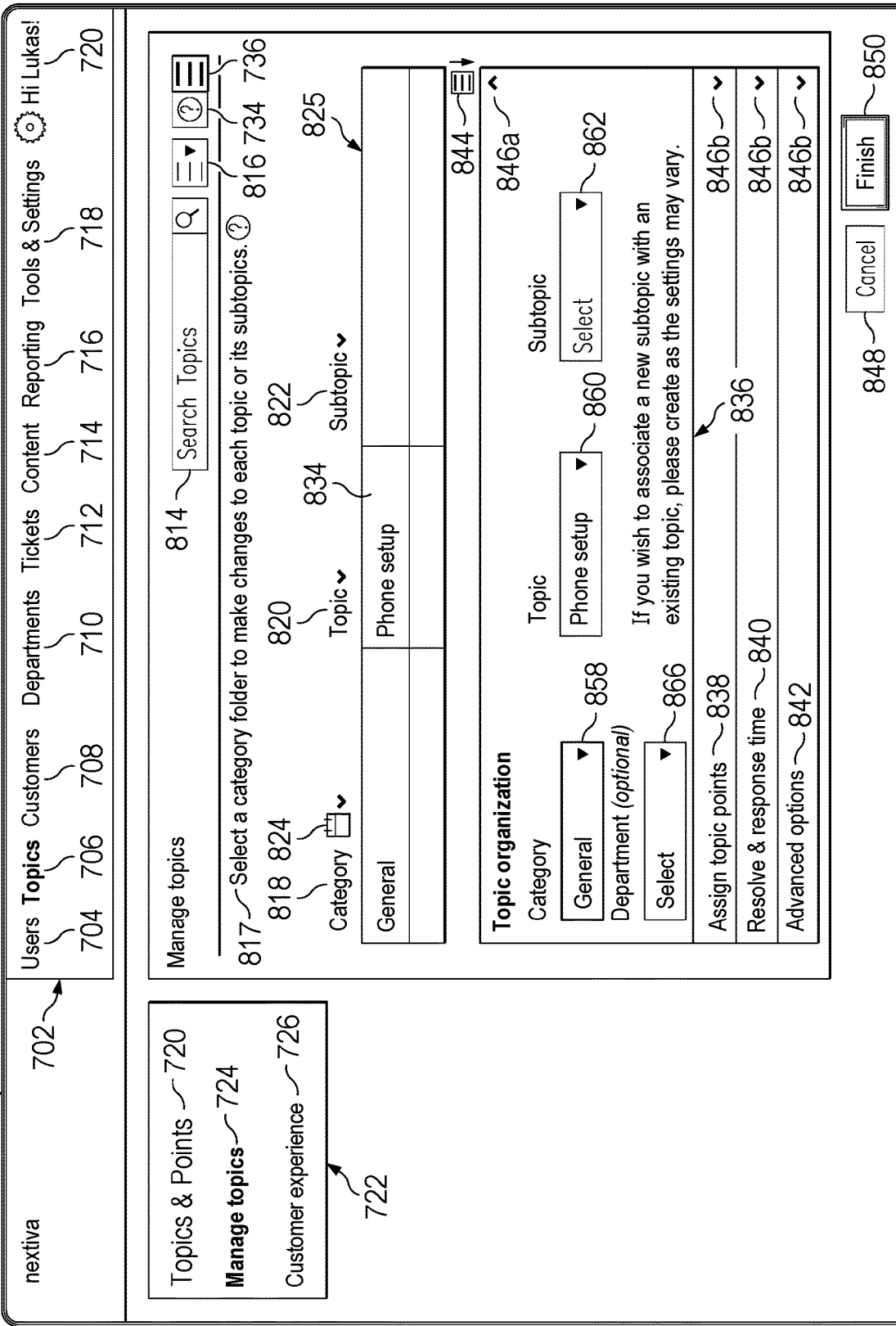

FIG. 8E illustrates entry of a phone setup topic into new topic entry box 834. When phone setup is entered into the new topic entry box 834, the topic entry box 860 is updated to display "phone setup."

Figure 8F:
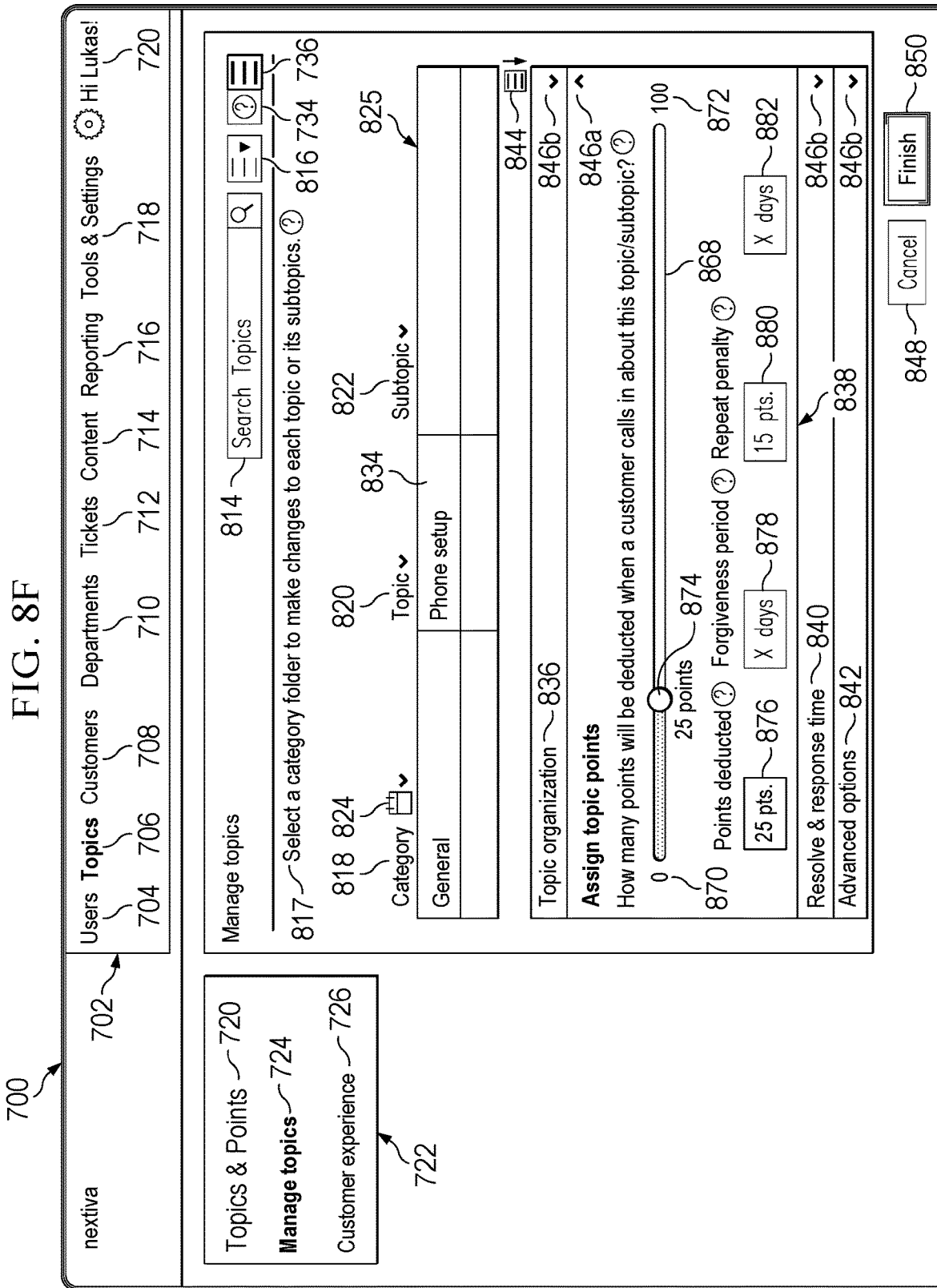

FIG. 8F illustrates expansion of the assign topic points expandable configuration box 838. The assign topic points expandable configuration box 838 comprises a penalty points slider 868, a penalty points entry box 876, a forgiveness period entry box 878, a repeat penalty point entry box 880, and a repeat penalty period entry box 882.

The penalty points slider 868 comprises a bar with a slider 874 which adjusts the amount of penalty points which correspond to the topic selected between a first end 870 and a second end 872. For example, as illustrated in FIG. 8F, the penalty points selected for the topic "phone setup" (selected in the previous figure), is 25, but slider 874 allows adjustment between 0 at a first end 870 of slider 874 to 100 at a second end 872 of slider 874. Additionally or in the alternative, the penalty points are entered into the penalty points entry box 876. Embodiments contemplate the penalty points entry box 876 to update the slider 874 according to the number of penalty points entered into the penalty points entry box 876, or the number appearing in the penalty points entry box 876 to be updated according to the position of the slider 874.

After the number of penalty points are selected for the topic, the number is updated to topic data 306 of database 134 in cloud datastores 130.

In addition or as an alternative, embodiments contemplate satisfaction points which increase a satisfaction score based on a topic related to a positive sentiment. For example, if an end user 120*a-n* calls to compliment entity 140 or purchases new products, the topic would be considered a positive topic and satisfaction points would increase a satisfaction score, if customer management system 100 has adopted a score system where a higher satisfaction score indicates a higher end user 120*a-n* satisfaction. In embodiments where a lower satisfaction score indicates a higher end user 120*a-n* satisfaction, satisfaction points are deducted from the satisfaction score.

Forgiveness period entry box 878 stores an effective time period for the penalty points. The time period may be entered in the number of days (as illustrated) or in terms of seconds, minutes, hours, or any suitable period of time during which the penalty points remain effective against a score associated with the topic selected. For example, if a customer contacts an entity about the "phone setup" topic selected above, 25 penalty points are subtracted from the current satisfaction score. The 25 penalty points remain in effect until the time period entered in the forgiveness period entry box 878 has elapsed—at which point the 25 penalty points are added back to the current satisfaction score. Alternatively, embodiments contemplate the penalty points being added to the current satisfaction score when the customer contacts an entity about the topic selected above, and then subtracted when the forgiveness period has elapsed.

Repeat penalty point entry box 880 stores the number of points which are added or subtracted from the satisfaction score when the customer contacts an entity regarding the topic selected above and the topic is the same topic as an earlier contact from the customer. The repeat penalty point entry box 880 stores any number of points, which may be more, less, or equal to the number of penalty points deducted from the initial customer contact with the entity. The repeat penalty period entry box 882 stores a time period after which the repeat contact from the customer to the entity about the same topic will not accrue any repeat penalty points. The time period may be entered in the number of days (as illustrated) or in terms of seconds, minutes, hours, or any suitable period of time after which the repeat penalty points will not be effective against a satisfaction score.

As an example only and not by way of limitation, if a customer contacts an entity 140 about the "phone setup" topic selected above, 25 penalty points are subtracted from the current satisfaction score. The 25 penalty points remain in effect until the time period entered in the forgiveness period entry box 878 has elapsed—at which point the 25 penalty points are added back to the current satisfaction score. If the same customer contacts the entity about the "phone setup" topic again within the time period entered in the repeat penalty period entry box 882, the number of points entered into the repeat penalty point entry box 880 are subtracted from the current satisfaction score. Alternatively, embodiments contemplate the repeat penalty points being added to the current satisfaction score when the customer contacts an entity 140 about the topic selected above again within the repeat penalty time period, and then subtracted when the forgiveness period has elapsed.

Figure 8G:
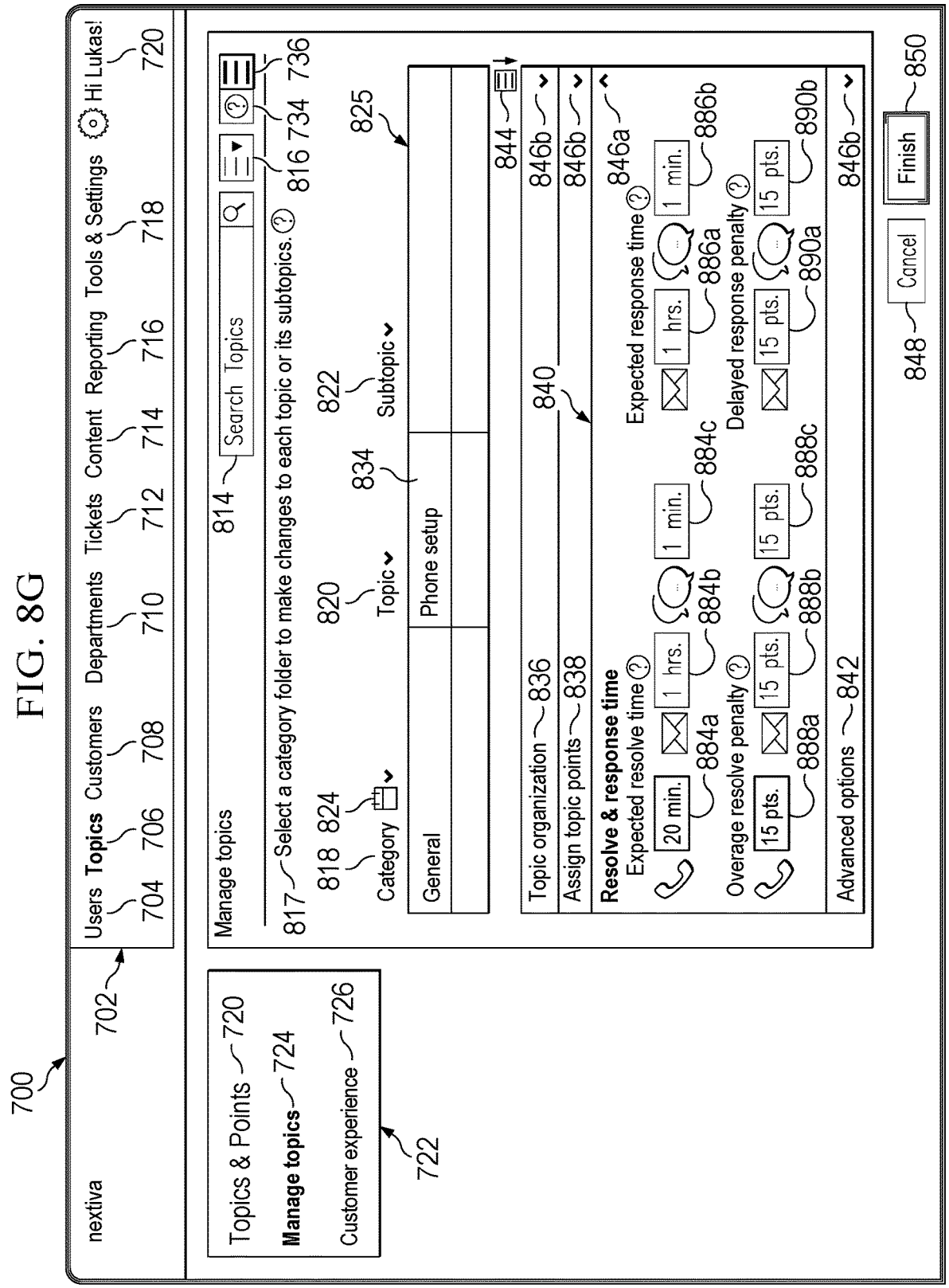

FIG. 8G illustrates expansion of the resolve and response time expandable configuration box 840. The resolve and response time expandable configuration box 840 comprises expected resolve time entry boxes 884*a-c*, expected response time entry boxes 886*a-b*, overage resolve penalty entry boxes 888*a-c*, and delayed response penalty entry boxes 890*a-b*.

The expected resolve time entry boxes 884*a-c* store a time period that is expected to resolve a problem associated with a topic. The expected resolve time may be different for each channel used by an end user to contact an entity, and different expected resolve time entry boxes 884*a-c* are provided for one or more channels (phone 884*a*, email 884*b*, and chat 884*c*).

The expected response time entry boxes 886*a-b* store a time period that is expected to respond to an end user regarding a problem associated with a topic. The expected response time may be different for each channel used by an end user to contact an entity, and different expected response time entry boxes 886*a-b* are provided for one or more channels (email 886*a* and chat 886*b*). Embodiments contemplate an expected response time entry box 886 for a phone channel, for example, if an end user is placed on hold or the end user is contacted by phone in response to an initial inquiry by a different channel.

The overage resolve penalty entry boxes 888*a-c* store a penalty that is subtracted from a satisfaction score if the time to resolve a problem associated with a topic over a channel exceeds the time specified in the expected resolve time entry boxes 884*a-c*. The penalty may be different for each channel used by an end user to contact an entity, and different overage resolve penalty entry boxes 888*a-c* are provided for one or more channels (phone 888*a*, email 888*b*, and chat 888*c*).

The delayed response penalty entry boxes 890*a-b* store a penalty that is subtracted from a satisfaction score if the time for an entity to respond to an end user problem associated with a topic exceeds the time period specified in the expected response time entry boxes 886*a-b*. The delayed response time penalty may be different for each channel used by an end user system 120*a-n* to contact an entity 140, and different delayed response penalty entry boxes 890*a-b* are provided for one or more channels (email 890*a* and chat 890*b*). Embodiments contemplate a delayed response penalty entry box 886 for a phone channel, for example, if an end user system 120*a-n* is placed on hold or the end user system 120*a-n* is contacted by phone in response to an initial inquiry by a different channel.

Figure 8H:
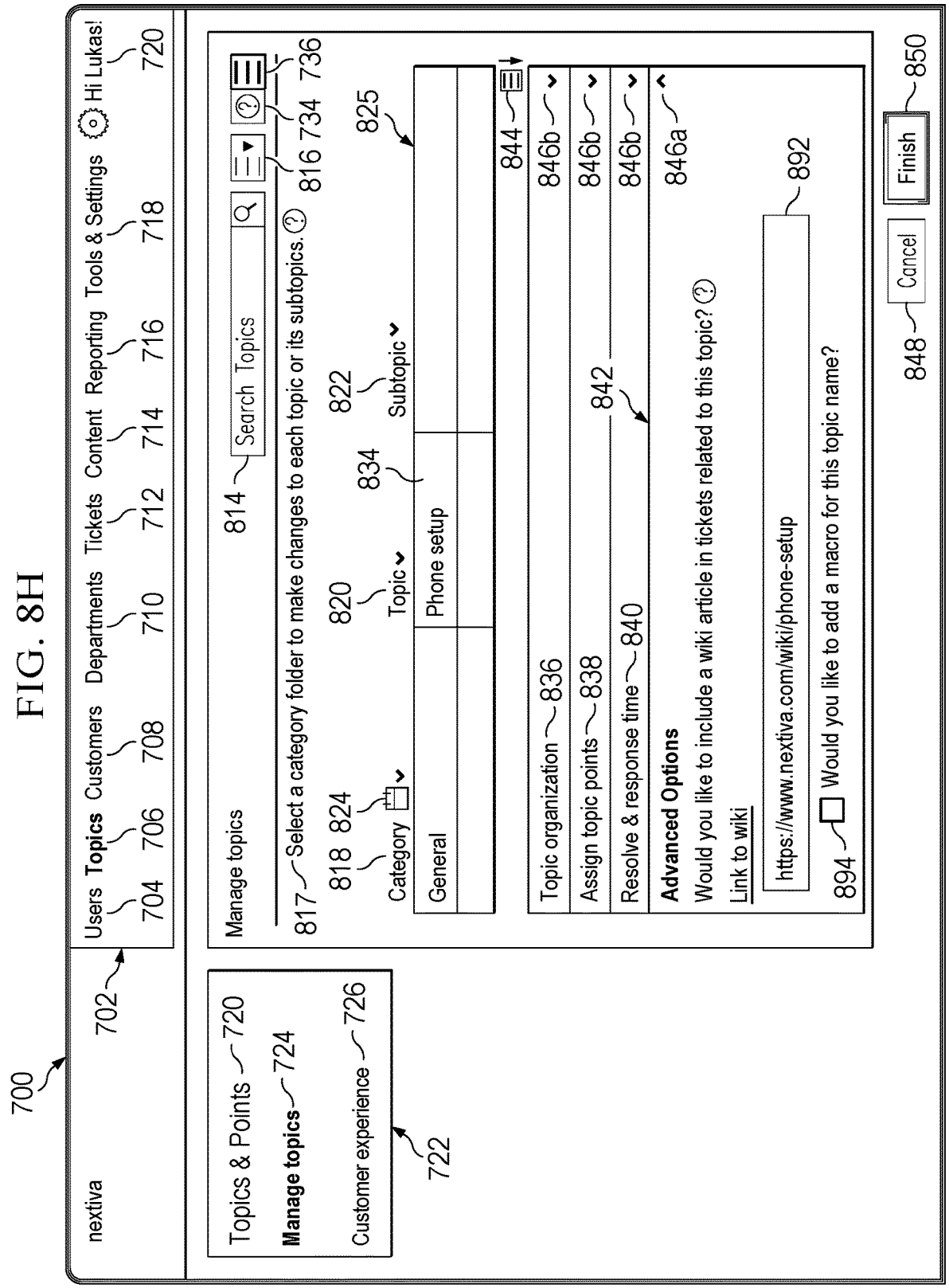
Figures 2, 8I:
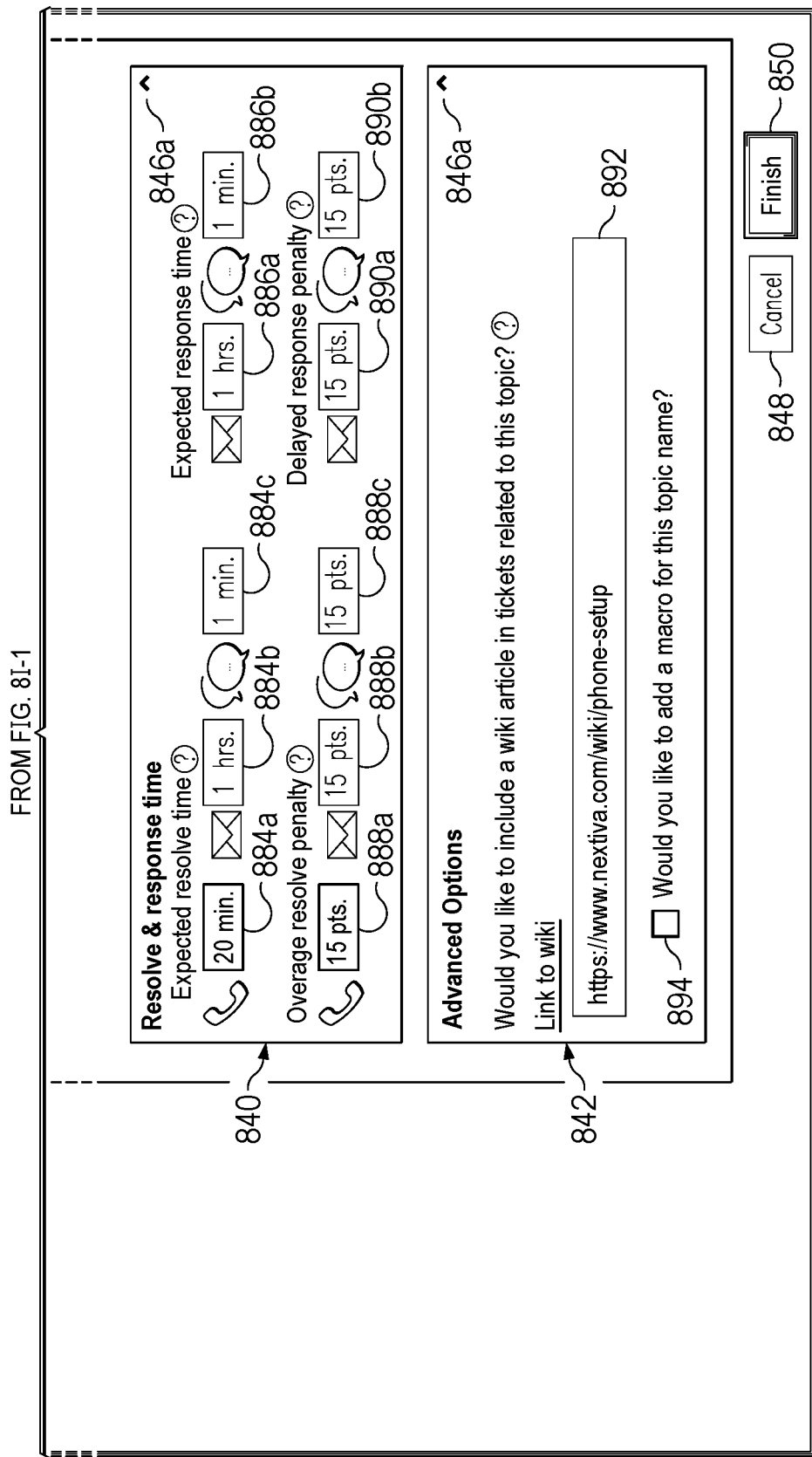

FIG. 8H illustrates expansion of the advanced options expandable configuration box 842. The advanced options expandable configuration box 842 comprises an entry box 892 for a link to a wiki article associated with the topic and a macro box 894 permitting association of a macro with the topic selected above. Embodiments contemplate uploading an attachment to serve as a user internal notification, and/or a customer notification, also known as a note. The user internal notification permits a user to upload by clicking an internal document which guides the one or more entities 140 in responding to an end user system 120*a-n* inquiry related to the task. In addition or as an alternative, a customer notification permits uploading a note which may be sent out to the customer by email, chat, regular mail, or the like, a document which discusses follow up procedures, further help, or other documentation related to the topic 434 selected above.

FIG. 8I, as discussed above, displays the expandable configuration boxes in a fully expanded form. This permits a user of task interface 730 to easily find any configuration settings, or to easily update or change configuration settings for a topic that has been previously created.

Figure 8J:
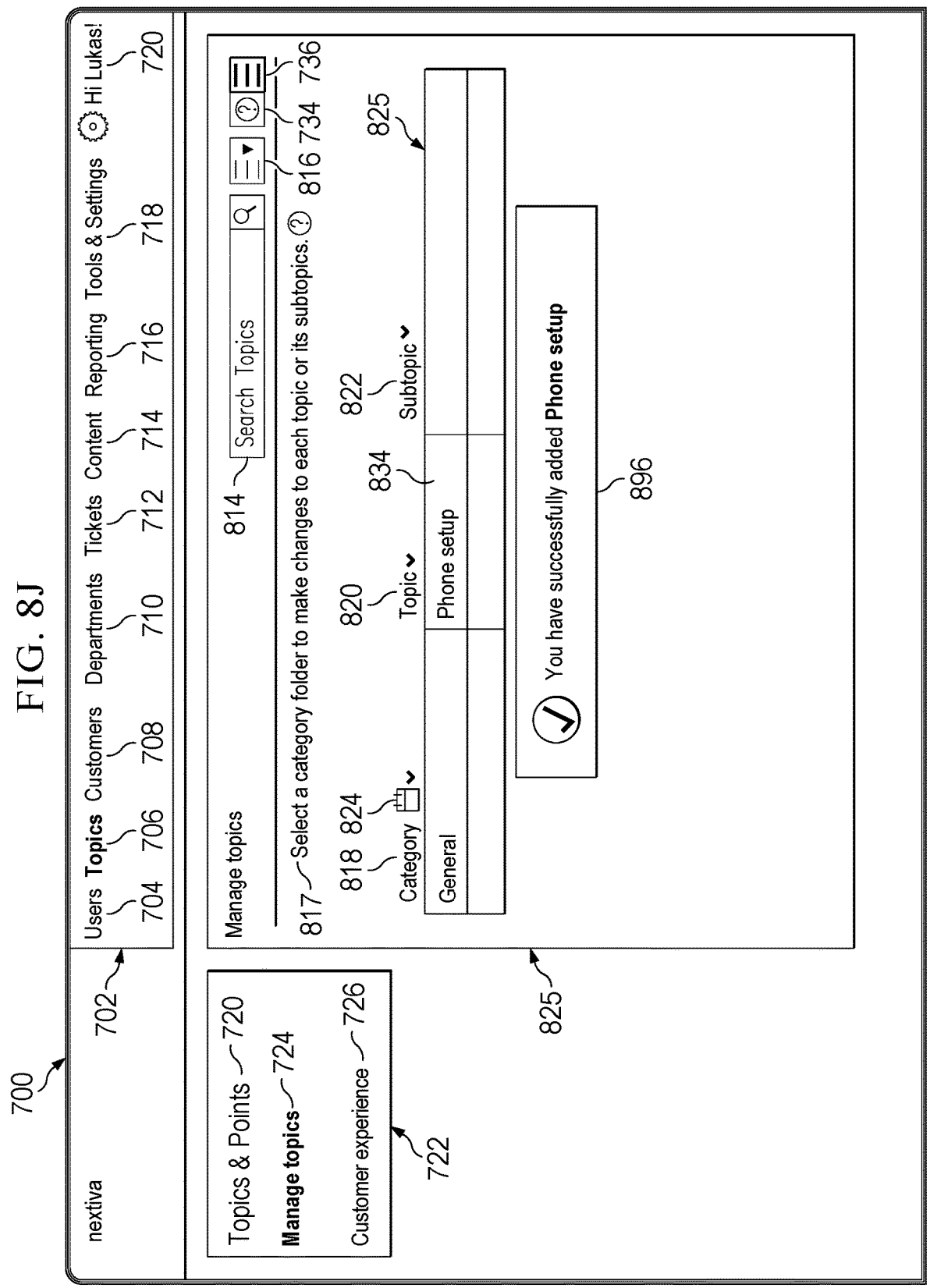

FIG. 8J illustrates hierarchy completion tool 825 after the finish button 850 has been selected. The hierarchy completion tool 825 display a confirmation box 896 that indicates that the topic setup has been completed. Additionally, the information from the configuration settings is updated and stored to the associated databases as discussed above.

FIG. 9A illustrates a task interface 730 updated to display a customer experience overview menu 900. The customer experience overview menu 900 comprises a manage scale button 902, a "how it works" button 904, one or more screenshots 906*a-b*, and a how-to instruction area 908.

Figure 9B:
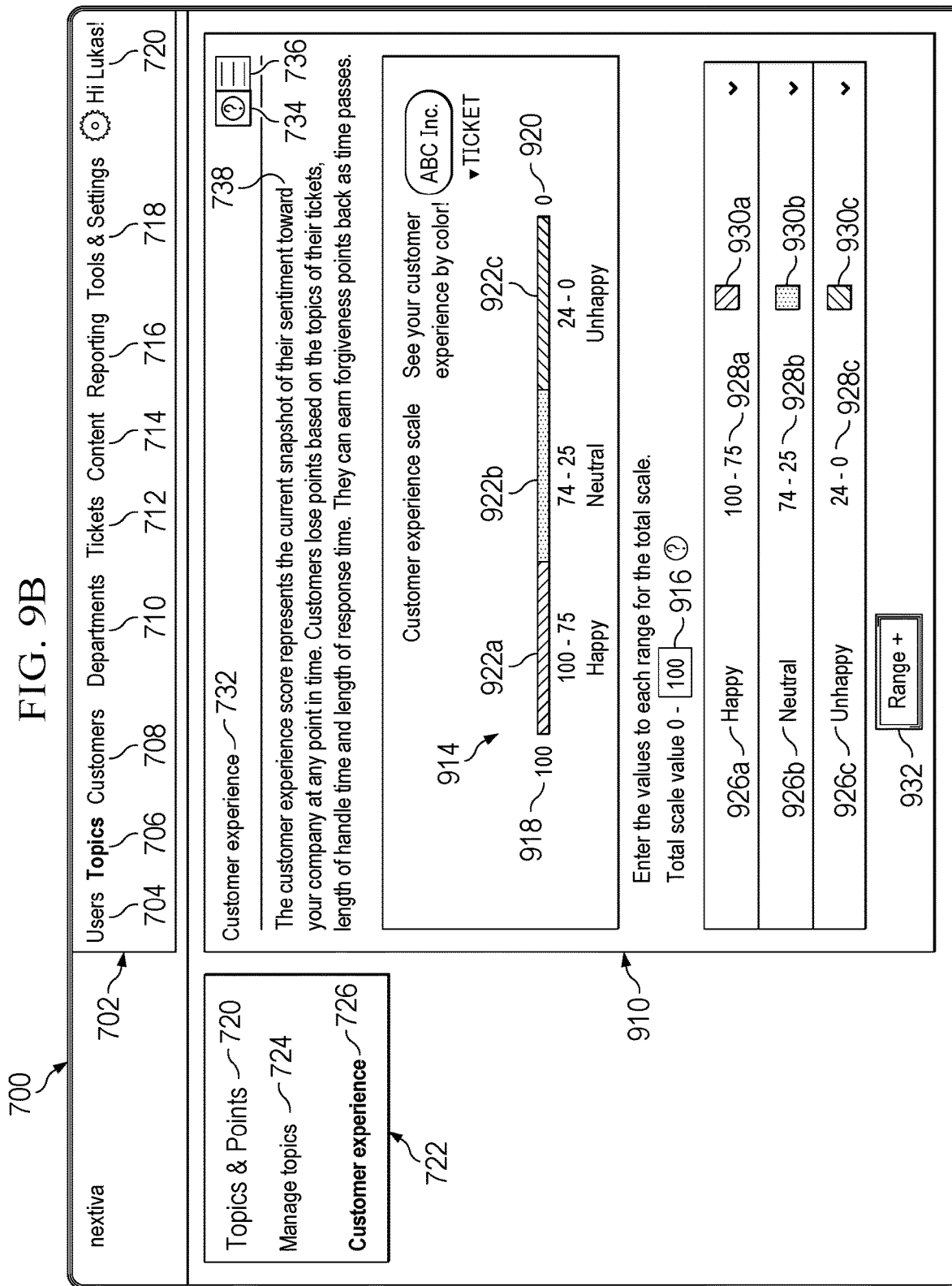

Selection of manage scale button 904 causes the task interface 730 to display the customer experience main interface 910 as illustrated in FIG. 9B.

The customer experience main interface 910 comprises a customer experience scale 914, a scale length entry box 916, customer experience titles 926*a-c*, customer experience values 928*a-c*, customer experience colors 930*a-c*, and an add range button 932.

The customer experience scale 914 comprises a color-coded bar with a plurality of ranges 922*a-c* which represent customer experience titles 926*a-c*, customer experience values 928*a-c*, and customer experience colors 930*a-c*. For example, as illustrated, the customer experience scale comprises a first color-coded range 922*a* which corresponds to a happy customer experience title and a satisfaction score range of 100-75; a second color-coded range 922*b* which corresponds to a neutral customer experience title and a satisfaction score range of 74-25; and a third color-coded range 922*c* which corresponds to an unhappy customer experience title and a satisfaction score range of 24-0.

The scale length entry box 916 shortens or lengthens the customer experience scale 914 according to a total range entered in the box. For example, as illustrated the customer experience scale 914 ranges from 100 at a first end 918 to 0 at a second end 920. The scale length entry box 916 permits a user to enter a number corresponding to the total number of points for a satisfaction score. Although, an exemplary range is shown from 100 to 0, embodiments contemplate any range either positive or negative and any positive or negative value, according to particular needs.

The customer experience titles 926*a-c* correspond to the customer experience titles of the ranges 922*a-c* on the customer experience scale 914. The customer experience values 928*a-c* correspond to the length of the ranges 922*a-c* on the customer experience scale 914. The customer experience colors 930*a-c* correspond to the colors of the ranges 922*a-c* on the customer experience scale 914.

Figure 9C:
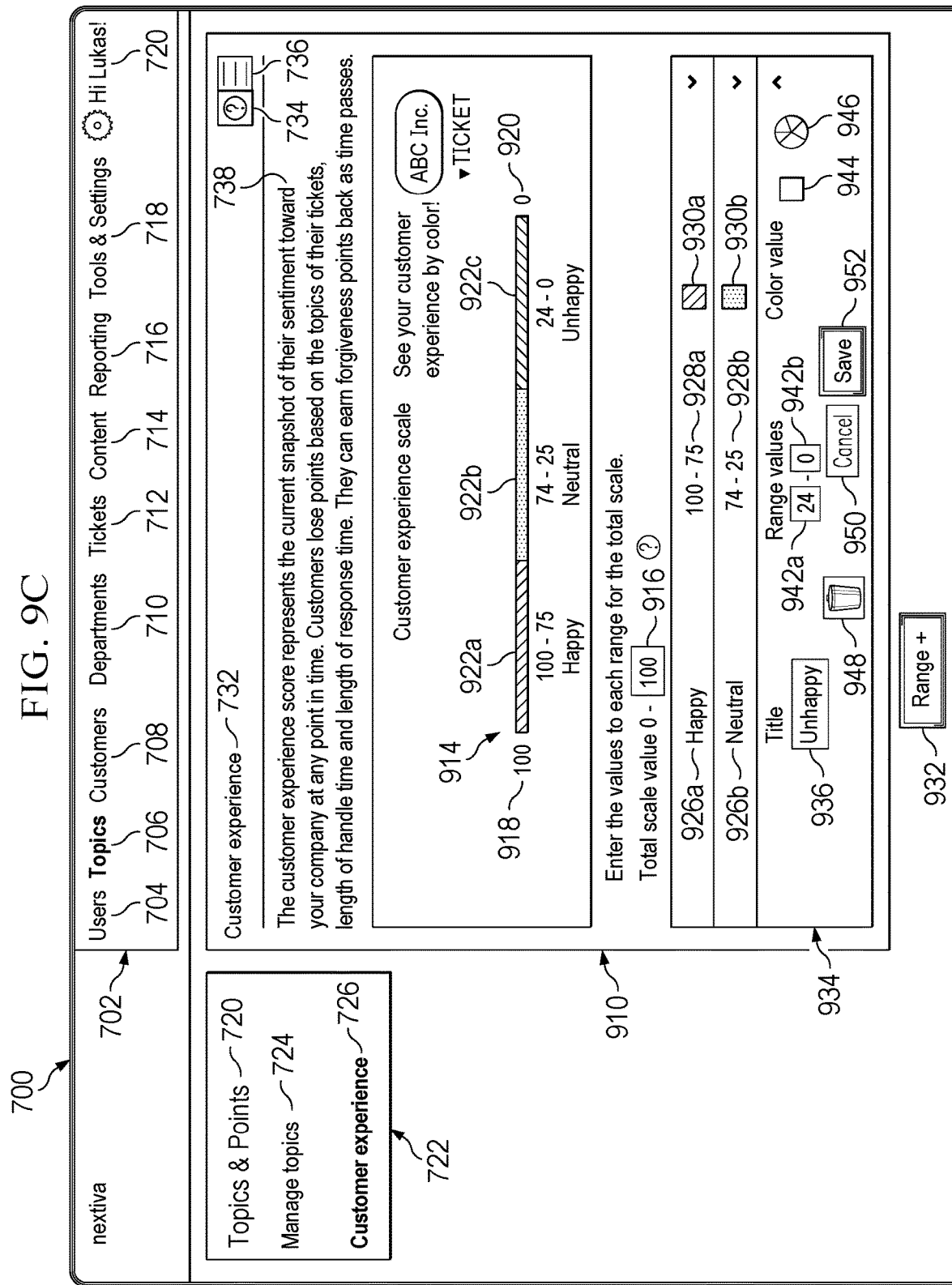

Selection of the add range button 932 displays the range edit box 934 as illustrated in FIG. 9C. Additionally, selection of any one or more of the customer experience titles 926*a-c*, customer experience values 928*a-c*, and/or the customer experience colors 930*a-c* displays the range edit box 934.

The range edit box 934 comprises a customer experience title entry box 936, customer experience values entry boxes 942*a-b*, a color value 944, a color value picker tool 946, a discard range button 948, a cancel changes button 950, and a save changes button 952. When the range edit box 934 is displayed in response to a selection of any one or more of the customer experience titles 926*a-c*, customer experience values 928*a-c*, and/or the customer experience colors 930*a-c*, the title entry box 936, value entry boxed 942*a-b*, and color value 944 display the values of the customer experience range which corresponds to the customer experience titles 926*a-c*, customer experience values 928*a-c*, and/or the customer experience colors 930*a-c* which was selected.

The customer experience title entry box 936 is a text-editable box which associates a title to the range that is edited in the range edit box. The title may be any word or name according to particular needs.

The customer experience values entry boxes 942*a-b* are value-editable boxes which associate a value entered into the first value entry box 942*a* to a first value of the range associated with the range edit box 934 and a value entered into the second value entry box 942*b* to a second value of the range associated with the range edit box. For example, as illustrated, the range "unhappy" is associated with a satisfaction score with a range of 24-0 because 24 is entered into the first value entry box 942*a* and 0 is entered into the second value entry box 942*b*.

The color value 944 represents a color selected from the color value picker tool and is updated to represent the color the range 922 and customer experience color 926 associated with the range being edited.

The discard range button 948 deletes the range from the customer experience scale and removes the range from the list. The cancel changes button 950 closes the range edit box 934 and discards any changes that were made to the range 922. The save changes button 952 closes the range edit box 934 and stores any changes that were made to the range 922 with the associated topic data 306 and score data 318 stored on database 134 of cloud datastore 130.

Figure 10:
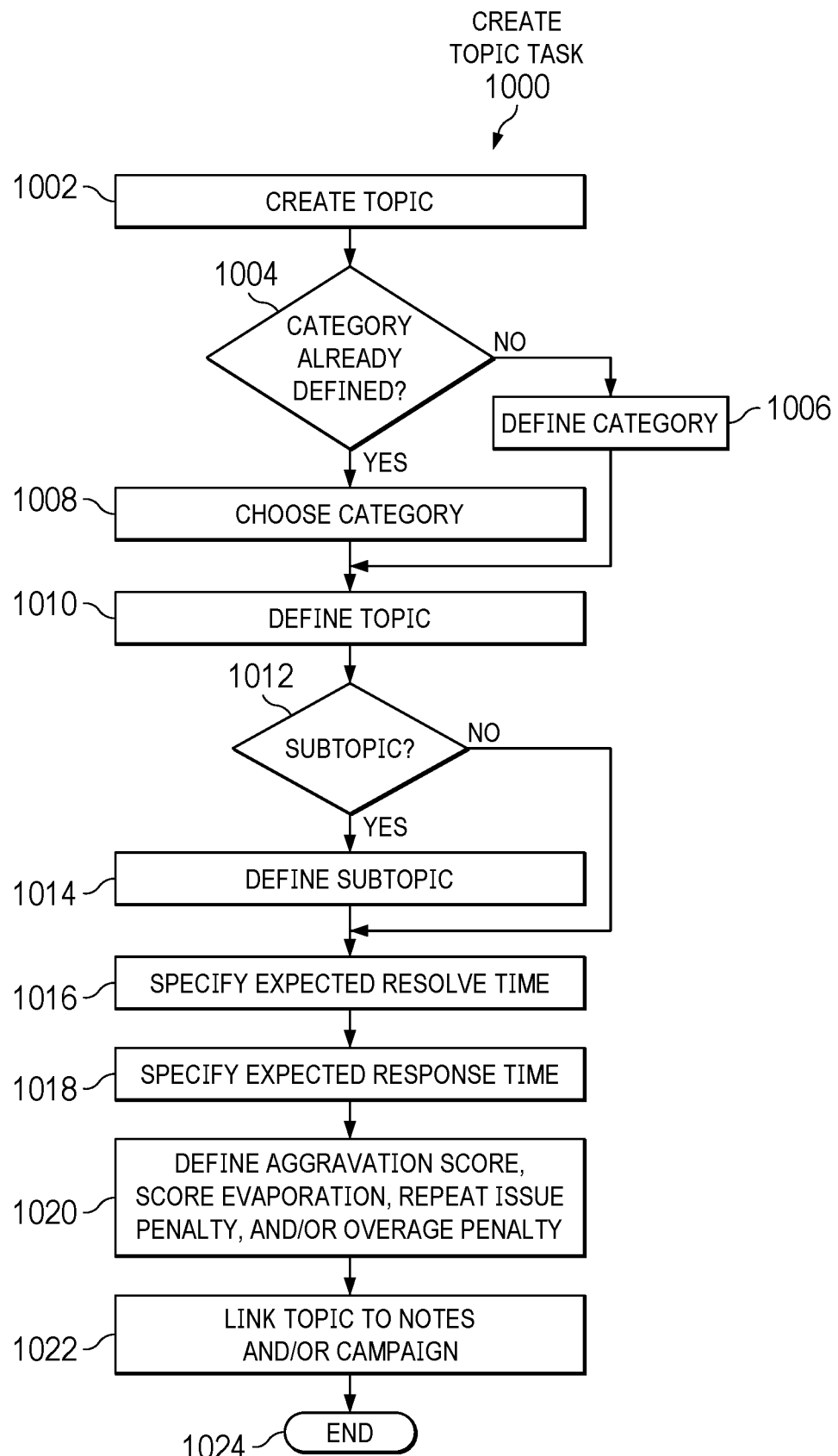
FIG. 10 illustrates the method of managing a topic illustrated in FIGS. 8A-8J according to an embodiment.

FIG. 10 illustrates a method 1000 of creating new topic task. Although method 1000 is described with respect to customer management system 100 of FIG. 1 and managing a topic using user interface 700 as illustrated in FIGS. 7-9C, other systems and/or user interfaces may be used without departing from the scope of the present invention.

In response to a selection of "manage topics" 802 from the manage topics overview menu 800, the entity server 142 initiates create topic subroutine, at step 1002. Task interface 730 of user interface 700 presents a choice to select a category which is already defined in the hierarchy data 308 or to create a new category, at step 1004. If category is not already defined in the hierarchy data 308, category is input, which is to be created, along with any additional parameters associated with category (such as the department of category 432), which task interface 730 then stores in hierarchy data 308, at step 1006. Once category 432 is created, the method proceeds to step 1010. If category 432 is already defined in hierarchy data 308, category 432 may be selected from a list of already created categories, at step 1008. Once category 432 is created or chosen, topic 434 may be input and any additional parameters associated with the topics, which are then stored in hierarchy data 308.

Once topic 434 is created, subtopic 436 may be input, at step 1012. If subtopic 436 is created, subtopic 436 is defined and any additional parameters are inputted, at step 1014, and user interface 640 stores the defined and additional parameters in hierarchy data 308. If subtopic 436 of topic 434 is not created, user interface 640 continues to step 1016. At step 1016, user interface 640 receives an input for an expected resolve time for each channel for topic 434 or subtopic 436, if created, and stores the expected resolve time in topic data 306. At step 1018, user interface 640 receives an expected response time for each channel and stores the expected response time in topic data 306.

At step 1020, user interface 700 receives values for one or more of the aggravation score values, evaporation period values, repeat issue penalty values, and/or overage penalties for the topic 434, which are then stored in topic data 306.

At step 1022, user interface 700 receives internal notes and/or customer campaign notes which are then linked to the topic or subtopic, and the notes are stored in topic data 306.

To further illustrate the method of FIG. 10, an example is now given. In the following example and by way of example only and not by way of limitation, entities 140 uses method 1000 to create a topic and define values which provide the input to generate a score for one or more end user systems 120*a-n*, as for example, in the method of FIG. 11. Continuing with the example, entity 140 defines one or more of the aggravation score values, evaporation period values, repeat issue penalty values, and/or overage penalties for an end user system 120*a-n* interaction. Starting with step 1002, an entity 140 uses user interface 700 to create a topic associated with the current end user system 120*a-n* interaction, for example, a "password reset." Entity 140 then uses user interface 700 to search hierarchy data 308 for a suitable category for the "password reset" topic. If entity 140 chooses from a category already listed in the hierarchy data, such as "Technical Help," the method proceeds to step 1008. If the entity 140 wishes to define a new category, such as "Login Errors," the method proceeds to step 1006, and entity 140 inputs a new category, which user interface 700 stores in hierarchy data 308.

At step 1010, entity 140 defines the "password reset" topic and associates the topic with the category, and the association is stored in hierarchy data 308. At step 1012, entity 140 may create one or more subtopics associated with the "password reset" topic, such as a "forgotten password" subtopic or a "too many incorrect password entries" subtopic. If the entity wishes to define new subtopics, the method proceeds to step 1014, if not, the method proceeds to step 1016.

At step 1016, entity 140 enters the expected resolve time for the password reset topic for one or more channels, in other words the amount of time that the entity 140 determines will take to resolve the request to which the topic relates. For example, a password reset may be handled by entity 140 in 5 minutes by internet chat, 15 minutes by phone call, and 6 hours by email—an entity may enter any suitable time that entity 140 foresees the resolution of the topic to take.

At step 1018, entity 140 enters the expected response time for the topic for one or more channels, in other words, the amount of time that entity 140 determines will lapse before entity 140 responds to the request to which the topic relates.

For example, an entity may respond to a password reset phone call in 15 minutes, an email in 1 day, and internet chat by 1 minute.

Similarly, at step 1020, entity 140 defines any one or more of aggravation score, evaporation period, repeat issue penalty, a response delay penalty, and/or overage penalty to be associated with the topic.

An aggravation score, as discussed above, is a number which indicates the amount of annoyance or aggravation of an end user system 120*a-n* caused by the request to which the topic relates. A evaporation period value is a number which indicates the amount that a score will decrease for a predetermined amount of time. In addition, or as an alternative, a evaporation period value is a number which indicates the amount that a score will increase to a predetermined value for a predetermined amount of time. A repeat issue penalty is a number which increases the aggravation score if the request to which the topic relates occurs again within a predetermined amount of time. A response delay penalty is a number which increase the score if the actual response time is greater than the expected response time. An overage penalty is a number which increases the score if the actual resolve time is greater than the expected resolve time.

After entity 140 inputs numbers for one or more of the aggravation score, evaporation period, repeat issue penalty, a response delay penalty, and/or overage penalty to be associated with the topic, user interface 700 stores the values as topic data 306 and/or score data 318. At step 1022, user interface 700 receives input from entity 140 that links a topic to notes or a campaign. Continuing with the example of the password reset topic, notes may comprise instructions for entity 140 to direct end user system 120*a-n* to perform a password reset. In one embodiment, a campaign for a password reset may comprise an automated email that is generated automatically to an end user system 120*a-n* each time end user system 120*a-n* communicates to entity 140 a request for a password reset topic.

Figure 11:
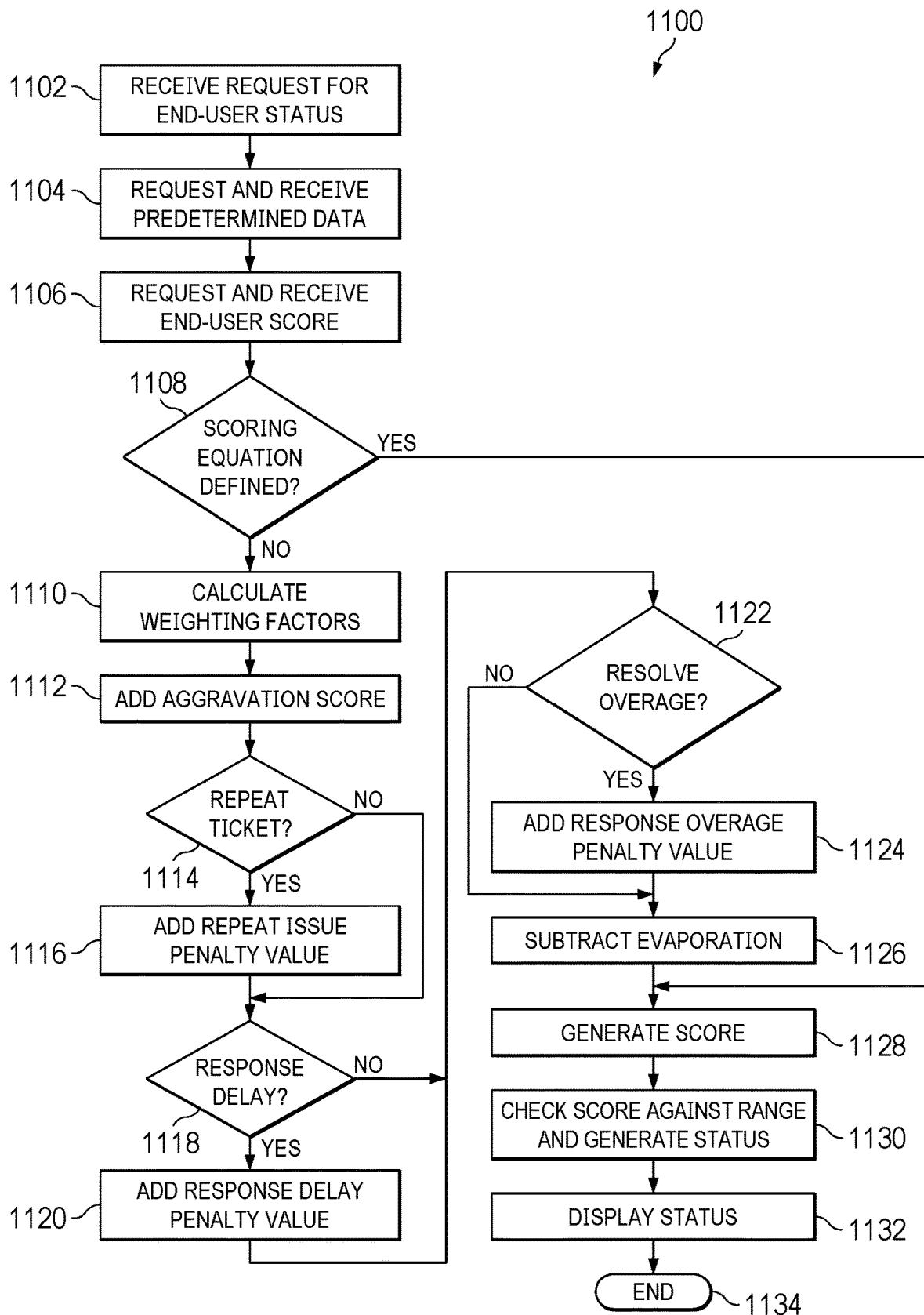
FIG. 11 illustrates a method of score calculation according to an embodiment.

FIG. 11 illustrates a method 1100 for determining a status and/or a score for an end user system 120*a-n*. In response to one or more entities 140 request for an end user system 120*a-n* status, scoring module 320 of server 132 receives a request from cloud interface 520 of server 142, at step 1102. Scoring module 320 requests and receives from database 134 end user data 310, response data 316, topic data 306, ticket data 304, and/or status data 302, and requests and receives from database 114 entity data 202, at step 1104. The type of data and location of data are merely examples of one possible configuration, and other embodiments contemplate other data and locations of data based on particular needs. For example, the type of data requested are those which are defined in a score equation as used in calculating an end user score. Some or all of the types of data discussed in the specification may be used in calculating an end user score, but embodiments contemplate less than all or other type of data according to particular needs.

Scoring module 320 requests and receives the current score of an end user system 120*a-n*, which is stored in score data 318 of database 134 of cloud datastore 130, at step 1106. The request is, for example, part of dashboard 1200, which initiates the request for a current score of an end user system 120*a-n* when initiated by an entity 140. According to some embodiments, the request is performed routinely on a predetermined schedule, by an entity request, and/or whenever data used in the score equation is updated.

If a scoring equation is defined at step 1108, scoring module 320 generates a score based on the received data at step 1128. According to some embodiments, the predefined scoring equation comprises one or more of an aggravation score, evaporation period, repeat issue penalty, a response delay penalty, and/or overage penalty associated with a topic, one or more weighting factors multiplied to one or more of the values or penalties, and is coupled to the one or more datasets which comprise the information for calculating the values or penalties. For example, where the score equation comprises a repeat issue penalty, the score is updated for a particular end user system 120*a-n* whenever the ticket data 304 indicates that a repeat issue has occurred for end user system 120*a-n*. By way of a further example, where the score equation comprises an overage penalty, the score is updated whenever response data 316 indicates that an entity 140 has an actual resolve time of a request for a particular end user system 120*a-n* which exceeds the expected resolve time.

If the scoring equation is not defined at step 1108, scoring module 320 generates one or more weighting factors at step 1110. The weighting factors may be any real number, which are used to weigh one or more variables in the scoring equation and generated by the scoring module 320 based on predetermined parameters including the type of channel associated with an end user system 120*a-n* interaction, the amount or value of services purchased by the end user system 120*a-n* associated with the end user status request, a type, personality, status, profession, or field of the business of the end user system 120*a-n* associated with the end user status request, the previous status of the end user system 120*a-n*, the topic associated with one or more ticket items, a user specified weighting factor associated with an end user system 120*a-n* based on an entity or system administrator determination that the end user system 120*a-n* is more easily or less easily aggravated than one or more other end user systems 120*a-n* (including a determination based on a survey given to an end user), and/or the number of variables defined in the scoring equation.

Scoring module 320 adds the aggravation score associated with the topic of the most recent ticket of the end user system 120*a-n*, if the aggravation score ticket is not already calculated in the current end user system 120*a-n* score, at step 1112.

The scoring module 320 determines if the topic of the ticket is the same as a previous ticket for a predetermined amount of time, at step 1114. If the topic of the ticket is the same as a previous ticket in a predetermined amount of time, the scoring module 320 adds a repeat issue penalty value, at step 1116 and then continues to step 1118. For example, if a ticket indicates that an end user system 120*a-n* has communicated to entity 140 about a dropped call topic twice within a week, the scoring module 320 adds the repeat issue penalty to the score.

If the topic of the ticket is not the same as a previous ticket in a predetermined amount of time, scoring module 320 continues to step 1118. For example, if a ticket indicates that an end user system 120*a-n* has communicated to entity 140 about a dropped call topic and a password reset topic in the same week, the scoring module 320 will not add a repeat issue penalty to the score.

Scoring module 320 determines if the response to the end user system 120*a-n* interaction was less than or equal to an expected response time, at step 1118. If the response was less than or equal to the expected response time, the method continues to step 1122. For example, if the end user system 120*a-n* communicated to entity 140 about a password reset by email, the expected password reset response time is 1 hour, and entity 140 responded to the end user system 120*a-n* within an hour, then the scoring module 320 does not add a response delay penalty to the score.

If the response was greater than the predetermined response time, the scoring module 320 adds a response delay penalty value, at step 1120, and then proceeds to step 1122. For example, if the end user system 120*a-n* communicated to entity 140 about a password reset by email and the expected password reset response time is 1 hour, but entity 140 did not respond to the end user system 120*a-n* within an hour, then the scoring module 320 adds a response delay penalty to the score.

Scoring module 320 determines if the resolve time of the end user system 120*a-n* interaction was less than or equal to a resolve time, at step 1122. If the resolve time exceeded a predetermined resolve time, scoring module 320 adds a response overage penalty value, at step 1124, and then proceeds to step 1126. For example, if the end user system 120*a-n* communicated to entity 140 about a password reset by telephone, the expected password reset resolve time by phone is 15 minutes, but the entity did not handle the password request within 15 minutes, then the scoring module 320 adds a response overage penalty to the score.

If the resolve time was less than or equal to a predetermined resolve time, the scoring module 320 proceeds to step 1126. For example, if the end user system 120*a-n* communicated to entity 140 about a password reset by telephone, the expected password reset resolve time is 15 minutes, and the entity handled the password response within 15 minutes, then the scoring module 320 does not add an overage penalty to the score.

Scoring module 320 subtracts any evaporation time, at step 1126. Evaporation time may be determined as a predetermined value which grows larger with increasing time. For example, entity 140 may set the evaporation period to be weighted according to any of the particular factors discussed above with relation to one or more weighting factors, as different topics, end user systems 120*a-n*, and other factors affect how quickly or slowly a score will return to a good status. By way of a further example, if end user system 120*a-n* communicates to entity 140 about a password reset on Monday. The scoring module 320 may subtract a predetermined amount from the score for each day after Monday until the score reaches 0. In this way, an unsatisfied end user system 120*a-n* is assumed to become content or satisfied with services if enough time passes without having to communicate to entity 140.

At step 1128, scoring module 320 generates a score by utilizing a predetermined scoring equation or generating a scoring equation based on the defined variables and weighting factors determined by the particular circumstances of the end user system 120*a-n* and entity 140 determined by scoring module 320.

Scoring module 320 checks the generated score against a predetermined range of statuses and generates a status, at step 1130. For example, a range may be predetermined that 0-50 is a "good" status, 51-100 is a "neutral" status, and 100 and above is a "bad" status. Scoring module 320 checks the score generated at step 1128 and determines the status of the end user system 120*a-n* based on which part of the range the score indicates the end user system 120*a-n* falls.

Scoring module 320 displays the status of the end user system 120*a-n*, at step 1132. For example, the status of the end user system 120*a-n* may be indicated by qualitative indicia (such as color or symbol) or quantitative indicia (such as a score) on user interface 700. The method ends at step 1134.

FIG. 12 illustrates dashboard 1200 of user interface module 524 of server 142 of one or more entities 140. Dashboard 1200 may be useful to one or more entities 140 to track and sort tickets of ticket data 304 of database 134 of cloud datastore 130 in order to respond to and assess interactions between one or more entities 140 and end user systems 120*a-n*. According to some embodiments, dashboard 1200 comprises one or more of the following features: dashboard menu 1201, dashboard toolbar 1203, create new ticket shortcut 1205, information search 1206, end user information bar 1207, case access panel 1209, ticket list display 1212, current ticket topic 1215, topic keyword 1216, ticket event reply shortcut 1217, create new ticket event shortcut 1218, current ticket information 1219, activity display shortcut 1220, customer display shortcut 1221, statistics display shortcut 1222, history lookback period dropdown 1223, channel notifications 1224*a-c*, and activity panel 1229.

As explained in more detail below, dashboard 1200 comprises a plurality of features and elements that provide entity 140 with access to data and charts stored in customer management system 100 to permit effective management of end user systems 120*a-n*.

Dashboard toolbar 1203 comprises a notifications shortcut 1204*a*, a calendar shortcut 1204*b*, an internal chat shortcut 1204*c*, and a profile manager 1204*d*.

FIG. 13 illustrates ticket list display 1212 in greater detail according to an embodiment. Ticket list display 1212 of dashboard 1200 displays information comprising the ticket data 304 of cloud database 134 of cloud datastore 130. Ticket data 304 comprises one or more of an indication whether the ticket has been viewed by an entity 1304*a*, channel information 1304*b*, ticket identification number 1304*c*, customer associated with ticket 1304*d*, company associated with ticket 1304*e*, topic 1304*f*, message count 1304*g*, ticket status 1304*h*, creation time 1304*i*, update time 1304*j*, received time 1304*k*, assigned agent 1304*l*, department 1304*m*, priority 1304*n*, weight 1304*o*, and/or actions 1304*p*. Ticket list display 1212 displays one or more of the information stored in ticket data 304 and indicates the information type with ticket list display labels 1302*a-p*. According to some embodiments, ticket list display 1212 displays a checkmark icon 1306*a* indicating that a ticket has been viewed by one or more entities 140. According to some embodiments, channel information 1304*b* is indicated on ticket list display 1212 by an icon 1306*b* indicating whether the channel information 1304*b* associated with the ticket is an inbound call (phone with an arrow pointing to the phone), an outbound call (phone with an arrow pointing away from the phone), email (picture of an envelope), and/or chat (picture of a text bubble).

In an embodiment, ticket identification number 1304*c* is indicated on ticket list display 1212 by a unique ticket identification number 1306*c* comprising a unique identification number for that ticket. Although listed as "3" in the drawings, embodiments contemplate each unique ticket identification number 1306*c* comprising a unique string of alphanumeric characters uniquely identify a ticket.

In another embodiment, customers associated with ticket 1304*d* and company associated with ticket 1304*e* is indicated on ticket list display 1212 by the customer 1306*d* or company 1306*e* comprising the end user system 120*a-n* assigned to the ticket. For example, in FIG. 13, the customer is "Jane Doe" and the company is "ABC Inc." User selection of end user name element 1208*c* permits the dashboard 1200 to change the ticket data 302 displayed in ticket list display 1212 to comprise the ticket data 302 associated with the end user system 120a-n selected in end user name element 1208c.

In embodiments, topic 1304f of ticket data 302 is indicated on ticket list display 1212 by a topic 434 associated with the unique ticket identification number 1306c. A topic 434 may be associated with a ticket by selection of a topic 434 from a hierarchy 430. In addition or as an alternative, customer management system 100 may monitor communications between an end user system 120a-n and one or more entities 140 and indicate a topic 434 according to keywords contained in the text, voice, or other data transmitted over the channel. Channel interface 522 of server 142 of one or more entities 140 may comprise a text and/or voice recognition module which analyzes text and/or voice data sent over channel and compares the information with one or more topic indicator standards and scores the comparison with a confidence score based on likelihood of the topic being indicated by the text and/or voice data. Channel interface 522 then displays on dashboard 1200 a list of likely topics organized according to the confidence score permitting a user of dashboard 1200 to select the topic 434 associated with the ticket comprising the end user interaction.

In addition, message count 1304g of ticket data 302 is indicated on ticket list display 1212 by a number 1306g indicating the number of ticket events 1240a-c associated with the unique ticket identification number 1306c. For example, in current ticket information 1219, the first three ticket events 1240a-c of the currently selected ticket are displayed. The first ticket event 1240a between the one or more entities 140 and Jane Doe indicates the ticket event 1240a is an inbound call on Apr. 22, 2014 at 12:30 pm. Text 1242a associated with the first ticket event 1240a comprises, for example, current details about the ticket, ticket, history, and reply options. The second ticket event 1240b between the one or more entities 140 and Jane Doe indicates the second ticket event 1240b is a chat (for example, an internet-based webchat) displaying the text sent from Jane to Thomas and the text sent from Thomas to Jane. In some embodiments, the chat text 1242b is time-stamped. A third ticket event 1240c indicates the ticket event 1240c is an email between the one or more entities 140 and Jane Doe. The third ticket event 1240c comprises the text of the email 1242c sent from the one or more entities 140 to Jane Doe. In some embodiments, an email is automatically sent when an inbound call is received from an end user system 120a-n based on the topic 434 determined by the customer management system 100 from the channel data.

Furthermore, ticket status 1304h of ticket data 302 is indicated on ticket list display 1212 by status icon 1306h indicating whether the ticket is open or closed. An open ticket is a ticket which has not been resolved. A closed ticket is a ticket which has been resolved. Creation time 1304i, update time 1304j, and received time 1304k of ticket data 302 is indicated on ticket list display 1212 by an indication 1306i-k of the number of minutes, hours, days, or combination thereof that has passed since the ticket was created, updated, and received, respectively. The indication 1306i-k may be any form such as date, time, or elapsed time, according to particular needs.

In an embodiment, assigned agent 1304l of ticket data 302 is indicated on ticket list display 1212 by the name 1306l of the agent responsible for handling the problem represented by the unique ticket identification number 1306c. When one or more entities 140 which is logged on to the dashboard 1200 is the agent responsible for handling the problem represented by the unique ticket identification number 1306c, the name 1306l may indicate "Me." When the one or more entities 140 which is logged on to the dashboard 1200 is not the agent responsible for handling the problem represented by the unique ticket identification number 1306c, the name 1306l may indicate a name or identification number of the agent responsible, or may simply indicate that another one or more entities 140 or user is responsible for the ticket, for example, by displaying "Other Agent."

According to other embodiments, department 1304m of ticket data 302 is indicated on ticket list display 1212 by the name of the department 1306g indicating the department responsible for handling the ticket. For example, for the topic, "Outage," the department handling the ticket may be the "Support" department. For the topics, "Refund," "Bill Not Received," "Credit Card Denied," and/or "Late Payment," the department may be indicated as the "Billing" department. Embodiments contemplate any number of topics associated with any number of departments according to the particular organizational structure of one or more entities 140 and the services offered by each of the departments in the organizational structure.

According to some embodiments, priority 1304n of ticket data 302 is indicated on ticket list display 1212 by a number, color, or both 1306n indicating the importance of the end user problem indicated in the ticket being resolved by one or more entities 140 prior to the resolution of end user problems indicated in other tickets. For example, a priority 1306n indicated by the number, 9, is of a higher priority than a priority 1306n indicated by the number 3 and therefore comprises an indication to one or more entities 140 to resolve the problem underlying the ticket with the priority of 9 before the problem underlying the ticket with the priority of 3. According to some embodiments, the ticket list display 1212 displays the tickets with the highest priority ticket first.

In addition, weight 1304o of ticket data 302 is indicated on ticket list display 1212 by a weight value 1306o scored on a combination of a satisfaction score and a priority which indicates a priority of a ticket to an entity 140.

In addition or as an alternative, actions 1304p of ticket data 302 is indicated on ticket list display 1212 by one or more icons 1306p indicating actions that user interface module 524 performs on the ticket data 302. For example, a first icon 1308a comprising a box with outward facing arrows expands or collapses the ticket area, a second icon 1308b comprising an eye icon which opens an individual ticket information screen, and a third icon 1308c comprising a plus sign permitting adding an internal note or additional ticket to an end user 120.

Current ticket information 1219 comprises one or more ticket events 1240a-c and associated text 1242a-c. According to some embodiments, current ticket information 1219 further comprises for the currently selected ticket 1246: a ticket topic 1216 associated with the currently selected ticket 1246, a description of the topic 1215 associated with the currently selected ticket 1246, a ticket event reply button 1217, and a create new ticket event button 1218. User selection of a reply button 1217 displays a ticket event reply dropdown. User selection of a create new ticket event button 1218 displays a create new ticket event dropdown 2200 (FIG. 22) and a reply dropdown 2202 on dashboard 1200.

Figure 14:
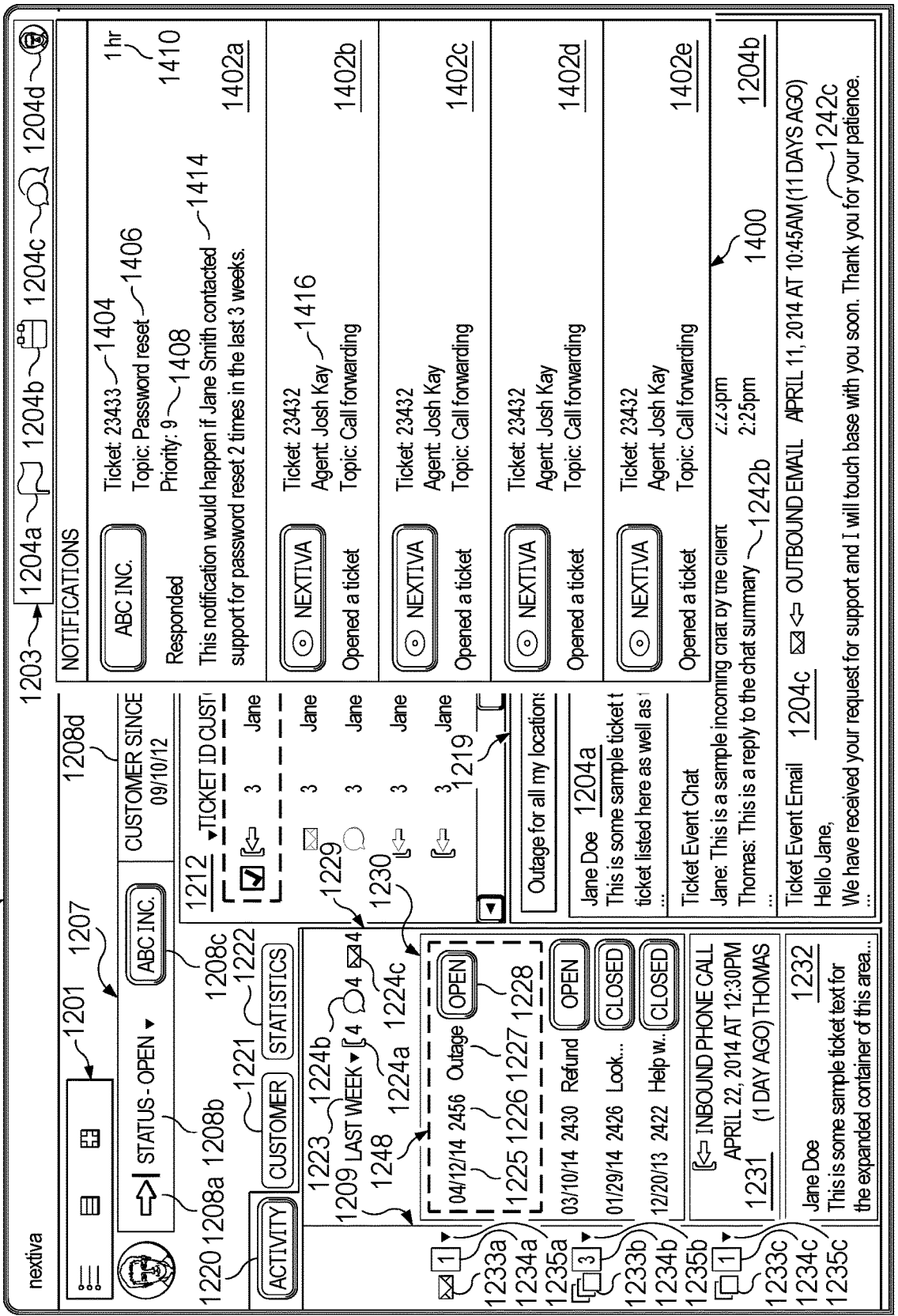

FIG. 14 illustrates an embodiment of notifications shortcut 1204a in greater detail. On selection of notifications shortcut 1204a, notifications dropdown box 1400 is displayed on dashboard 1200 comprising notification data 314 of database 165 of cloud datastore 130. Notifications 1402a-e comprise one or more of the following features:

ticket number 1404, topic 1406, priority 1408, company or end user name 1412, notification information 1414, and agent 1416. When an end user system 120a-n contacts one or more entities 140, a notification 1402 will be displayed in the notifications dropdown box 1400 for the account manager or agent 1416 that has been assigned by customer management system 100 to administer the account for end user system 120a-n. In this way, one or more entities 140 comprising an account manager may monitor one or more end user interactions of end user systems 120a-n with one or more entities 140 in order to resolve any problems associated with topic 434.

FIGS. 15-18 illustrate a calendar shortcut 1204b in greater detail according to one or more embodiments. In response to a selection of calendar shortcut 1204b, a calendar dropdown display 1500 is displayed on dashboard 1200 comprising information stored in calendar data 312 of database 134 of cloud datastore 130.

Figure 15:
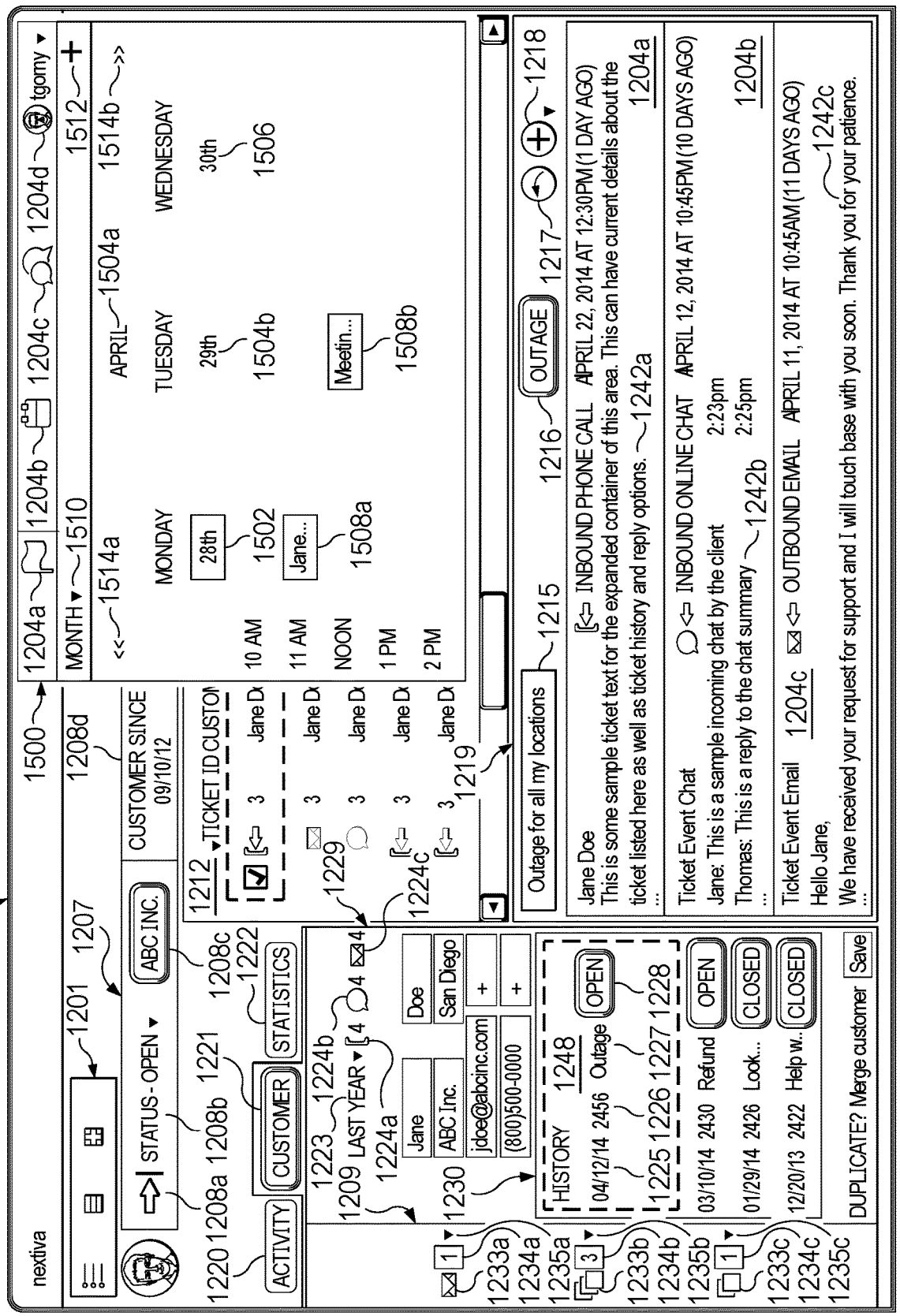

FIG. 15 illustrates a calendar dropdown display 1500 comprising the current data 1502, current month 1504a, the next day 1504b, and the following day 1506. The calendar dropdown display 1500 displays calendar data 312 over the time period displayed (here, April 28th through April 30th) and any calendar events 1508a-b that occur during the displayed period. Calendar dropdown display 1500 further comprises navigation keys 1514a-b which permit navigation backward 1514a and forward 1514b through previous and subsequent months to be displayed in the calendar dropdown display 1500. Calendar dropdown display 1500 further comprises a month selection dropdown 1510 which permits navigation directly to a selected month and add new calendar event shortcut 1512 which permits one or more entities 140 to add a new calendar event to the calendar data 312 of database 134.

Figure 16:
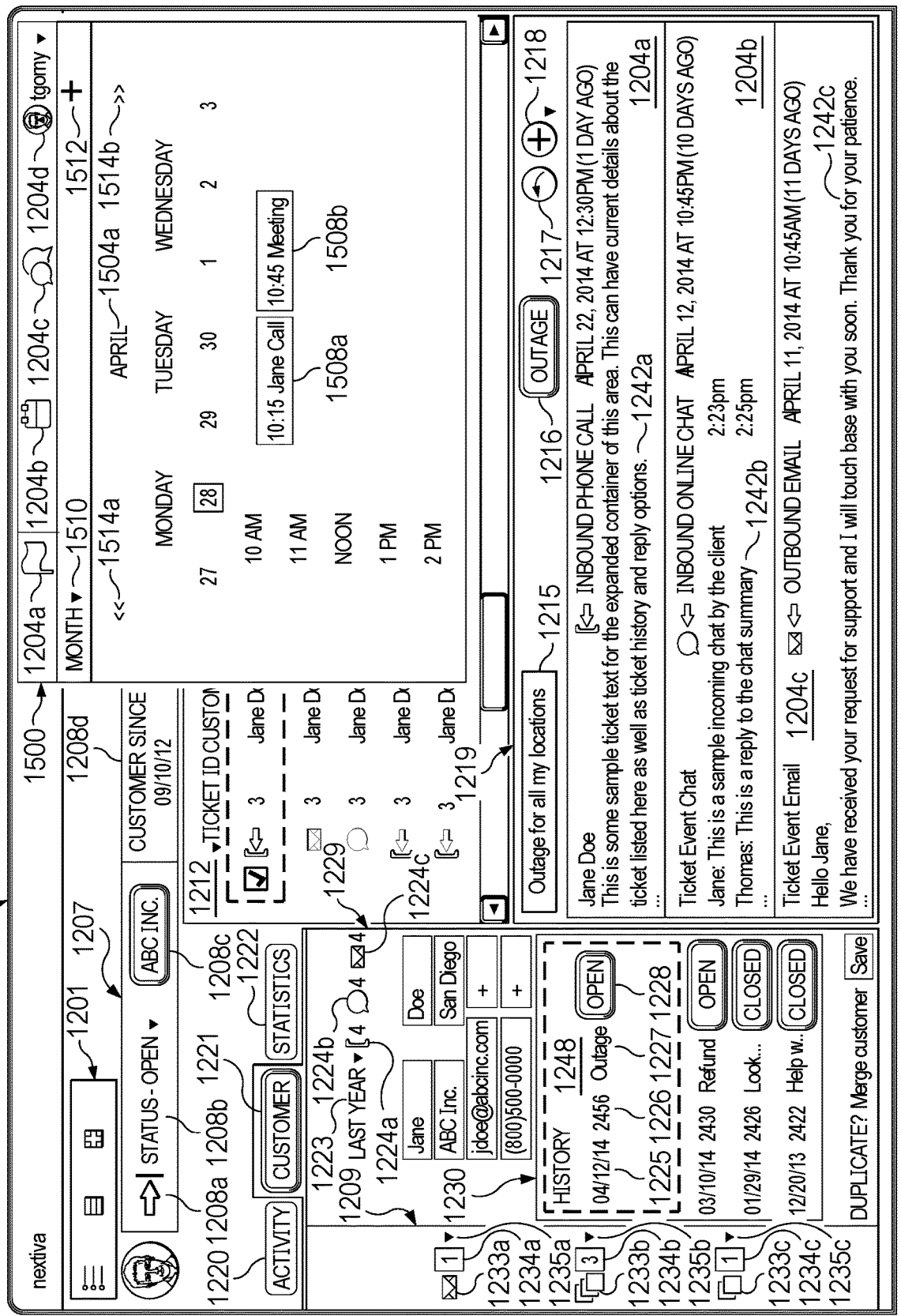

FIG. 16 illustrates a calendar dropdown display 1500 comprising a view of an entire week (here, April 27 through May 3). The calendar dropdown display 1500 of FIG. 16 displays all calendar events 1508a-b that occur during the displayed period.

Figure 17:
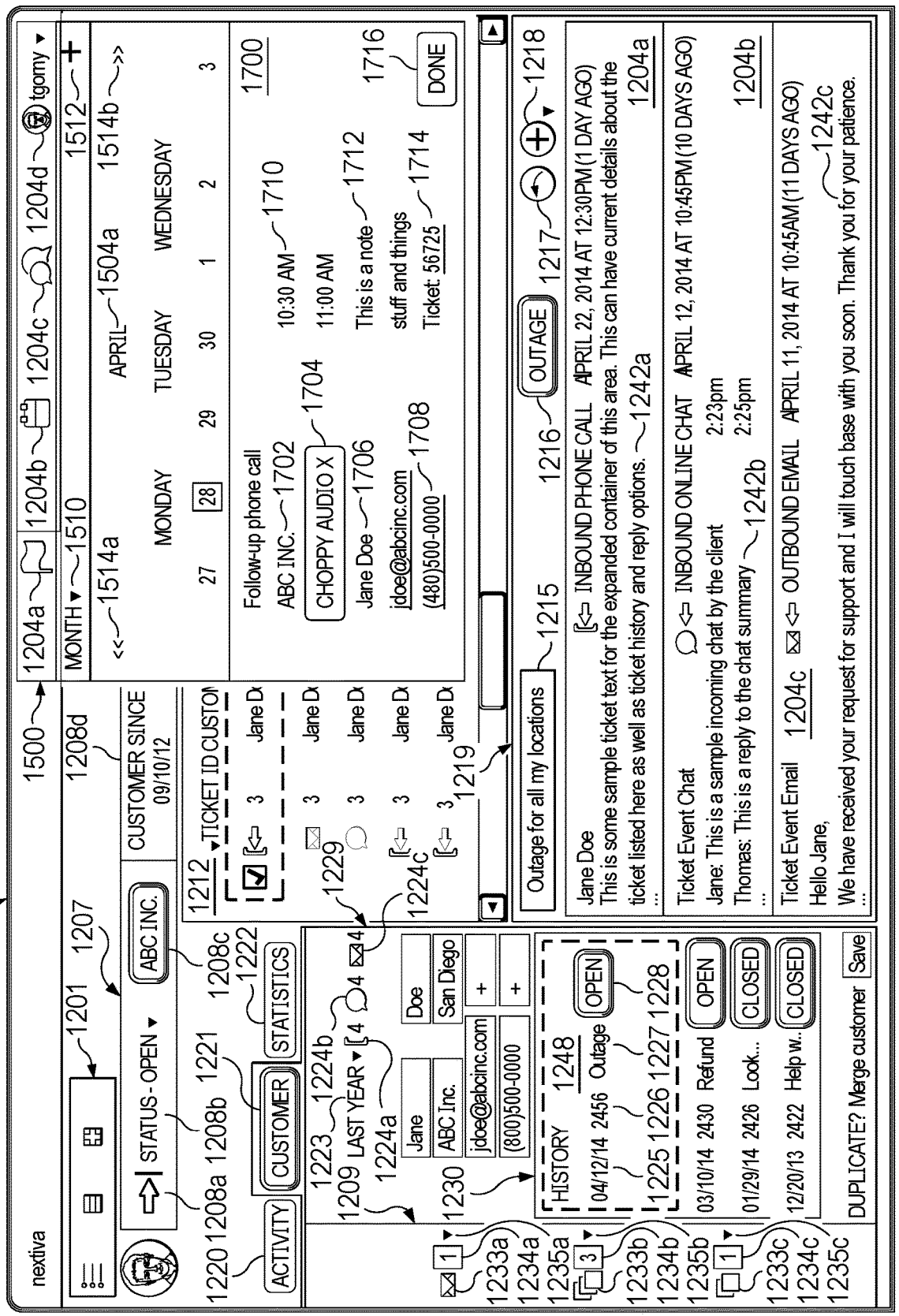

FIG. 17 illustrates a calendar event shortcut 1512 in greater detail according to an embodiment. In response to a selection of the calendar event shortcut 1512, the calendar dropdown display 1500 displays an add new calendar event interface 1700. In the add new calendar event interface 1700, an one or more entities 140 enters information comprising the company name 1702, topic 1704, end user 1706, end user contact information 1708, time information 1710, a note 1712, and a ticket number 1714. According to some embodiments, one or more of company name 1702, topic 1704, end user 1706, end user contact information 1708, time information 1710, a note 1712, and a ticket number 1714 are assigned by customer management system 100 according to a user selected ticket in ticket list display 1212. Upon selection of a done button 1716, the information is stored in calendar data 312 and subsequently appears on calendar dropdown display 1500.

Figure 18:
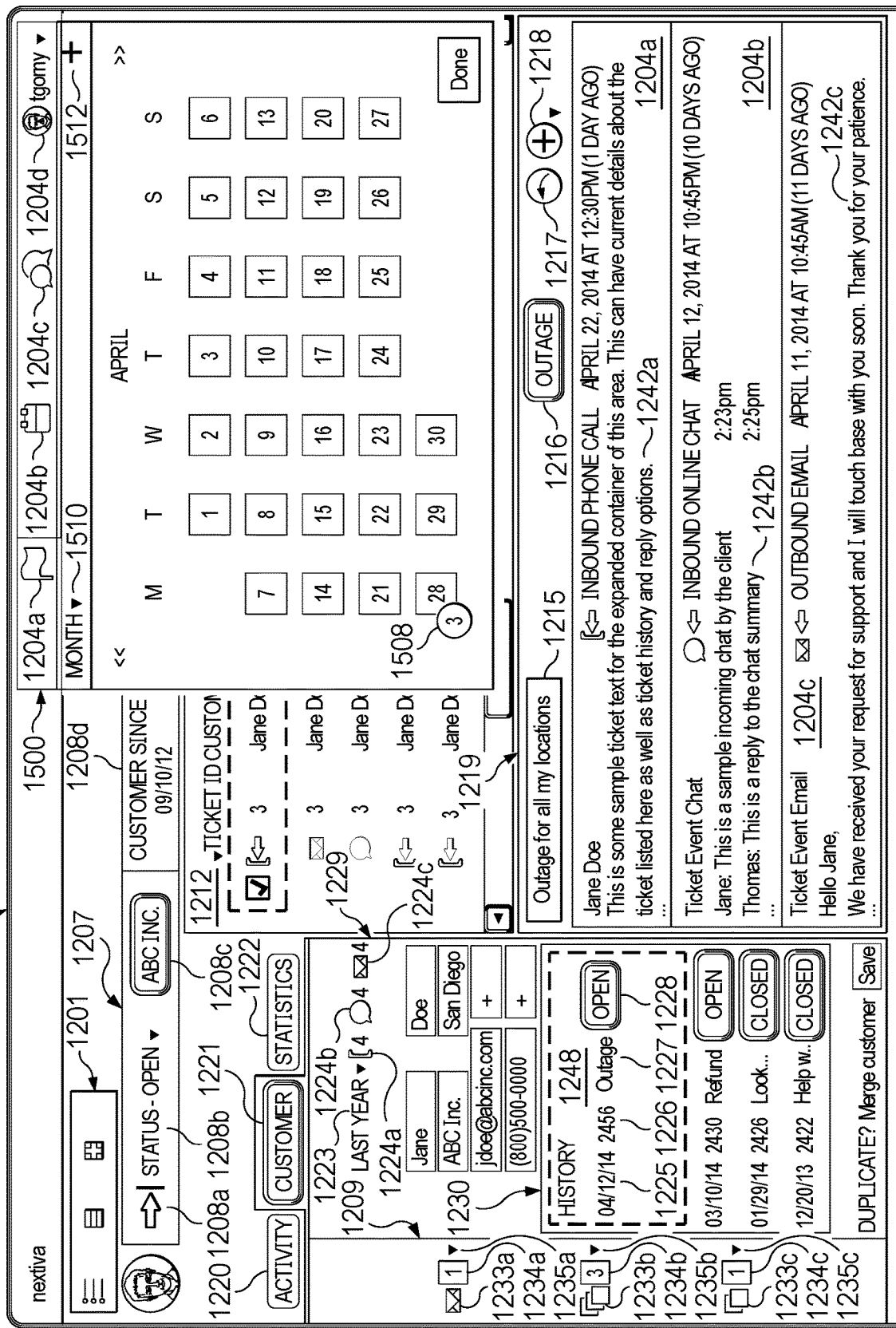

FIG. 18 illustrates a calendar dropdown display 1500 comprising a view of an entire month (here, the month of April). The calendar dropdown display 1500 of FIG. 18 displays all calendar events 1508 that occur during the displayed period.

Internal chat shortcut 1204c initiates an internal chat module 526 of server 142 of one or more entities 140. The internal chat module 526 permits one or more users of dashboard 1200 to send text- or voice-based messages between one or more entities 140.

Profile manager shortcut 1204d initiates a profile manager module 528 of server 142 of one or more entities 140. The profile manager module 528 permits one or more entities 140 to change account settings such as being the account manager of one or more end user systems 120a-n, change a profile picture, edit personal information or identity information of one or more entities 140, and store the information in profile data 508 of database 144 of one or more entities 140.

Figure 19:
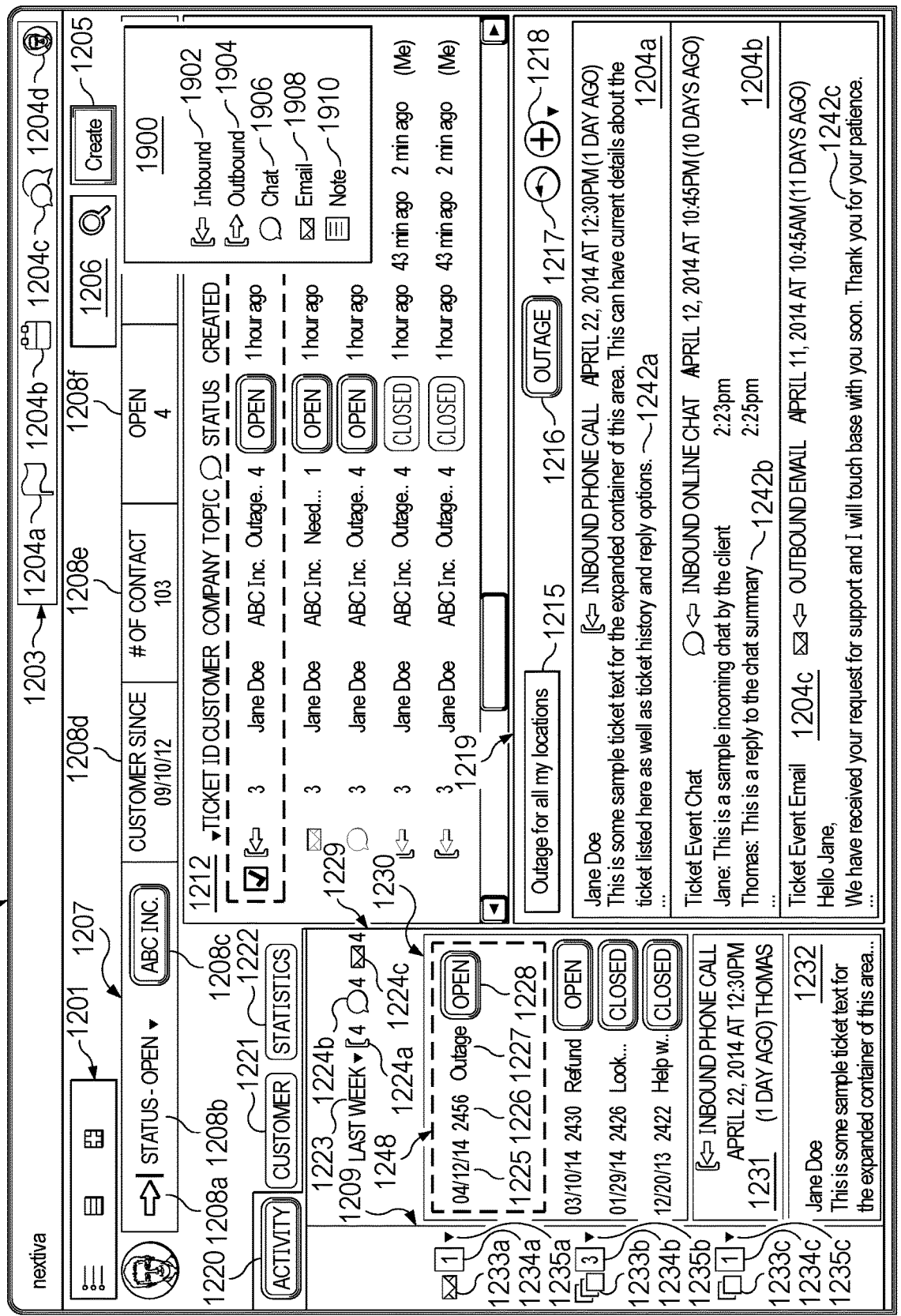

FIG. 19 illustrates create new ticket shortcut 1205 of dashboard 1200 according to an embodiment. Upon selection of create new ticket shortcut 1205, create new ticket dropdown 1900 is displayed on dashboard 1200. The create new ticket dropdown 1900 comprises one or more elements 1902-1910 to add a new ticket to ticket list display 1212 and store the ticket information in ticket data 304 of database 134 of cloud datastore 130. In this embodiment, elements 1902-1910 of create new ticket dropdown 1900 comprise elements for creating a new inbound call ticket 1902, a new outbound call ticket 1904, a new chat ticket 1906, a new email ticket 1908, and a new note ticket 1910. In some embodiments, one or more elements 1902-1910 are not displayed because customer management system 100 detects a communication between end user system 120a-n and one or more entities 140 and creates a new ticket comprising the channel and direction of communication between end user system 120a-n and one or more entities 140. For example, in customer management system 100 comprising an integrated phone system, when an end user system 120a-n contacts one or more entities 140, dashboard 1200 displays a new ticket entry screen 2000 (FIG. 20) wherein the channel information 2002 is already filled in by a determination of customer management system 100 based on the channel and direction of communication. In customer management system 100 comprising a phone system that is not integrated, user selection of elements 1902-1910 causes dashboard 1200 to display new ticket entry screen 2000 with channel information and direction of communication filled out according to the selected element 1902-1910.

Figure 20:
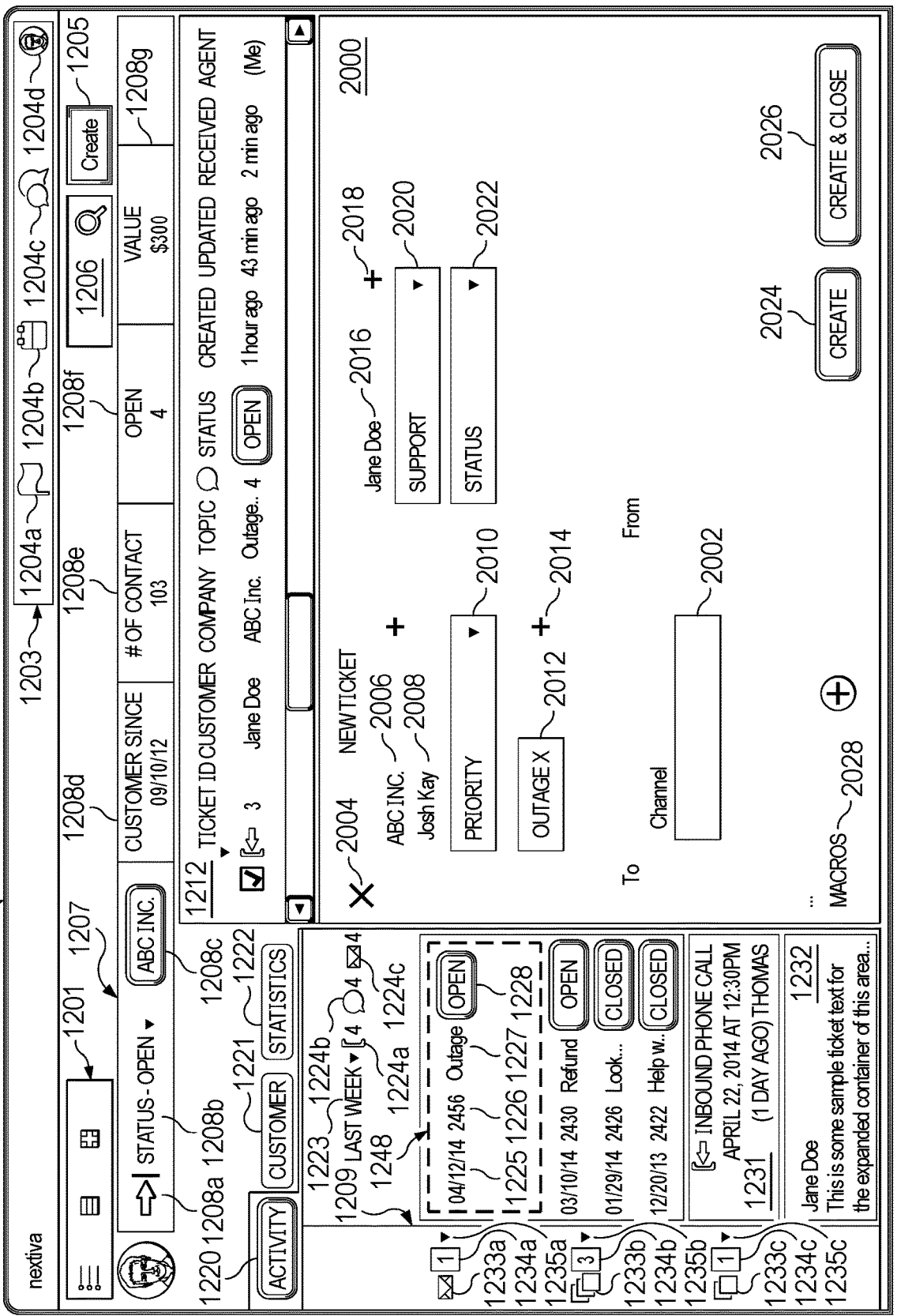

The new ticket entry screen 2000 of FIG. 20 comprises a deletion button 2004, selection of which causes dashboard 1200 to close the new ticket entry screen 2000 and discard any entered data, company name 2006, agent name 2008, a user-selectable priority for the ticket 2010, a topic associated with the ticket 2012, an add new topic button 2014, selection of which allows user selection of one or more additional or alternative topics 434 to associate with the ticket, an end user name display 2016 associated with the ticket and which displays the end user system 120a-n to whom communication will be initiated by the ticket or from whom communication associated with the ticket has been received, an add new end user button 2018, selection of which allows one or more additional or alternative end user systems 120a-n to be added, a department selection dropdown 2020, selection of which allows one or more departments of one or more entities 140 to be added, which will handle the ticket, a status selection dropdown 2022, selection of which allows a status to be associated with the end user system 120a-n or which is populated by a status associated with the end user system 120a-n or company determined by the current score of the end user system 120a-n or company, a macros key 2028, a create button 2024 and a create and close button 2026. Selection of a create button 2024 stores the information comprising the new ticket entry screen 2000 in ticket data 304. Selection of a create and close button 2026 stores the information comprising the new ticket entry screen in ticket data 304 and closes the new ticket entry screen 2000. Selection of a macros key 2028 brings up a macro associated with the topic.

Information search 1206 of dashboard 1200 comprises an input box which permits dashboard 1200 to perform a search of data stored in one or more of databases 114, 144, and 134. For example, a company name may be input, such as ABC Inc. In response, ticket list display 1212 of dashboard 1200 will display all tickets comprising the end user system 120a-n of ABC Inc. Embodiments contemplate input of any end user data 310 which will display in ticket list display 1212 all tickets associated with end user data 310 inputted, such as a name, industry, address, or any identifying information associated with the end user system 120a-n. Further embodiments contemplate input of a topic 434 which causes dashboard 1200 to display in the ticket list display 1212 all tickets associated with the topic entered by the user. For example, in response to a user input of "Outage," ticket list display 1212 will display all tickets comprising the topic 434 of outage.

End user information bar 1207 of dashboard 1200 comprises one or more end user information elements 1208a-g comprising information associated with the end user system 120a-n displayed in end user name element 1208c. End user information elements 1208a-g of end user information bar 1207 comprise a ticket status selection dropdown box 1208b, end user name 1208c, length of time as a customer 1208d, a contact count 1208e, a ticket count 1208f, and a value of end user system 1208g.

Selection of ticket status selection dropdown box 1208b displays a dropdown selection box permitting the selection of one or more statuses of tickets to be displayed in ticket list display 1212. For example, selection of an open status displays all tickets of end user system 120a-n displayed in end user name element 1208c which are still open, i.e. tickets which comprise a problem associated with a topic 434 that is unresolved. Alternatively, user selection of a closed status displays all tickets of the end user system 120a-n displayed in end user name element 1208c which are closed, i.e. tickets which comprise a problem associated with a topic 434 that is resolved.

End user name element 1208c displays the name or company associated with an end user system 120a-n selected by a user. Additionally, the color of the end user name element 1208c may change to indicate the status of the end user. For example, a green color may indicate a good status, a red color may indicate a bad status, and a yellow color may indicate an intermediate status.

Length of time as a customer element 1208d displays the length of time end user system 120a-n displayed in end user name element 1208c has been associated with one or more entities 140, either as a customer, a seller, or some other business relationship.

Contact count 1208e displays the number of interactions end user system 120a-n displayed in end user name element 1208c has had with entity since the date displayed in length of time as customer element 1208d.

Ticket count element 1208f displays the number of tickets having the status selected in ticket status selection dropdown box 1208b. For example, in FIG. 12, the status displayed in ticket status selection dropdown box 1208b is "open." Therefore, ticket count element 1208f displays the number of currently open tickets. If the status displayed in ticket status selection dropdown box 1208b is "closed," the ticket count element 1208f displays the number of closed tickets.

Value of end user element 1208g displays a value of an end user system 120a-n to one or more entities 140. Value of an end user comprises, for example, the number of services currently purchased by the end user system 120a-n from one or more entities 140, the total value of all services purchased by the end user system 120a-n from one or more entities 140, and/or a calculation of the balance of the value of all services purchased by the end user system 120a-n from one or more entities 140 minus a cost to one or more entities 140 of providing the services to the end user system 120a-n and/or a cost to the one or more entities 140 of the end user interactions.

Case access panel 1209 of dashboard 1200 comprises case type 1233a-c, case type count 1234a-c, and case type quick access dropdown 1235a-c. Case type 1233a-c comprises an inbox 1233a, all cases 1233b, and my cases 1233c. The case type counts 1234a, 1234b, and 1234c displays the number of cases in each of the inbox 1233a, all cases 1233b, and my cases 1233c, respectively. Selection of case type quick access dropdowns 1235a, 1235b, and 1235c displays a menu of choice of user actions to be performed on the cases in the inbox 1233a, all cases 1233b, and my cases 1233c. One type of quick access choice in quick access dropdown is display. Selection of display from the quick access choice in quick access dropdown or selection of the case type 1233a-c and/or case count 1233a-c causes dashboard 1200 to display the cases dashboard 2100 (FIG. 21).

Figure 21:
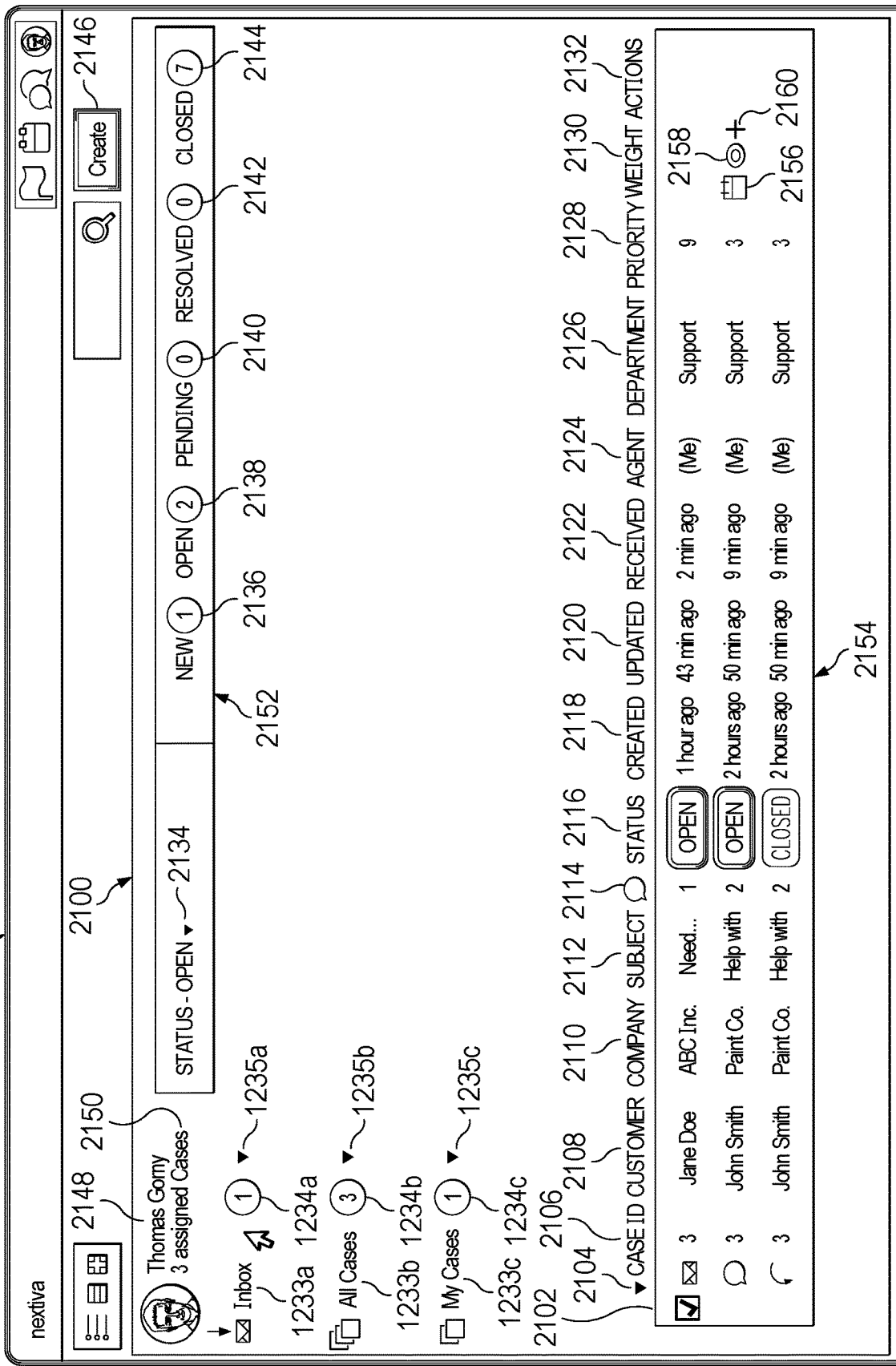

FIG. 21 illustrates the cases dashboard 2100 in greater detail according to an embodiment. Cases dashboard 2100 comprises one or more of the following: user name 2148, assigned cases count 2150, inbox 1233a, all cases 1233b, my cases 1233c, inbox case count 1234a, all cases case count 1234b, my cases case count 1234c, inbox quick access dropdown 1235a, all cases quick access dropdown 1235b, my cases quick access dropdown 1235c, column labels 2102-2132, cases list display area 2154, cases information bar 2152, an create new case button 2146.

Cases list display area 2154 displays information about the cases selected from case type 1233a-c with the status indicated by case status indicator dropdown 2134. According to the embodiment illustrated in FIG. 21, case list display area displays, for one or more cases, an indicator whether the case has been previously viewed 2102, a channel indicator 2104, a case ID number 2106, a customer name 2108, a company name 2110, a subject 2112, a messages count 2114, a status indicator 2115, an indication of the time when the case was created 2118, an indication of when the case was last updated 2120, an indication of the time when the case was received 2122, the agent handling the case 2122, the department of the entity handling the case 2126, a priority indicator 2128, a weight 2130, and actions to be performed on the ticket 2132 including add to calendar 2156, view 2158, and add new ticket 2160.

Cases information bar 2152 comprises one or more counters 2136-2144 for the cases displayed in cases list display area 2154. For example, counters in cases information bar 2152 may indicate the number of new cases 2136, open cases 2138, pending cases 2140, resolved cases 2142, and closed cases 2144.

Furthermore, create new case button 2146 of cases dashboard 2100 creates a new case to be displayed in cases list display area 2154.

Figure 22:
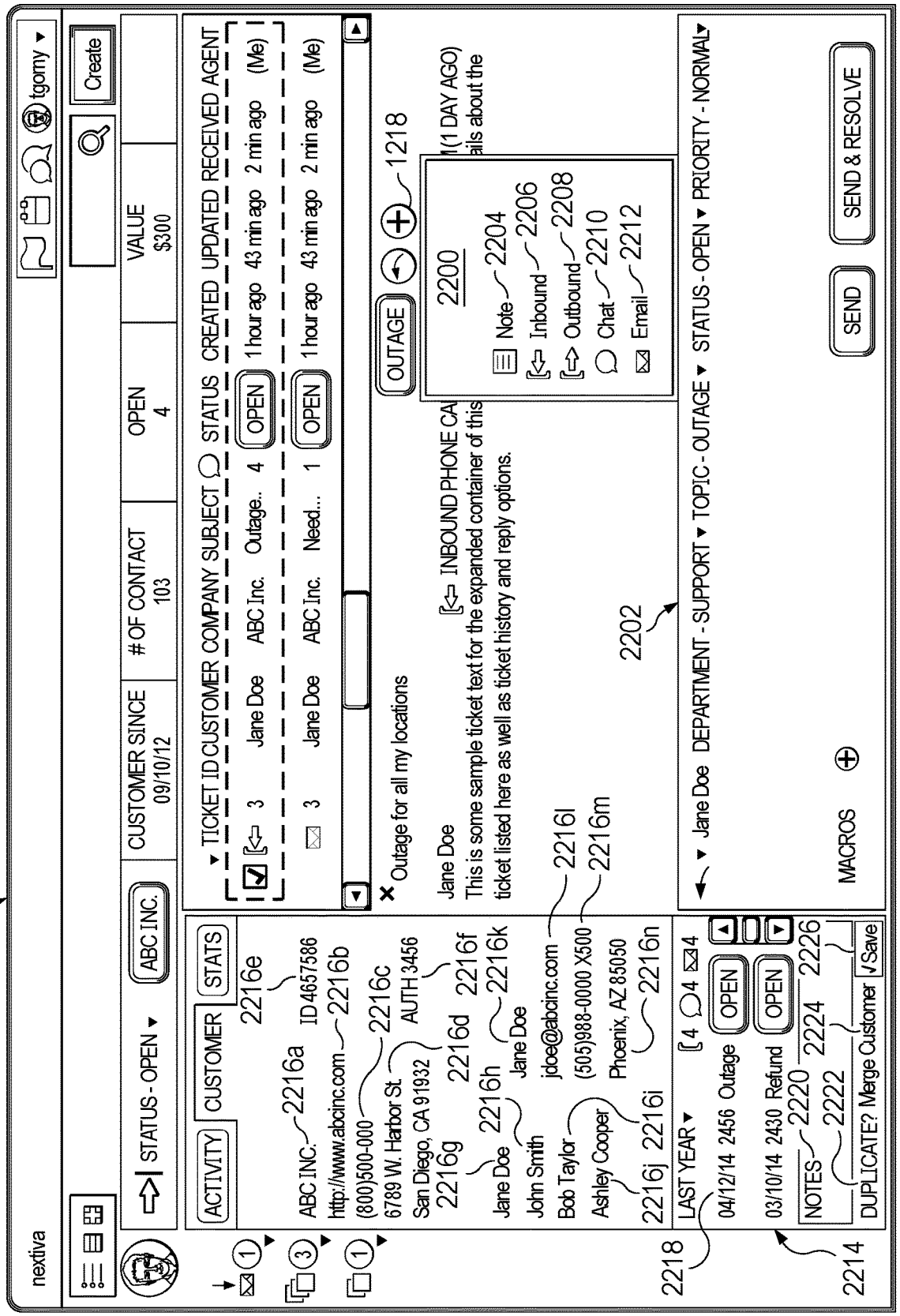

FIG. 22 illustrates create new ticket event dropdown 2200 and reply dropdown 2202 according to a particular embodiment.

Upon selection of create new ticket event button 1218, create new ticket event dropdown 2200 is displayed on dashboard 1200. Create new ticket event dropdown 2200 comprises one or more new ticket event elements 2204-2212 to add a new ticket event to current ticket information 1219 and store the ticket event information in ticket data 304 of database 134 of cloud datastore 130. In this embodiment, new ticket event elements 2204-2212 of create new ticket event dropdown 2200 comprise elements for creating a new note ticket event 2204, a new inbound call ticket event 2206, a new outbound call ticket event 2208, a new chat ticket event 2210, and a new email ticket event 2212. In some embodiments, one or more ticket event elements 2204-2212 are not displayed because customer management system 100 detects a communication between end user system 120a-n and one or more entities 140 and creates a new ticket event comprising the channel and direction of communication between end user system 120a-n and one or more entities 140. For example, in customer management system 100 comprising an integrated phone system, when an end user system 120a-n contacts one or more entities 140, dashboard 1200 displays a reply dropdown 2202 wherein the channel information is already filled in by a determination of customer management system 100 based on the channel and direction of communication. In customer management system 100 comprising a phone system that is not integrated, user selection of ticket event elements 2204-2212 causes dashboard 1200 to display new ticket event entry screen 2202 with channel information and direction of communication filled out according to the ticket event element 2204-2212 selected. For example, when new email ticket event element 2212 is selected, the reply dropdown 2202 may be partially filled out.

Figure 23:
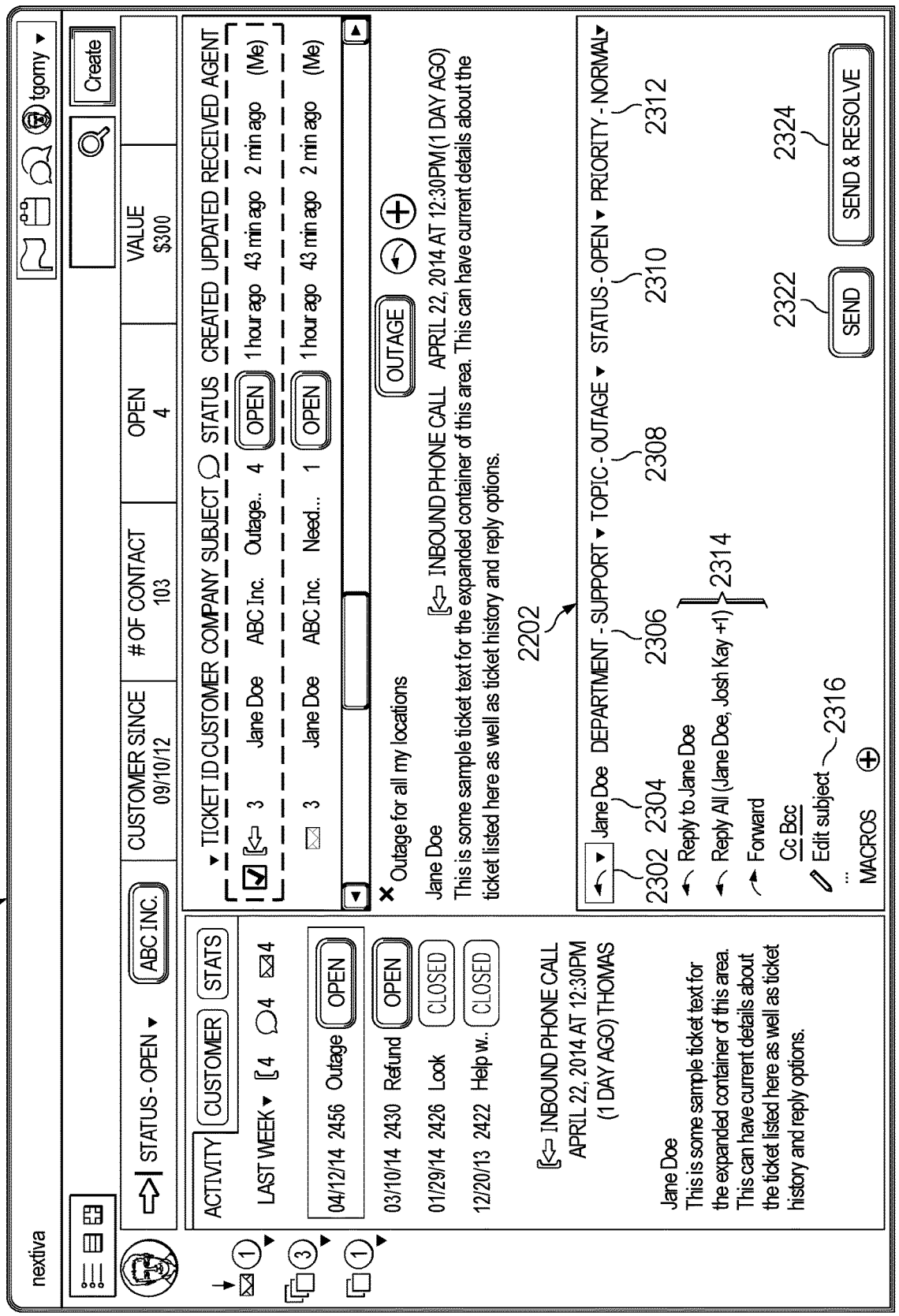

FIG. 23 illustrates a reply dropdown 2202 partially filled out in response to a selection of the new email ticket event element 2212. The reply dropdown 2202 comprises one or more elements which permits one or more entities 140 to send a reply to one or more end user systems 120a-n. According to the embodiment illustrated in FIG. 23, reply dropdown 2202 comprises a "reply to" button 2302, end user associated with reply 2304, department 2306, topic 2308, status 2310, priority 2312, reply information 2314, text of reply 2316, macros 2318, add button 2320, send button 2322, and send and resolve button 2324. According to some embodiments, "reply to" button 2302 permits user of reply dropdown 2202 to select one or more end user systems 120a-n to send a reply to. End user associated with reply 2304 displays the name or other contact information of the end user system 120a-n which will receive the reply. Department 2306 indicates the department of the one or more entities 140 which handles the topic 2308 associated with the reply. Status 2310 indicates the status of the selected ticket 1246 associated with the reply. Priority 2312 comprises a priority indicator of the reply. Each of department 2306, topic 2308, status 2310, and priority 2312 comprises a dropdown menu which permits a user to select one or more departments 2306, topics 2308, statutes 2310 and/or priority 2312 according to needs.

Reply information 2314 comprises email reply information such as the name of the email sender, the name of the email recipient, and options to forward the email and add a CC or BCC to the email. Text of reply 2316 displays the text of the email, selection of which allows one or more entities 140 to edit the email before sending it out to the end user system 120a-n.

Upon selection of send button 2322, user interface module 524 of server 142 of one or more entities 140 sends the reply comprising the reply dropdown 2202 to one or more end user systems 120a-n indicated in the reply information 2304. In addition, upon selection of the send and resolve button 2324, user interface module 524 of server 142 of one or more entities 140 sends the reply comprising the reply dropdown 2202 to one or more end user systems 120a-n indicated in the reply information 2304 and changes the ticket status 1304h of ticket data 302 to a closed status.

Although the embodiment of reply dropdown 2202 indicates a new email ticket event, embodiments contemplate selection of an inbound or outbound call ticket event 2206 and 2208 to display information associated with a phone call instead of an email. For example, reply information 2314 of an inbound or outbound call ticket may comprise the telephone number of the caller and/or recipient of the phone call, and the text of reply 2316 may comprise one or more notes made by the one or more entities 140 about the phone call or a transcript of the phone call.

Returning to FIG. 12, dashboard 1200 comprises an activity display shortcut 1220, a customer display shortcut 1221, and a statistics display shortcut 1222.

Upon selection of the activity display shortcut 1220, dashboard 1200 displays activity panel 1229. Activity panel 1229 comprises one or more of history lookback period dropdown 1223, channel notifications 1224a-c, activity history panel 1230, selected activity channel information 1231, and selected channel information 1232. Selection of history lookback period dropdown 1223 permits a user to select one or more time periods which causes activity history panel 1230 to display all activity history for the selected time period. For example, when the history lookback period is "last week," the activity history displayed in the activity history panel 1230 are activities which occurred during the last week.

Channel notifications 1224a, 1224b, and 1224c indicated the number of phone calls, chats, and emails, respectively, which have occurred between the end user system 120a-n selected in the end user name element 1208c and the one or more entities 140 during the time period indicated in the history lookback period dropdown 1223.

Activity history panel 1230 indicates activities between an end user system 120a-n and one or more entities 140 during the lookback period selected in the lookback period dropdown 1223. In one embodiment, information presented in the activity history panel 1230 indicates the date of the activity 1225, an activity identification number 1226, a topic of the activity 1227, and a status of the activity 1228. Information associated with a selected activity 1248 is indicated in the selected activity channel information 1231 and selected channel information 1232. According to some embodiments, the selected activity channel information 1231 indicates the most recent channel information of the most recent communication between the one or more entities 140 and the end user system 120a-n. For example, in FIG. 12, the most recent communication was an inbound phone call on Apr. 22, 2014 at 12:30 pm between Jane Doe (indicated in activity information 1232) and Thomas. According to some embodiments, selected activity channel information 1231 indicates information associated with the selected activity 1248 including, for example, name of the most recent contact, current details about the most recent ticket in the activity, activity history, and reply options.

Returning to FIG. 22, upon selection of the customer display shortcut 1221, dashboard 1200 displays customer panel 2214. Customer panel 2214 displays information associated with the end user system 120a-n that comprises the end user selected in end user name element 1208c. According to some embodiments, information displayed in customer panel 2214 includes identification information of end user system 120a-n stored in end user data 310 of database 134 of cloud datastore 130. The identification information may include one or more of end user company name 2216a, end user website 2216b, end user company telephone number 2216c, end user address 2216d, end user identification number 2216e, end user authorization number 2216f, end user agents 2216g-j, a selected end user 2216k, end user email address 2216l, end user telephone number 2216m, and end user address 2216n. According to some embodiments, customer panel 2214 displays recent activity data for the end user 2218, notes associated with the end user 2220, an option to duplicate 2222 the end user information to permit a user of dashboard 1200 to associate the end user information with a second end user, an option to merge 2224 the end user information with a second end user, and an option to save 2226 the end user information as end user data 310 in database 134 of cloud datastore 130.

Figure 24:
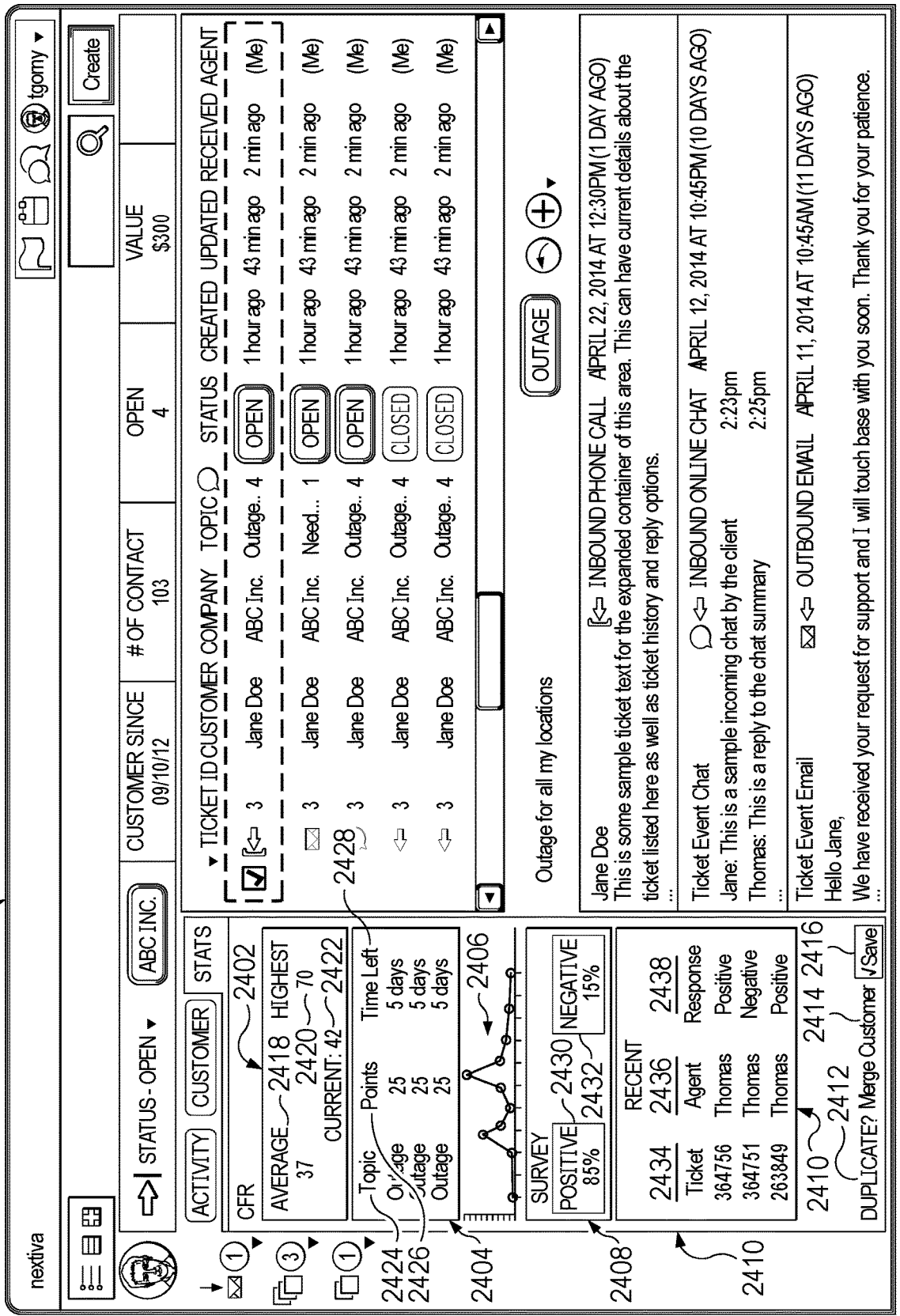

FIG. 24 illustrates statistics panel 2400 according to an embodiment. Upon user selection of the statistics display shortcut 1222, dashboard 1200 displays statistics panel 2400. Statistics panel 2400 comprises one or more of scoreboard 2402, recent ticket events 2404, graph 2406, survey results 2408, recent survey responses 2410, and/or options to duplicate 2412, merge 1414, and/or save statistics information 2416.

Scoreboard 2402 displays a score calculated by scoring module 320. For example, scoreboard 2402 may display the average score 2418, highest score 2420, and/or current score 2422 of the end user system 120a-n selected in end user name element 1208c.

Recent ticket events 2404 displays the topic 2424, points 2426, and time left 2428 associated with each ticket or ticket event that has been used to calculate the current score 2422.

Graph 2406 displays a chart or a graph of the score or customer sentiment indicated by survey results for a user-selectable amount of time.

Survey results 2408 indicates the positive 2430 and/or negative 2432 sentiment of the end user system 120a-n based on surveys completed by end user system 120a-n. For example, in some embodiments, when one or more entities 140 indicates that a status of a ticket is resolved or closed, customer management system 100 sends a survey to end user system 120a-n. In addition, or as an alternative, customer management system 100 may send surveys to end user system 120a-n at the discretion of one or more entities 140 and not based on a particular status of a ticket. The results of the survey are calculated by scoring module 320, and the results are displayed in survey results 2408. Recent survey responses 2410 displays a list of all or a selection of the most recent survey responses for the end user system 120a-n selected in end user name element 1208c. The recent survey responses 2410 displays, for example, the ticket number 2434 associated with the survey response, the agent 2436 that handled the ticket associated with the survey response, and a sentiment indication 2438 whether the end user system 120a-n indicated on the survey that the resolution of the ticket was a positive or negative experience.

Figure 25:
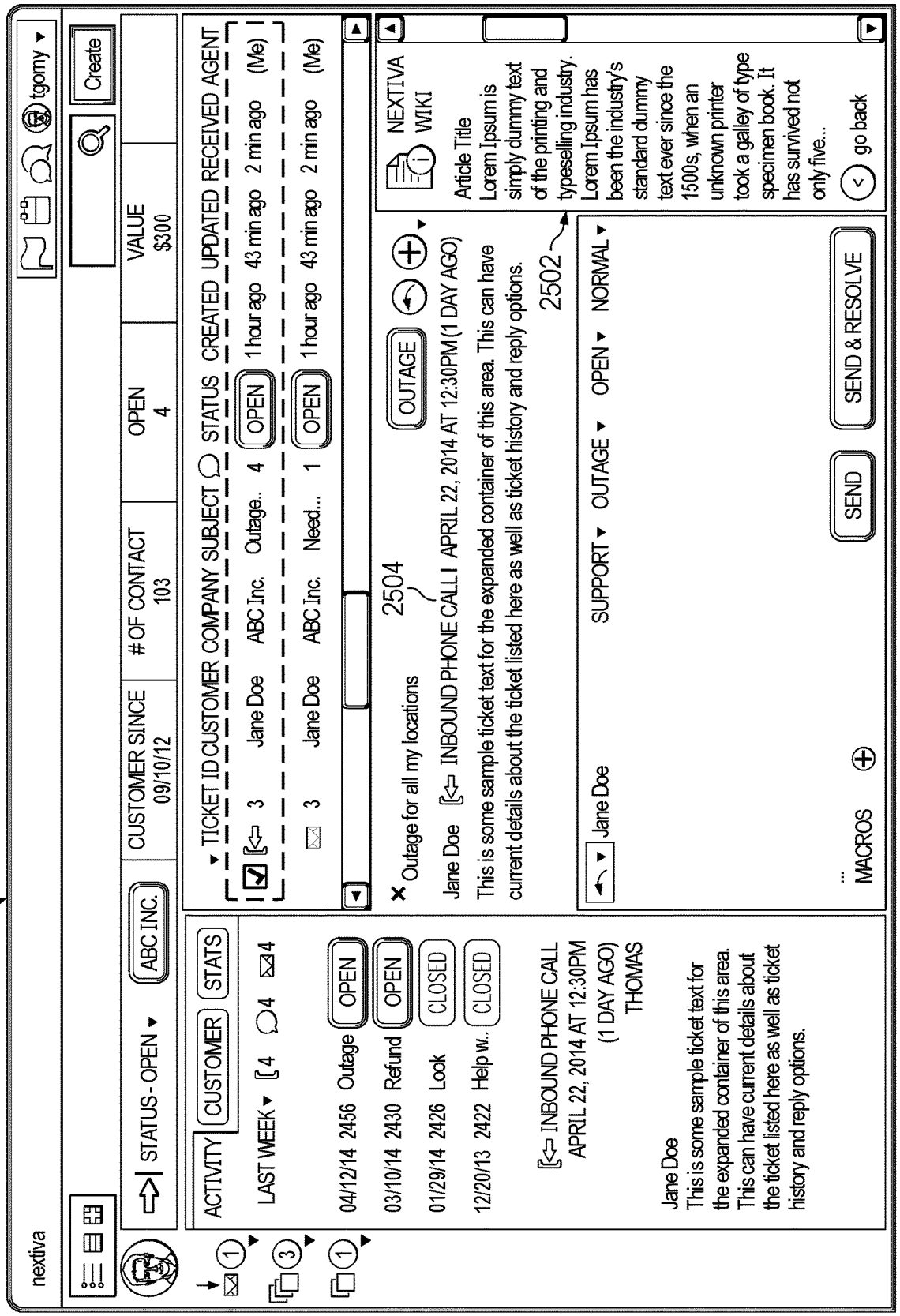

FIG. 25 illustrates an expanded ticket view 2500 according to an embodiment. According to some embodiments, a wiki 2502 is displayed with a ticket based on the topic 1304e associated with a ticket. For example, according to some embodiments, on selection of a ticket, an expanded ticket view 2500 is displayed by the dashboard 1200. The expanded ticket view comprises one or more of channel information 2504 and a wiki 2502. The wiki 2502 comprises information useful in resolving the topic 1304e associated with the ticket. For example, if the topic 1304e associated with the ticket is "outage," the wiki 2502 displays information on current outages affecting the end user systems 120a-n and a step-by-step process for resolving the outage.

In order to indicate the operation of customer management system 100 in greater detail, several examples are now given. Assuming that an end user 120a-n starts with 100 points, where 100-75 indicates a happy sentiment, 74-31 indicates a neutral sentiment, and 30-0 indicates a negative sentiment, and the categories, topics, subtopics, points, and evaporation times are set up according to TABLE 1, the following particular examples are now given.

TABLE 1

| Category | Topic | Subtopic | Aggravation and Customer Satisfaction Score (points) | Resolve Time (min)/ Overage Penalty (points) | Response Time (min)/ Response Delay Penalty (Points) | Repeat Period (days)/ Repeat Penalty (points) | Evaporation Time (days) |
|---|---|---|---|---|---|---|---|
| New Setup | New Product Issues | Product not delivered | −20 | 20/5 | 5/10 | 5/10 | 15 |
| | | Product not delivered on time | −15 | 15/5 | 5/10 | 5/10 | 15 |
| | | Product is not working | −10 | 20/5 | 5/10 | 5/10 | 15 |
| | Product Setup Questions | N/A | −5 | 10/5 | 5/10 | 5/10 | 15 |
| New Setup | Service Feature setup | Basic Features Setup | −1 | 15/1 | 5/10 | 3/5 | 8 |
| | | Technical Features Setup | −1 | 15/1 | 5/10 | 3/5 | 8 |
| | | Advance Features Questions | −2 | 12/2 | 5/10 | 3/5 | 8 |
| | | Product Sample 1 | 0 | 20/5 | 10/5 | 5/5 | 15 |

TABLE 1-continued

| Category | Topic | Subtopic | Aggravation and Customer Satisfaction Score (points) | Resolve Time (min)/ Overage Penalty (points) | Response Time (min)/ Response Delay Penalty (Points) | Repeat Period (days)/ Repeat Penalty (points) | Evaporation Time (days) |
|---|---|---|---|---|---|---|---|
| | Not Understanding Features | N/A | −1 | 5/1 | 5/10 | 3/5 | 8 |
| Billing | Invoice and credits | Invoice request | −8 | 5/8 | 10/5 | 3/5 | 15 |
| | | Additional product request | +5 | 3/0 | 10/5 | 3/5 | N/A |
| | | Feature removal request | 5 | 3/6 | 10/5 | 3/5 | 15 |
| | | Credit requested | 5 | 10/10 | 10/5 | 3/5 | 15 |
| Billing | Payment information | Update credit card | 1 | 15/10 | 10/5 | 10/5 | 5 |
| | | Change billing address | 0 | 15/5 | 1/10 | 10/5 | 5 |
| | | Customer makes payment | 0 | 15/5 | 1/10 | 1/5 | 5 |
| | | Payment extension | −5 | 15/1 | 1/10 | 30/15 | 5 |
| Customer Service | Service Issues | N/A | −20 | 10/20 | 1/20 | 5/15 | 45 |
| | | Unable to login | −20 | 10/20 | 1/20 | 5/15 | 45 |
| | | Login works sometimes | −20 | 10/12 | 1/20 | 5/15 | 45 |
| | | Display not working | −20 | 10/15 | 1/20 | 5/15 | 45 |
| Service Center Problem | Customer reaction | Threaten to Cancel | −20 | 15/25 | 1/15 | 30/90 | 45 |
| | | Manager Request | −10 | 15/25 | 1/15 | 30/90 | 45 |
| Social Media | Facebook | Positive Comment | +10 | N/A | N/A | N/A | N/A |
| | | Negative Comment | −10 | N/A | N/A | 90/20 | 30 |

Example 1: On Jan. 1, 2014, an end user system 120*a-n* represented by Customer A calls into support to set up a new service. An entity 140 represented by Agent A opens a new ticket by selecting create new ticket button 1205 of dashboard 1200 and selects the category "New Setup" by using the add new topic button 2014 (FIG. 20). Agent A then navigates to the particular topic and/or subtopic relating to setting up a new service. Customer A wishes to set up a product, so Agent A selects the product from the topic and subtopic. Alternatively, Agent A could select the macros button 2028, and select a macro named "Service Feature Setup," which would automatically add this topic to the new ticket and set the status selection dropdown 2022 to open. According to TABLE 1, the expected resolve time for a 'Service Feature Setup' for Product Sample 1 is 20 minutes with a 5 points overage penalty. If it takes Agent A 30 minutes to resolve the time (and close the ticket), an overage penalty of 5 points will be deducted from the satisfaction score of Customer A in addition to an aggravation penalty of 0 points. Therefore, Customer A would have 5 points subtracted from their satisfaction score, giving a current score for Customer A of 95 points, which indicates a happy sentiment. The happy sentiment is shown by a green end user name element 1208*c*. The points will be added back to the satisfaction score after the evaporation period has elapsed (15 days).

Example 2: The same Customer A from Example 1 calls Agent A on Feb. 1, 2014. Customer A is experiencing that the product that was set up in Example 1, is not working. Because the evaporation period for the points accrued in Example 1 has elapsed, Customer A currently has a satisfaction score of 100 points. Now that Customer A's information is already stored in end user data 310 of database 134, channel interface 522 recognizes the incoming call from Customer A as belonging to a phone number owned by Customer A. Therefore, dashboard 1200 of user interface 524 creates a new ticket with the identity information of Customer A already filled out. Agent A enters the topic using the add new topic button 2014 and selects "Service Issues" And a subtopic if applicable. The aggravation penalty of Service Issues is 20 points, so the satisfaction score of Customer A is currently 80 points. While Agent A is attempting to resolve the Service Issues topic for Customer A, customer A says he or she wants to speak to a manager and threatens to cancel service with Agent A. In response Agent A may add either or both of the topics "Threaten to Cancel" or "Manager Request." In this example, Agent A selects Threaten to Cancel and the aggravation points associated with this topic are deducted from the satisfaction score of Customer A. Assuming that the manager was able to resolve and respond to Customer A within the response and overage times indicated for these topics, Customer A would have a satisfaction score of 60 points.

Example 3: The same Customer A from Examples 1 and 2 calls Agent A on Feb. 2, 2014, about service issues again. The repeat period for the Service Issue topic is 5 days with a penalty of 15 points. Because the customer has called within 5 days from the prior service issue problem (Feb. 1, 2014), the repeat penalty of 15 points will be deducted from the satisfaction score of the customer. Therefore, the satisfaction score of the customer is currently 45 points, which indicates a neutral sentiment.

Example 4: On Jan. 3, 2014, an end user system 120a-n represented by Customer B calls an Agent B, to update their credit card and make a payment. Agent B then selects create new ticket 1205 of dashboard 1200 and uses the add new topic button 2014 to add "Update credit card" and "Customer makes payment" topics to the ticket. When Customer B gives Agent B the new credit card payment information, Agent B sends the new credit card payment information to a second entity 140, Credit Card Processor. Credit Card Processor process the credit card payment information and Agent B receives an indication that the payment has been processed. After Agent B receives the processed payment indication from the Credit Card Processor, Agent B can click status indicator 1306h to change the status of the ticket to close. Assuming Agent B resolved both the Update Credit Card topic with an aggravation score of 1 point and the Customer Makes Payment topic with an aggravation score of 0 points within the 15 minutes resolve time, Customer B would have a satisfaction score of 99 points which would return to 100 points after the five day evaporation period has elapsed. If Agent B did not resolve both the Update Credit Card topic with an aggravation score of 1 point and the Customer Makes Payment topic with an aggravation score of 0 points within the 15 minutes resolve time, then the overage penalty of 15 points for the Update Credit Card topic and the overage penalty of 10 points for the Customer Makes Payment topic would be subtracted from the customer satisfaction score and Customer B would have 75 points, which would return to 100 points after the evaporation period of five days has elapsed.

Example 5: On Aug. 1, 2014, an end user system 120a-n represented by Customer C calls an Agent C to change his or her billing address which is a topic with an aggravation score of 0 points. The expected response time of the Billing Address topic is 1 minute, but Agent C fails to respond until after 3 minutes. Therefore, 10 response penalty points will be deducted from the satisfaction score of Customer C. Based on this experience, Customer C posts a negative comment on a FACEBOOK page monitored by a social media service entity. The social media service entity sends an indication to Agent C, which is also an entity 140, that a negative comment was posted on a social media service. The indication is stored in local data 402 of database 144 and then scoring module 320 updates the score of Customer C based on the negative comment and stores the information in score data 318. Based on an aggravation score of 15 for a Negative Comment on Social Media topic, the satisfaction score of Customer C will be 75.

Example 6: On Sep. 1, 2014 The same Customer A from Example 5 calls Agent C about updating Billing Address again. Because 30 days have elapsed since the last Update Billing Address topic, no repeat penalty is applied. Also, the evaporation period for the update billing address topic has elapsed, so the satisfaction score for Customer C is currently 85 points. However, Customer C posts another negative comment on social media, which social media service entity monitors and sends an indication to Agent C. The repeat penalty for the Negative Comment on Social Media topic is 20 points and the repeat period is 90 days. Also, the points from the previous comment have not yet evaporated. Therefore, Customer C would have a satisfaction score of 65 points.

In an embodiment and in order to indicate the operation of surveys within customer management system 100 TABLE 2 provides the following particular examples.

TABLE 2

| Survey | Name | Scheduled and Survey Rules | For Negative Aggravation and Customer Satisfaction Score (points) | Evaporation Time (days) | For Positive Aggravation and Customer Satisfaction Score (points) | Evaporation Time (days) |
| --- | --- | --- | --- | --- | --- | --- |
| After Contact Survey | Survey 1 | Send 24 hours after ticket closed | −15 | 15 | +15 | N/A |
| Regular Survey | Survey 2 | Send every 12 month to every customer | −20 | 15 | +20 | N/A |

In other embodiments and in order to further indicate the operation of customer management system 100 in greater detail, several rule scenarios examples having an impact on a satisfaction score are now given. Assuming that each of the following in TABLE 3 could be an "And" or an "Any" condition to produce an action for adding to or subtracting from the points of the customer satisfaction score.

TABLE 3

| Survey response | Is positive, then | +15 points | Is negative, then | −15 points |
| --- | --- | --- | --- | --- |
| Yelp review | Is equal to or greater than 3.5, then | +20 points | Is less than 3.5, then | −20 points |
| Number of attended webinar(s) | Is equal to or greater than 1 webinar, then | +10 points | N/A | N/A |

TABLE 3-continued

| | | | | |
|---|---|---|---|---|
| Length of customer relationship (how long an organization has been a customer) | Is equal to or greater than 1 year | +5 points | N/A | N/A |
| Customer account value | Is equal to or greater than subscription value, then | +15 points | Is lower than previous subscription value, then | −30 points |
| Ticket Subject | If contains Best in subject, then | +5 points | If contains Worst in subject, then | −25 points |
| Email campaign | If open, then | +15 points | If not open, then | 0 points |
| Social Media (Facebook) | If positive, then | +10 points | If negative, then | −10 points |

According to TABLE 3, the following particular scenarios are now given, where a satisfaction score is associated with a customer of the scenario.

Scenario 1: On Jan. 1, 2014 Customer A (current customer satisfaction score=75) attends a webinar about using company products to boost Customer A's business (+10). Immediately following the webinar, Customer A receives a webinar feedback survey that they respond to positively (+15). Customer A now has a customer satisfaction score of 100 (positive).

Scenario 2: On Mar. 1, 2014 there is service outage and Customer A emails customer support of entity 140 with the subject line "worst service ever" (−40 customer satisfaction points for Topic: Service Outage; −25 points for "worst" in ticket subject). Customer A now has a satisfaction score of 35 (neutral).

Scenario 3: On Mar. 7, 2014 Customer A reviewed the company on YELP, praising its amazing customer service but still rating it a 3.0 because of the service outage a few days earlier. Another 20 points is deducted from the customer satisfaction score for posting a YELP review of 3.5 or lower. Customer A now has a satisfaction score of 15 (negative).

Scenario 4: After being targeted with a special email campaign and phone calls, from an entity 140, for customers with scores in the negative range, Customer A gets +15 points for having an email campaign of 50%, as well as a +5 bonus for passing a 1 year anniversary. It is now Jul. 1, 2014 and the −20 points for Topic: Service Outage have evaporated. Customer A now has a satisfaction score of 55 points (neutral).

Scenario 5: On Aug. 1, 2014, Customer A upgrades to a higher plan with entity 140. Because the customer account value increased, 15 points are added to the customer satisfaction score. Customer A now has a customer satisfaction score of 70 (positive).

Scenario 6: On Jan. 1, 2014 Customer A (current customer satisfaction score=75) contacts customer support of entity 140 about product features. Product features questions are set to 0 points. After the interaction Customer A receives an interaction survey. Customer responds positively to the survey (+10). Customer A now has a customer satisfaction score of 85.

Scenario 7: On Jan. 1, 2014 Customer A (current customer satisfaction score=75) does not contact customer support of entity 140 but instead, entity 140 contacts Customer A with a Net Promoter Score survey. The customer responds positively to the survey (+20). Customer A now has a customer satisfaction score of 95.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A method of topic management, comprising:
   receiving, by a graphical user interface of a computer comprising a processor and a memory, a selection of a topic category of a hierarchy of one or more topics;
   receiving, by the graphical user interface of the computer, a definition of a subtopic associated with the topic category, wherein the definition comprises one or more parameters;
   receiving, by the graphical user interface of the computer, an input for an expected resolve time of the subtopic;
   receiving, by the graphical user interface of the computer, an input for an expected resolve time of one or more channels corresponding to the subtopic;
   receiving, by the graphical user interface of the computer, values for one or more of: aggravation score values, evaporation period values, repeat issue penalty values and overage penalties corresponding to the topic category or the subtopic;
   receiving, by the graphical user interface of the computer, internal notes and campaign notes which are linked to one or more of the topic category and the subtopic;
   monitoring, by the computer, one or more channels of communication between one or more end users and one or more entities for one or more communications;
   analyzing, by the computer, in response to the monitoring the one or more communications between at least one end user of the one or more end users and at least one entity of the one or more entities, to identify one or more topic categories or one or more subtopics that characterize the one or more communications;
   scoring, by the computer, the one or more communications based on, at least in part, the values to generate an overall score characterizing the one or more communications; and
   generating, by the graphical user interface of the computer, a status of the one or more communications based on applying a predetermined range to the overall score.

2. The method of claim 1, further comprising:
   receiving, by the graphical user interface of the computer, a new topic category and one or more parameters of the new topic category.

3. The method of claim 1, further comprising:
   receiving, by the graphical user interface of the computer, a selection to sort topic categories and subtopics according to one or more of: alphabetically, date created and date modified.

4. The method of claim 1, further comprising:
   receiving, by the graphical user interface of the computer, a selection to determine points corresponding to a particular topic category or subtopic, wherein the points correspond to one or more penalties assessed when a topic category or subtopic occur in a monitored communication.

5. The method of claim 1, further comprising:
receiving, by the graphical user interface of the computer, a selection to include a wiki article in tickets related to a particular topic category or subtopic.

6. The method of claim 1, further comprising:
adding or subtracting, by the computer, penalty points corresponding to the score when a time period has elapsed after a communication, wherein the penalty points and the adding or subtracting correspond to a particular topic category or a particular subtopic.

7. The method of claim 6, further comprising:
receiving, by the graphical user interface of the computer, an entry of a forgiveness period corresponding to a time period after which the adding or subtracting of the penalty points are reversed.

8. A system for topic management, comprising:
a computer comprising a graphical user interface, a memory and a processor that:
receives a selection of a topic category of a hierarchy of one or more topics;
receives a definition of a subtopic associated with the topic category, wherein the definition comprises one or more parameters;
receives an input for an expected resolve time of the subtopic;
receives an input for an expected resolve time of one or more channels corresponding to the subtopic;
receives values for one or more of: aggravation score values, evaporation period values, repeat issue penalty values and overage penalties corresponding to the topic category or the subtopic;
receives internal notes and campaign notes which are linked to one or more of the topic category and the subtopic;
monitors one or more channels of communication between one or more end users and one or more entities for one or more communications;
analyzes in response to the monitoring the one or more communications between at least one end user of the one or more end users and at least one entity of the one or more entities, to identify one or more topic categories or one or more subtopics that characterize the one or more communications;
scores the one or more communications based on, at least in part, the values to generate an overall score characterizing the one or more communications; and
generates a status of the one or more communications based on applying a predetermined range to the overall score.

9. The system of claim 8, wherein the computer further:
receives a new topic category and one or more parameters of the new topic category.

10. The system of claim 8, wherein the computer further:
receives a selection to sort topic categories and subtopics according to one or more of:
alphabetically, date created and date modified.

11. The system of claim 8, wherein the computer further:
receives a selection to determine points corresponding to a particular topic category or subtopic, wherein the points correspond to one or more penalties assessed when a topic category or subtopic occur in a monitored communication.

12. The system of claim 8, wherein the computer further:
receives a selection to include a wiki article in tickets related to a particular topic category or subtopic.

13. The system of claim 8, wherein the computer further:
adds or subtracts penalty points corresponding to the score when a time period has elapsed after a communication, wherein the penalty points and the adds or subtracts correspond to a particular topic category or a particular subtopic.

14. The system of claim 13, wherein the computer further:
receives an entry of a forgiveness period corresponding to a time period after which the adding or subtracting of the penalty points are reversed.

15. A non-transitory computer-readable medium embodied with software for topic management, the software when executed using one or more computer systems is programmed to:
receive a selection of a topic category of a hierarchy of one or more topics;
receive a definition of a subtopic associated with the topic category, wherein the definition comprises one or more parameters;
receive an input for an expected resolve time of the subtopic;
receive an input for an expected resolve time of one or more channels corresponding to the subtopic;
receive values for one or more of: aggravation score values, evaporation period values, repeat issue penalty values and overage penalties corresponding to the topic category or the subtopic;
receive internal notes and campaign notes which are linked to one or more of the topic category and the subtopic;
monitor one or more channels of communication between one or more end users and one or more entities for one or more communications;
analyze in response to the monitoring the one or more communications between at least one end user of the one or more end users and at least one entity of the one or more entities, to identify one or more topic categories or one or more subtopics that characterize the one or more communications;
score the one or more communications based on, at least in part, the values to generate an overall score characterizing the one or more communications; and
generate a status of the one or more communications based on applying a predetermined range to the overall score.

16. The non-transitory computer-readable medium of claim 15, wherein the software is further programmed to:
receive a new topic category and one or more parameters of the new topic category.

17. The non-transitory computer-readable medium of claim 15, wherein the software is further programmed to:
receive a selection to sort topic categories and subtopics according to one or more of: alphabetically, date created and date modified.

18. The non-transitory computer-readable medium of claim 15, wherein the software is further programmed to:
receive a selection to determine points corresponding to a particular topic category or subtopic, wherein the points correspond to one or more penalties assessed when a topic category or subtopic occur in a monitored communication.

19. The non-transitory computer-readable medium of claim 18, wherein the software is further programmed to:
receive a selection to include a wiki article in tickets related to a particular topic category or subtopic.

20. The non-transitory computer-readable medium of claim 15, wherein the software is further programmed to:
add or subtract penalty points corresponding to the score when a time period has elapsed after a communication, wherein the penalty points and the add or subtract correspond to a particular topic category or a particular subtopic.

* * * * *